(12) United States Patent
Ortiz et al.

(10) Patent No.: US 11,277,412 B2
(45) Date of Patent: Mar. 15, 2022

(54) SYSTEM AND METHOD FOR STORING AND DISTRIBUTING CONSUMER INFORMATION

(71) Applicant: ROYAL BANK OF CANADA, Montreal (CA)

(72) Inventors: Edison U. Ortiz, Orlando, FL (US); Arya Pourtabatabaie, Orlando, FL (US); Ambica Pawan Khandavilli, Orlando, FL (US); Margaret Inez Salter, Orlando, FL (US); Jordan Alexander Richards, Orlando, FL (US); Iustina-Miruna Vintila, Bucharest (RO); Sarah Rachel Waigh Yean Wilkinson, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 190 days.

(21) Appl. No.: 16/521,569

(22) Filed: Jul. 24, 2019

(65) Prior Publication Data
US 2020/0014691 A1   Jan. 9, 2020

Related U.S. Application Data

(63) Continuation-in-part of application No. 16/503,154, filed on Jul. 3, 2019, and a continuation-in-part of
(Continued)

(51) Int. Cl.
*H04L 29/06* (2006.01)
*H04L 9/08* (2006.01)
(Continued)

(52) U.S. Cl.
CPC ............ *H04L 63/10* (2013.01); *H04L 9/0894* (2013.01); *H04L 9/30* (2013.01); *H04L 9/3218* (2013.01); *H04L 9/3234* (2013.01); *H04L 9/3247* (2013.01)

(58) Field of Classification Search
None
See application file for complete search history.

(56) References Cited

U.S. PATENT DOCUMENTS 6,820,201 B1   11/2004   Lincoln
8,386,790 B2   2/2013   Bhattacharya
(Continued)

FOREIGN PATENT DOCUMENTS

WO   WO-2019098873 A1 *   5/2019   ........... G06F 21/602

OTHER PUBLICATIONS

Camenisch, J et al., "Design and Implementation of the idemix Anonymous Credential System", IBM Research, Zurich Research Laboratory, May 2003, pp. 1-27, https://www.researchgate.net/publication/2570056_Design_and_Implementation_of_the_idemix_Anonymous_Credential_System.
(Continued)

*Primary Examiner* — Maung T Lwin
(74) *Attorney, Agent, or Firm* — Norton Rose Fulbright Canada LLP

(57) ABSTRACT

A computer implemented system for controlling access to data associated with an entity includes a data storage device having a protected memory region, and one or more processors, at least one of which is operable in the protected memory region. The one or more processors are configured for: storing a secret key associated with the entity in a portion of the protected memory region associated with the entity; upon receiving entity data, storing the entity data in the portion of the protected memory region associated with the entity; and upon receiving an access grant signal, generating a smart contract, the smart contract defining the entity data to be accessed and a recipient of the entity data to be accessed.

20 Claims, 39 Drawing Sheets

Related U.S. Application Data application No. 16/424,242, filed on May 28, 2019, now Pat. No. 10,956,585.

(60) Provisional application No. 62/839,408, filed on Apr. 26, 2019, provisional application No. 62/824,697, filed on Mar. 27, 2019, provisional application No. 62/806,394, filed on Feb. 15, 2019, provisional application No. 62/702,684, filed on Jul. 24, 2018, provisional application No. 62/702,871, filed on Jul. 24, 2018, provisional application No. 62/697,140, filed on Jul. 12, 2018, provisional application No. 62/693,680, filed on Jul. 3, 2018, provisional application No. 62/691,406, filed on Jun. 28, 2018, provisional application No. 62/677,133, filed on May 28, 2018.

(51) Int. Cl.
*H04L 9/30* (2006.01)
*H04L 9/32* (2006.01)

(56) References Cited

U.S. PATENT DOCUMENTS

| | | | |
|---|---|---|---|
| 8,683,605 B1 | 3/2014 | Tenenboym | |
| 9,774,578 B1* | 9/2017 | Ateniese | H04L 9/3226 |
| 10,448,251 B1 | 10/2019 | Maria | |
| 10,523,685 B1 | 12/2019 | Kostka | |
| 10,693,872 B1 | 6/2020 | Larson | |
| 2004/0123156 A1 | 6/2004 | Hammond | |
| 2005/0058288 A1 | 3/2005 | Sundaram | |
| 2006/0195692 A1 | 8/2006 | Kuhlman | |
| 2008/0262969 A1 | 10/2008 | Samid | |
| 2010/0049875 A1 | 2/2010 | Lu | |
| 2011/0072269 A1 | 3/2011 | Takechi | |
| 2011/0274275 A1 | 11/2011 | Seitz | |
| 2012/0209730 A1 | 8/2012 | Garrett | |
| 2014/0310162 A1 | 10/2014 | Collins | |
| 2015/0163206 A1* | 6/2015 | McCarthy | H04L 63/06 |
| | | | 713/171 |
| 2016/0162897 A1 | 6/2016 | Feeney | |
| 2016/0344635 A1 | 11/2016 | Lee | |
| 2017/0149560 A1 | 5/2017 | Shah | |
| 2017/0180128 A1 | 6/2017 | Lu | |
| 2017/0294131 A1 | 10/2017 | Jedrzejewski | |
| 2018/0114220 A1* | 4/2018 | Ekberg | H04L 9/007 |
| 2018/0262493 A1 | 9/2018 | Andrade | |
| 2018/0270065 A1 | 9/2018 | Brown | |
| 2018/0337776 A1* | 11/2018 | Miller | H04L 9/3247 |
| 2019/0004789 A1* | 1/2019 | Mills | G06F 8/36 |
| 2019/0036914 A1 | 1/2019 | Tzur-David | |
| 2019/0036932 A1 | 1/2019 | Bathen | |
| 2019/0144153 A1 | 5/2019 | Schaub | |
| 2019/0259228 A1 | 8/2019 | Truong | |
| 2019/0288837 A1* | 9/2019 | St Amant | H04W 12/065 |

OTHER PUBLICATIONS

Belenkiy, M et al., "Randomizable Proofs and Delegatable Anonymous Credentials", CRYPTO 2009, LNCS 5677, p. 108-125, 2009.
Boneh, D et al., "Identity-Based Encryption from the Wiel Pairing", SIAM J of Computing, vol. 32, No. 3, pp. 568-615, 2003.
Groth, J et al., "Efficient Non-Interactive Proof Systems for Bilinear Groups", EUROCRYPT 2008, LNCS 4965, pp. 416-132, 2008.
Paquin, C., "U-Prove Technology Overview V1.1 Revision 2", Microsoft Corporation, pp. 1-23, Apr. 2013.
Paquin, C et al., "U-Prove Cryptographic Specification V1.1 Revision 3" Microsoft Corporation, pp. 1-23, Dec. 2013.
USPTO Office Action issued in U.S. Appl. No. 16/503,154, dated Jan. 7, 2021.
USPTO Office Action issued in U.S. Appl. No. 16/750,542 dated Oct. 1, 2021.

* cited by examiner

WE GENERATE A TON OF DATA
More than 5 exabytes per day

Brands use our data everyday for:

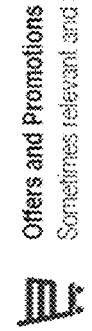

Marketing and Advertising
Sometimes with our permission, sometimes without

Brands also collect and use our data to derive value:

- They generate insights with it
- They design new propositions with it
- They develop new products and services with it

In exchange for our data, we get:

Offers and Promotions
Sometimes relevant and high-value, sometimes low-value and disruptive

But most of us will never profit from it:

- We have nowhere to store it
- We have no way to access it (easily)
- Outside of closed social networks, we have no way to share it

OUR DATA IS A LOT MORE VALUABLE THAN WE REALIZE

THE PERSONAL INFORMATION BANK (PIB)
Create a new PIB that gives consumers control over their data, lets them choose when + with whom to share it, and ultimately profit from it

OUR GUIDING PRINCIPLES

Personal data is universal and untethered, and will continue to grow over time.

No matter how large or lucrative it becomes, users will retain ownership and will remain at the centre of value creation.

data is collected, stored, used or shared without an opt-in.

FI will leverage existing capabilities wherever possible and be open to partnering for net new capabilities.

FIG. 4

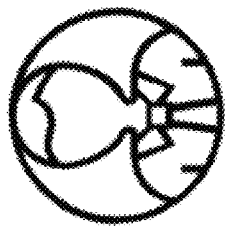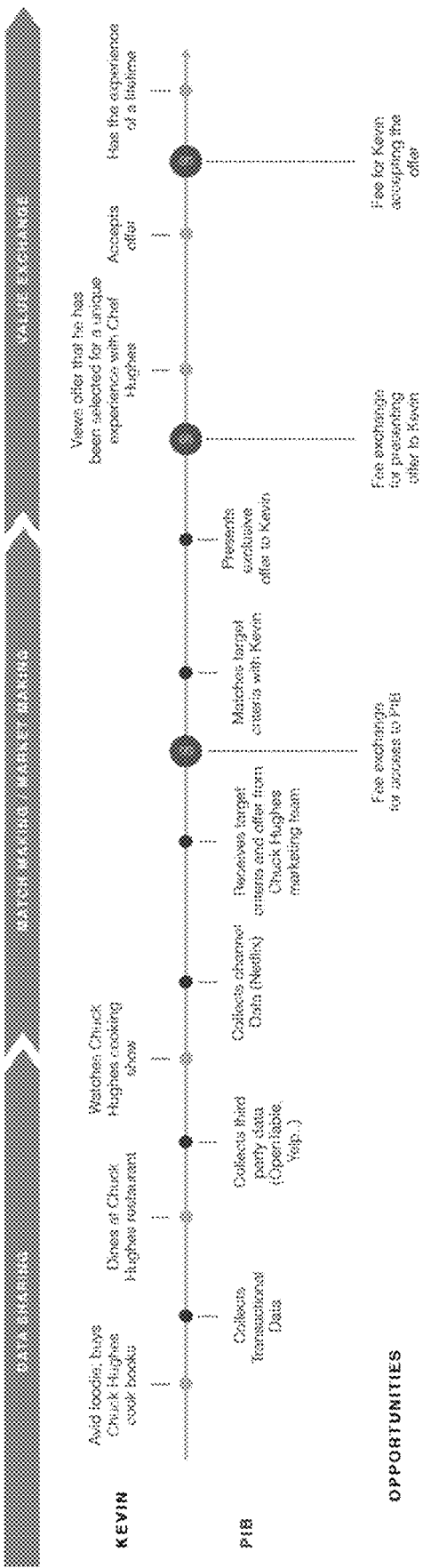
FIG. 9

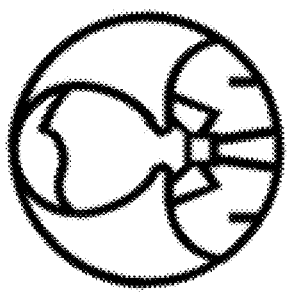
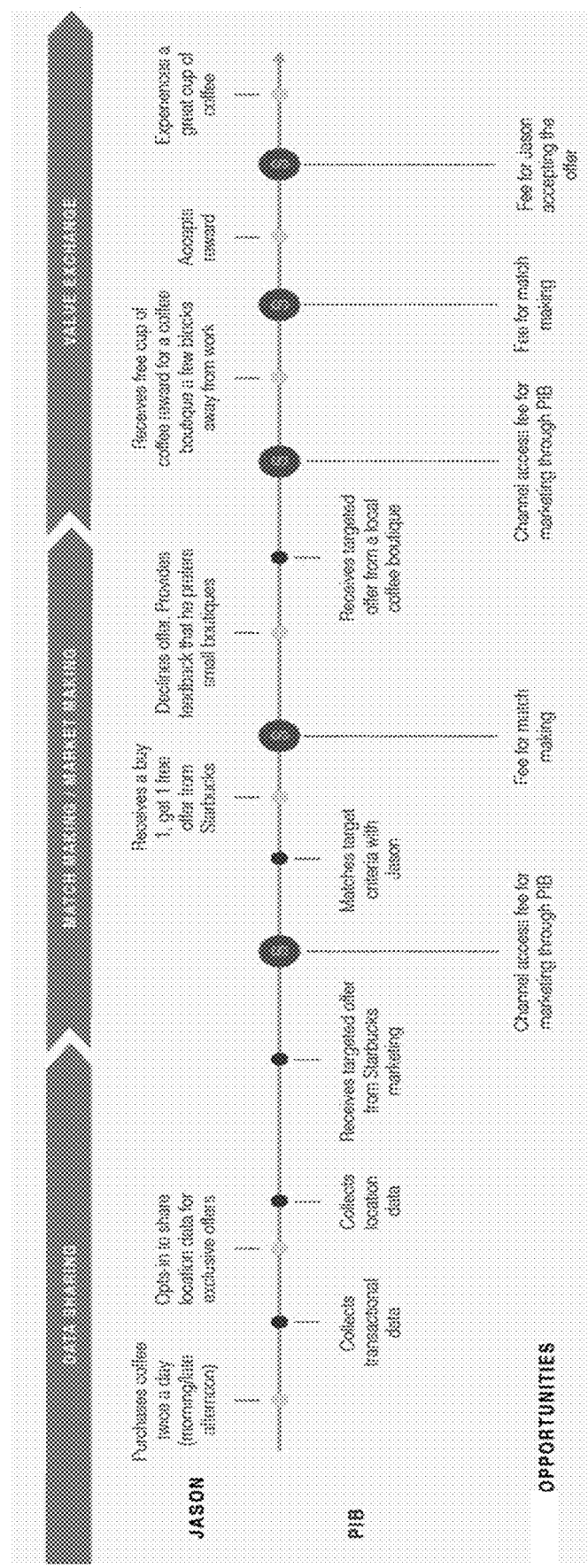
FIG. 12

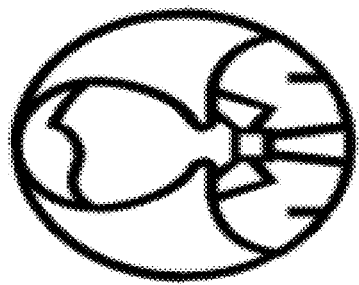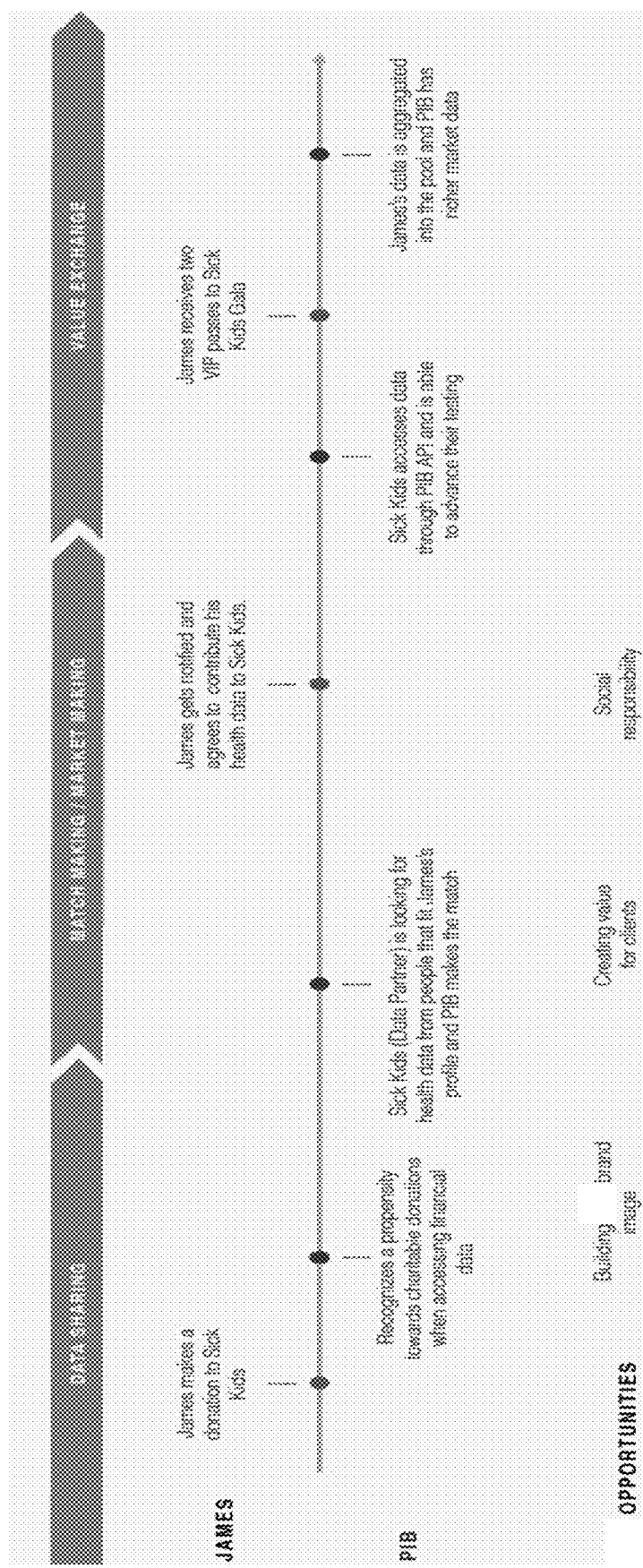
FIG. 14

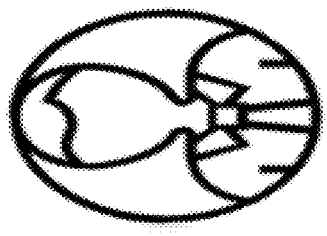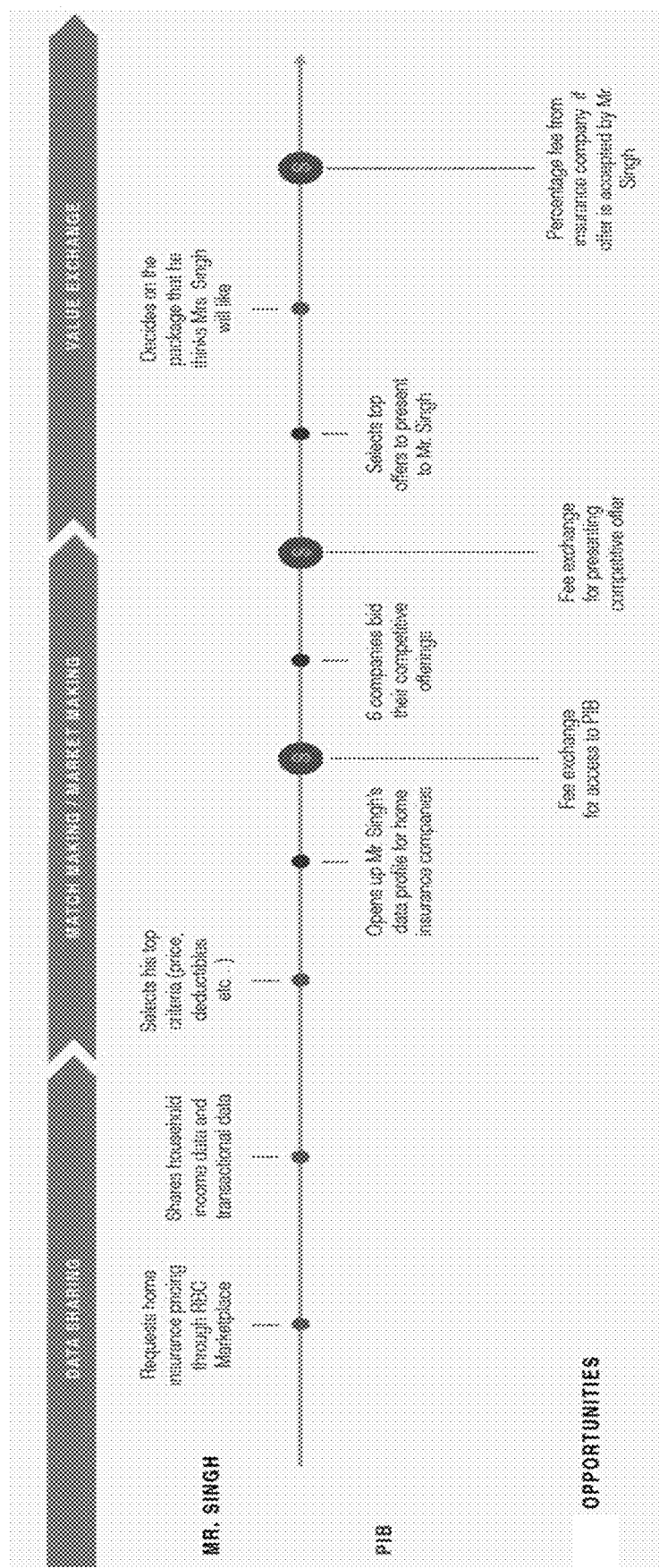
FIG. 16

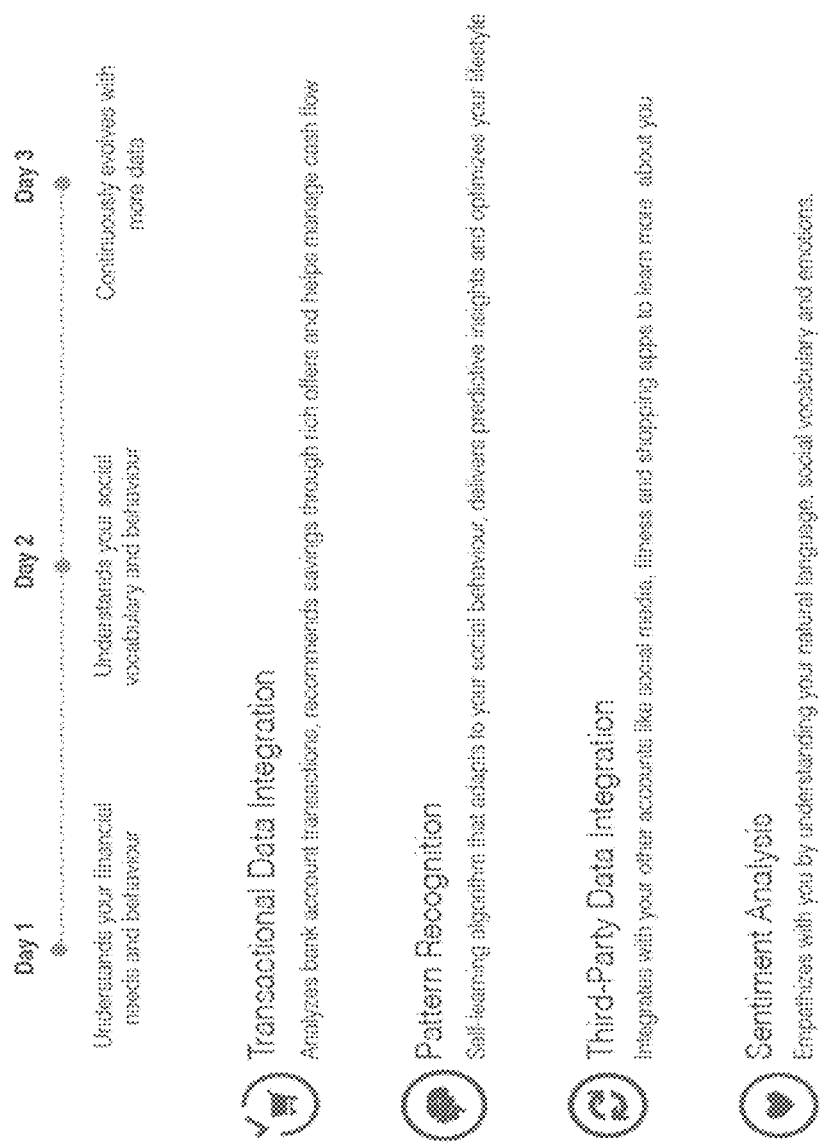
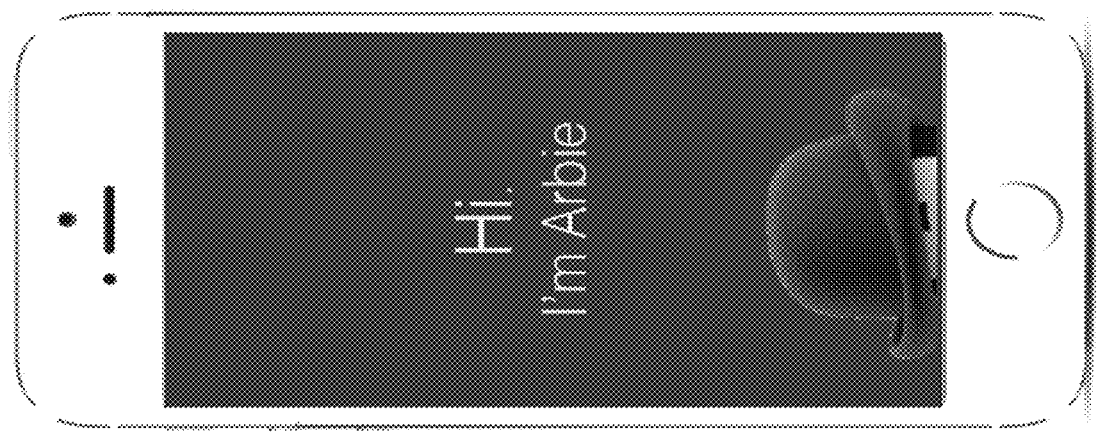
FIG. 17

FIG. 21

| Category | Company | Method of obtaining data | Market research | Product improvement | Consumer Targeting | Sale of consumer raw data | Easily import data from sources | Customers have control of data | Marketplace for data | Monetary | Offers | Loyalty/Rewards |
|---|---|---|---|---|---|---|---|---|---|---|---|---|
| Data Monetization Firms | Meeco | Users build a profile | | | | | | ● | ● | | ● | |
| | Datacoup | Data is imported | | | | | ● | ● | ● | ● | | ● |
| | Handshake | Users build a profile | | | | | | ● | ● | ● | | |
| | Enliken | Data is imported | | | | | | ● | ● | | | |
| Data Brokers/Market Researchers | Nielsen | Conduct surveys | ● | | ● | | | | | | | |
| | Kantar Media | Social media analysis | ● | | ● | | | | | | | |
| | AllianceData | Monitor transactions | ● | | ● | | | | | | | ● |
| | Axiom Consultancy | Market research | ● | ● | ● | | | | | | | |
| | Ctrlio | Data is imported | ● | | ● | | ● | | | | ● | |
| | DataLogix | Monitor transactions | ● | | ● | ● | | | | | | |
| | Epsilon Data Mgmt | Monitor transactions | ● | | ● | | | | ● | | | |
| | Acxiom | Monitor transactions | ● | | ● | | | | | | | ● |
| Hybrid | Facebook | Passive-on platform | | ● | ● | ● | | | | | | |
| | Amazon | Passive-on platform | | ● | ● | | | | | | ● | |
| | Twitter | Passive-on platform | | ● | ● | | | | | | | |
| | Mint | Passive-on platform | | ● | ● | | ● | | | ● | | |
| | Aspiration | Passive-on platform | ● | ● | ● | ● | ● | | | | | |
| | Nextbump | Passive-on platform | | ● | ● | | | ● | | ● | ● | ● |

01 ACCOUNTABILITY

Organizations should appoint someone to be responsible for privacy issues. They should make information about their privacy policies and procedures available to customers.

02 IDENTIFYING PURPOSES

Organization must identify the reasons for collecting your personal information before or at the time of collection.

03 CONSENT

Organizations should clearly inform you of the purposes for the collection, use or disclosure of personal information.

04 LIMITING COLLECTION

Organizations should limit the amount and type of the information gathered to what is necessary.

05 LIMITING USE

Organizations should use or disclose your personal information only for the purpose for which it was collected, unless you consent. They should keep your personal information only as long as necessary.

06 ACCURACY

Organizations should keep your personal information as accurate, complete and up to date as necessary.

07 SAFEGUARDS

Organizations need to protect your personal information against loss or theft by using appropriate security safeguards.

08 OPENNESS

An organization's privacy policies and practices must be understandable and easily available.

09 INDIVIDUAL ACCESS

Generally speaking, you have a right to access the personal information that an organization holds about you.

10 CHALLENGING COMPLIANCE

Organizations must develop simple and easily accessible complaint procedures.

FIG. 22

POLICY → TOKENDEF STATEMENT*

TOKENDEF → ε | token { WAPDEF* };

WAPDEF → TYPE IDENT_LIST;

IDENT_LIST → IDENT | IDENT IDENT_LIST, IDENT

TYPE → BASIC_TYPE | BASIC_TYPE[NUM]

BASIC_TYPE → float | int[NUM] | unsigned int[NUM]

STATEMENT → WAPDEF | EXPR

EXPR → NUM | IDENT | IDENT[NUM] | BASE64 | STRING | {EXPR} | UNARY_OP | BINARY_OP | EXPR : EXPR ? EXPR : EXPR

FIG. 39

SYSTEM AND METHOD FOR STORING AND DISTRIBUTING CONSUMER INFORMATION

CROSS-REFERENCE TO RELATED APPLICATIONS

This application is a non-provisional of and claims all benefit including priority to U.S. Provisional Patent Application 62/702,871, filed Jul. 24, 2018.

This application is also a continuation-in-part of U.S. patent application Ser. No. 16/424,242, filed May 28, 2019, which is a non-provisional of and claims priority to:

U.S. Provisional Application No. 62/677,133 filed May 28, 2018;

U.S. Provisional Application No. 62/691,406 filed Jun. 28, 2018;

U.S. Provisional Application No. 62/697,140 filed Jul. 12, 2018;

U.S. Provisional Application No. 62/806,394 filed Feb. 15, 2019; and

U.S. Provisional Application No. 62/824,697 filed Mar. 27, 2019.

This application is also a continuation-in-part of U.S. patent application Ser. No. 16/503,154, filed Jul. 3, 2019, which is a non-provisional of and claims priority to:

U.S. Application No. 62/693,680, dated 3 Jul. 2018;

U.S. Application No. 62/702,684, dated 24 Jul. 2018, and

U.S. Application No. 62/839,408, dated 26 Apr. 2019.

All of the above references are hereby incorporated by reference.

FIELD

The present disclosure generally relates to the field of consumer information, and more specifically, to storing and distributing entity (e.g. consumer) information and entity data.

BACKGROUND

Today, consumers may not have adequate control nor access to their own information including transactional data relating to past purchases, and other types of consumer information. In addition, the consumer information may not be properly protected when vendors access the information for commercial purposes.

Improved systems and methods for storing and distributing consumer data are therefore desired.

SUMMARY

In accordance with an aspect, there is provided a system that is configured to give consumers access and control of their own information. The system may include: a data storage unit storing a user profile; and a processor configured with computer readable instructions stored in the data storage unit to: receive and store one or more sets of consumer data, each set of consumer data having a metadata identifying a source of the set of consumer data; categorize the one or more sets of consumer data; present the one or more sets of consumer data through a user interface to the consumer; receive a user request to transmit at least one of the one or more sets of consumer data to a client; transmit the at least one set of consumer data to the client; and make a payment to the consumer in view of the at least one set of consumer data transmitted to the client.

In accordance with another aspect, there is provided a computer implemented system for controlling access to data associated with an entity, the system comprising: a data storage device having a protected memory region; one or more processors, at least one of which is operable in the protected memory region and configured for: storing a secret key associated with the entity in a portion of the protected memory region associated with the entity; upon receiving entity data, storing the entity data in the portion of the protected memory region associated with the entity; and upon receiving an access grant signal, generating a smart contract, the smart contract defining the entity data to be accessed and a recipient of the entity data to be accessed, the smart contract configured to trigger a message for communicating information associated with the entity data to a recipient device upon satisfaction of at least one verification condition.

In accordance with another aspect, there is provided a method for controlling access to data associated with an entity, the system comprising: storing a secret key associated with the entity in a portion of a protected memory region associated with the entity; upon receiving entity data, storing the entity data in the portion of the protected memory region associated with the entity; and upon receiving an access grant signal, generating a smart contract, the smart contract defining the entity data to be accessed and a recipient of the entity data to be accessed, the smart contract configured to trigger a message for communicating information associated with the entity data to a recipient device upon satisfaction of at least one verification condition.

In accordance with another aspect, there is provided a computer readable medium or media having stored thereon machine interpretable instructions, which when executed, cause at least one processor to store a secret key associated with the entity in a portion of a protected memory region associated with the entity; upon receiving entity data, store the entity data in the portion of the protected memory region associated with the entity; and upon receiving an access grant signal, generate a smart contract, the smart contract defining the entity data to be accessed and a recipient of the entity data to be accessed, the smart contract configured to trigger a message for communicating information associated with the entity data to a recipient device upon satisfaction of at least one verification condition.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIG. 4 is a description of some guiding principles illustrating aspects of a personal information bank, according to some embodiments.

FIG. 9 is an example timeline for an example use case, according to some embodiments.

FIG. 12 is another example timeline for an example use case, according to some embodiments.

FIG. 14 is an example timeline for an example use case, according to some embodiments.

FIG. 16 is yet another example timeline for an example use case, according to some embodiments.

FIG. 17 is an illustration of an example rendering for a personal assistant on a mobile device, according to some embodiments.

FIG. 21 is an example table illustrating entities related to various channels of obtaining data, according to some embodiments.

FIG. 22 includes a description of various aspects of data collection, according to some embodiments.

FIG. 39 is an example C-based proof request description language, according to some embodiments.

DETAILED DESCRIPTION

Figure 1:
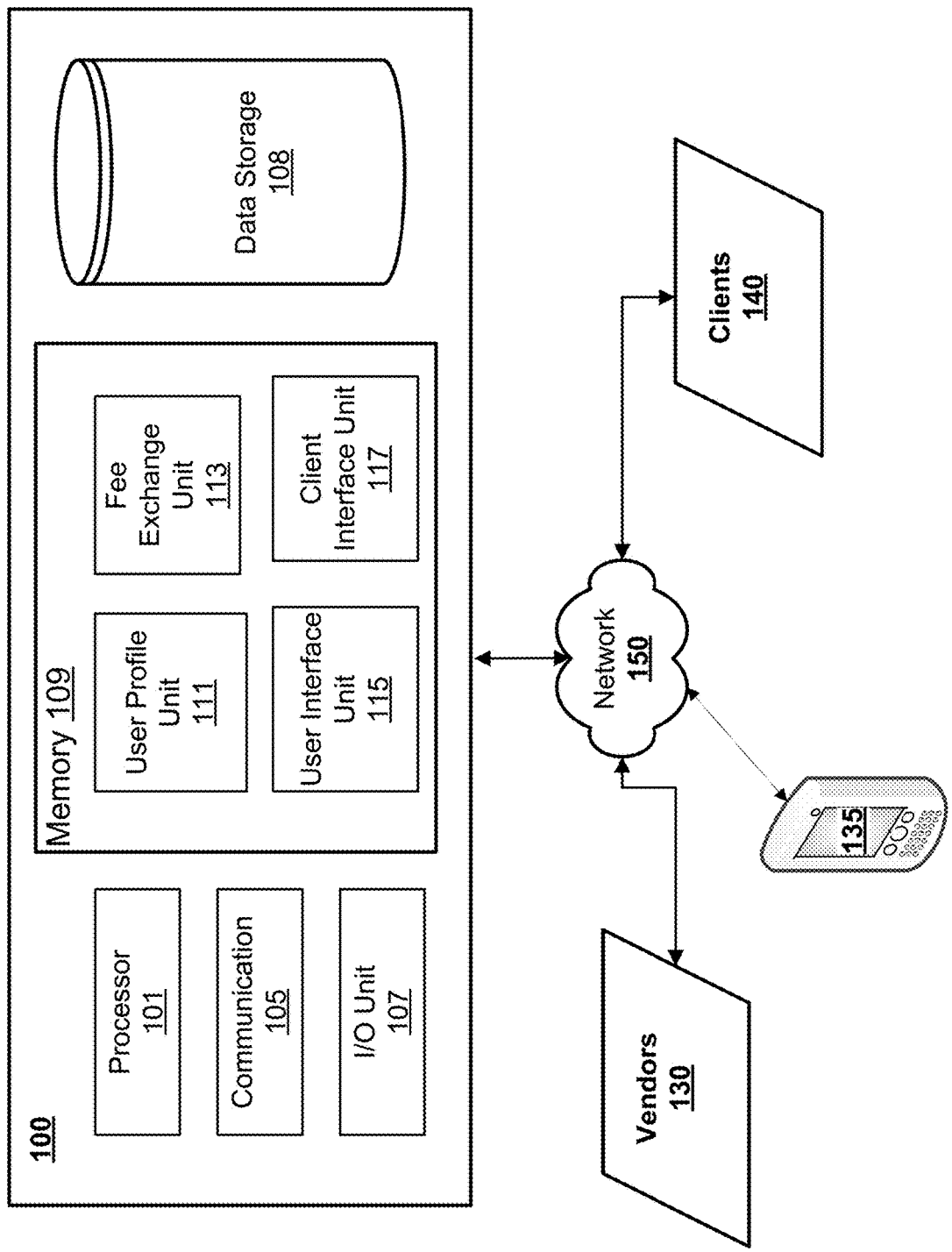
FIG. 1 shows an example system of storing and distributing consumer information, in accordance with one embodiment.

It will be appreciated that numerous specific details are set forth in order to provide a thorough understanding of the exemplary embodiments described herein. However, it will be understood by those of ordinary skill in the art that the embodiments described herein may be practiced without these specific details. Furthermore, this description is not to be considered as limiting the scope of the embodiments described herein in any way, but rather as merely describing implementation of the various example embodiments described herein.

The embodiments are implemented using technological devices, including computers, having specialized components and circuitry that are adapted for improved security and privacy of data sets. As noted herein, some embodiments are directed to a secure enclave data processor and uses thereof in conjunction with a computer readable memory having a protected memory region.

The secure enclave data processor interfaces with the protected memory region to securely store and encrypt data sets received from a particular data source (e.g., from a data issuing/official/validated/trusted organization) that may, in some embodiments, be encrypted with a key specific to the organization or data source. In an embodiment, the key may be pre-generated and associated with the organization or data source. In another embodiment, the system may include a key generator which performs a key generation ceremony when a new key is required to load data sets into the protected memory region.

Embodiments of methods, systems, and apparatus are described through reference to the drawings.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

Disclosed herein is a system for storing, protecting and distributing consumer information. Entity data such as consumer information herein may refer to various types of information related to a consumer, such as name, age, occupation, salary, interests, marital status, address, professional association, political affiliation and so on. Consumer information may also include financial data, transactional data and social network data. The term "consumer information" may be used interchangeably with the term "consumer data" throughout the disclosure.

Once stored, the consumer information may be protected. In some cases, the consumer information may be categorized and classified. The stored information relating to a consumer may be viewed and managed by the consumer through a user interface provided by the system. The consumer can choose to share part of the consumer data such as transaction history with one or more clients of the system, for example, a consumer may monetize a transaction history with a particular vendor by choosing to sell it to a client who may be the same industry as the vendor. The consumer may also provide his or her history of shopping at Nike® to get a great experience at Nike®, or a competitor of Nike®. The information and data shared with clients of the system may or may not be anonymous. In some embodiments, the data shared with a client (e.g. Nike®) may be partially anonymous, in that the client would not know anything else about the consumer other than the shared data. For example, if the consumer chooses to use anonymous credentials when sharing data with Nike®, Nike® can provide the consumer with offers related to a shopping experience, without having to know everything else about the consumer.

FIG. 1 is a schematic block diagram of a physical environment for a system 100 for storing and distributing consumer information.

System 100 may be software (e.g., code segments compiled into machine code), hardware, embedded firmware, or a combination of software and hardware, according to various embodiments.

System 100 is configured to receive one or more data sets representative of consumer data. In some embodiments, some of the one or more sets of consumer data may be received from one or more vendor systems 130 or one or more user devices 135 through network 150. System 100 may connect with one or more client systems 140 to share one or more sets of consumer data with the client(s), when instructed or allowed by the consumers.

A vendor system 130 may be a system at or connected to a vendor that interacts with the consumer in some capacity. For example, a vendor may be a physical store, a restaurant, a social network website, a media, a brand, a workplace, and so on. In some embodiments, a vendor system 130 may have pre-registered with system 100 to share information regarding one or more consumers, provided that the consumers have given explicit consent to share the information. A consent may be given when a consumer signs up with system 100 as a user, and has selected the specific vendor as one source of consumer information. Each time a consumer interacts with the vendor, some type of electronic data may be stored by vendor system 130. The electronic data may include transactional data generated during a purchase transaction, fitness data generated by a fitness device wore by the consumer, items ordered by the consumer at a restaurant, books bought by the consumer at a bookstore, and so on. If the consumer is registered with system 100 and the vendor has been selected as a vendor that can share information regarding the consumer, then the electronic data may be transmitted to system 100 for storage and further processing.

A consumer may operate a user device 135 such as a mobile phone or a tablet. The user device 135 may be pre-registered with system 100 to share information regarding the consumer. For example, a mobile device 135 may has information regarding when the consumer browses internet, the websites visited frequently by the consumer, and the mobile applications most frequently used by the consumer, and so on. The information may be transmitted to system 100 if the consumer has given explicit consent.

A client system 140 may be a system configured to receive information from system 100. In some embodiments, a client system 140 may need to pre-register with system 100 prior to receiving any consumer information. Examples of client systems 140 may include financial institutions, stores, e-commerce websites, social network websites, and so on. Client systems 140 may in some embodiments be vendor systems 130.

A processor or processing device 101 can execute instructions in memory 109 to configure various components or units 111, 113, 115, 117. A processing device 101 can be, for example, any type of general-purpose microprocessor or microcontroller, a digital signal processing (DSP) processor, an integrated circuit, a field programmable gate array (FPGA), a reconfigurable processor, or any combination thereof.

Each communication interface 105 enables the system 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Each I/O unit 107 enables the system 100 to interconnect with one or more input devices, such as a keyboard, mouse, camera, touch screen and a microphone, or with one or more output devices such as a display screen and a speaker.

Data storage 108 can be, for example, one or more NAND flash memory modules of suitable capacity, or may be one or more persistent computer storage devices, such as a hard disk drive, a solid state drive, and the like. In some embodiments, data storage 108 comprises a secure data warehouse configured to host user profile data.

Memory 109 may include a suitable combination of computer memory such as, for example, static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

A user profile unit 111 may be configured to store information about a consumer, including consumer data received from vendor system 130, user devices 135 and/or client systems 140. In some embodiments, the information may be further categorized or classified based on one or more schemes. For example, one or more sets of consumer data may contain metadata or tags indicating a source of the consumer data. The source of a consumer data may be the vendor system 130 or user device 135. For example, a source of a consumer data set may be Nike®.

The consumer data may also be categorized based on a default set of categories such as food, clothing, social media, personal information, financials, and so on. System 100 may be configured to classify the consumer data based on the identified source (e.g. vendor) of consumer data, or other indicators in a transaction such as items purchased in a transaction.

Once categorized, the one or more sets of consumer data may be stored in the data storage 108 and associated with the corresponding user profile. In some embodiments, the one or more sets of consumer data may be part of the corresponding user profile.

A fee exchange unit 113 may be configured to determine when a fee is paid to a party and facilitates the fee payment accordingly. For example, fee exchange unit 113 may be configured to determine that a fee payment is required when a client system 140 requests to sign up with system 100 for receiving consumer information. For another example, fee exchange unit 113 may be configured to determine that a fee payment to system 100 or a consumer is required when a client system 140 has received, or is about to receive, requested consumer information of the consumer. Fee exchange unit 113 may track fee payments and approves pending consumer data sharing requests in response to the fee payments.

A user interface unit 115 may be configured to include an API unit configured for providing or facilitating an interface, such as a user interface, to connect to external databases and systems (e.g. user device 135), so that a consumer may access, view and manage his or her consumer information. Through the user interface, the consumer may send requests for sharing one or more sets of consumer data to one or more client systems 140.

A client interface unit 117 may be configured to include an API unit configured for providing or facilitating an interface, such as a user interface, to connect to external databases and systems (e.g. client systems 140), so that a client system may access, view and manage shared consumer information. Through the user interface, the client system 140 may send requests for one or more sets of consumer data from one or more consumers and make fee payments for said requests, if required.

In some embodiments, system 100 may include an API unit (not illustrated) configured for providing or facilitated an interface, such as a user interface, for system administrators. The interface may allow one or more administrators to configure the settings of system 100, such as for example, fee payment schemes for one or more client systems 140.

Figure 2:
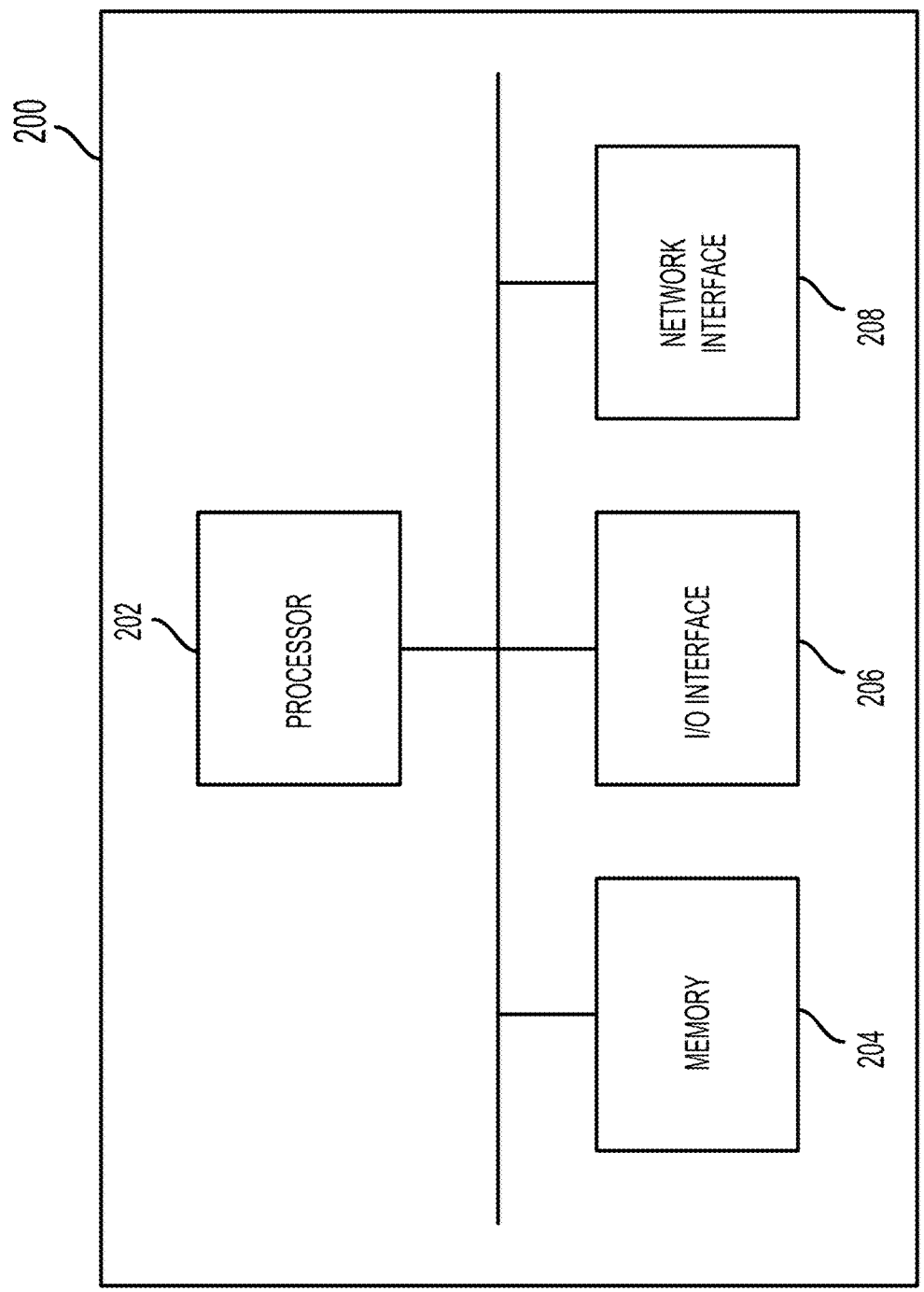
FIG. 2 is an example block diagram of an example computing device, according to some embodiments.

FIG. 2 is a schematic block diagram of an example computing device 200 implementing system 100, according to some embodiments. As depicted, computing device 200 includes at least one processor 202, memory 204, at least one I/O interface 206, and at least one network interface 208.

Each processor 202 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 204 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 206 enables computing device 200 to interconnect with one or more input devices, such as a keyboard, mouse, camera, touch screen and a microphone, or with one or more output devices such as a display screen and a speaker.

A networking interface 208 may be configured to receive and transmit data sets representative of the machine learning models, for example, to a target data storage or data structures. The target data storage or data structure may, in some embodiments, reside on a computing device or system such as a mobile device.

Figure 3:
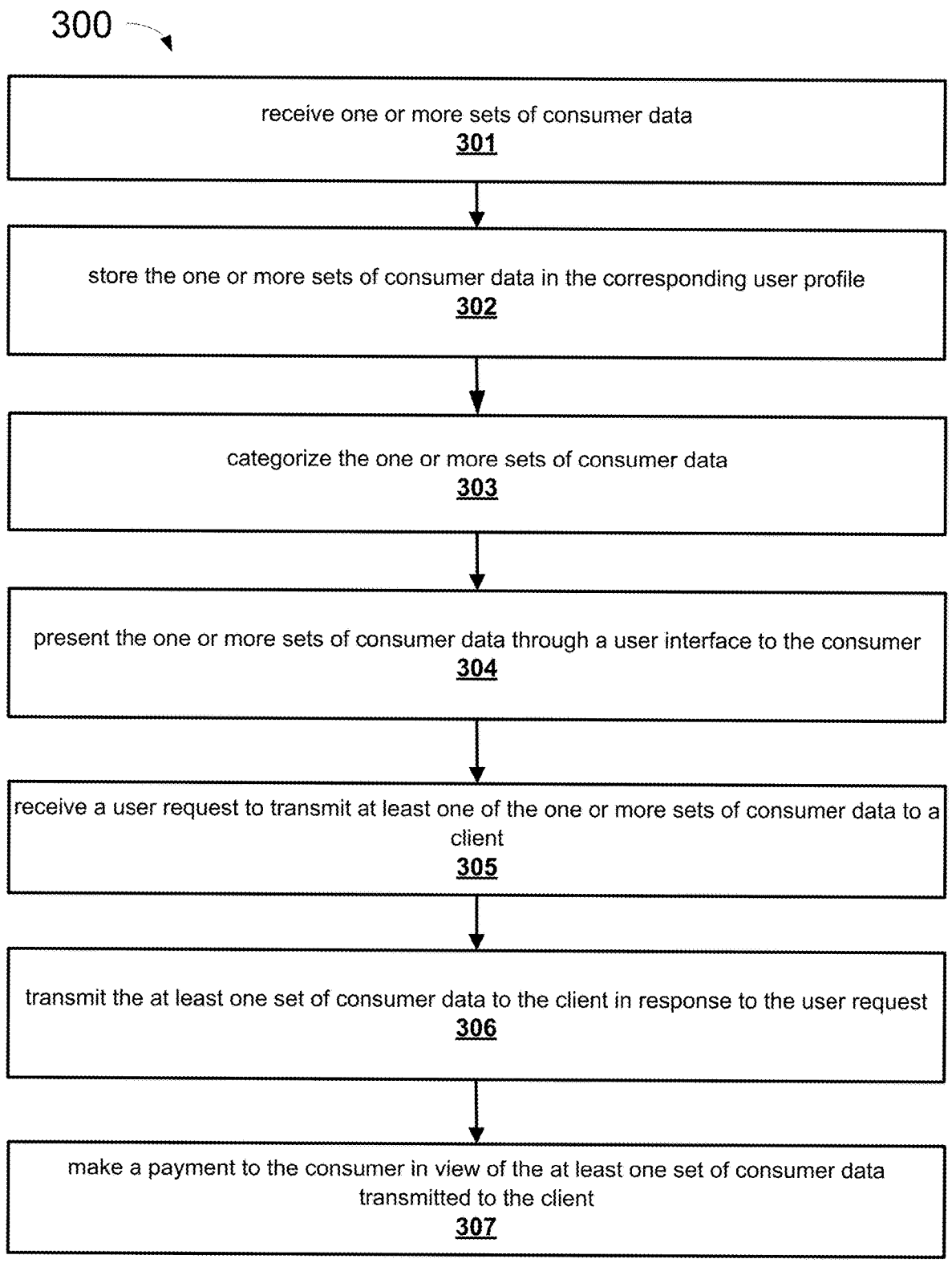
FIG. 3 is an example flow chart representing a process performed by the example system, according to some embodiments.

FIG. 3 shows an example process 300 performed by system 300. At step 301, a system may receive one or more sets of consumer data. In some embodiments, each set of consumer data may have a metadata identifying a source of the set of consumer data. At step 302, the system may store the one or more sets of consumer data in the user profile. At step 303, the system may categorize the one or more sets of consumer data. At step 304, the system may present the one or more sets of consumer data through a user interface to the consumer. At step 305, the system may receive a user request to transmit at least one of the one or more sets of consumer data to a client. At step 306, the system may transmit the at least one set of consumer data to the client in response to the user request. At step 307, the system may make a payment to the consumer in view of the at least one set of consumer data transmitted to the client.

Referring now to FIG. 4, which is a description of some guiding principles illustrating aspects of a personal information bank, according to some embodiments. For example, consumers (e.g. users) retain ownership of consumer information and no data is collected, stored, used or shared without explicit opt-in from consumers.

Figure 5:
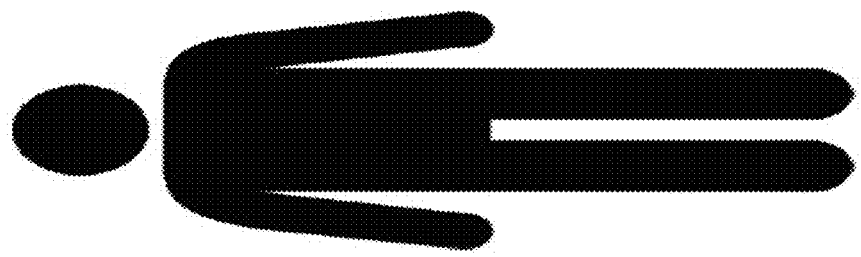
FIG. 5 shows example features of the system, according to some embodiments.

FIG. 5 shows example features of system 100, such as control and security of consumer data, and rewards for participating in system 100. For example, the consumers can deposit online and offline data to a trusted and secure data storage provided by system 100, the consumers also can choose which data to share with various venders, and which brand offers the consumer wishes to receive. The consumers can get rewarded for sharing consumer data, such as monetary compensation. The consumers may also access unique experiences with chosen brands, based on the shared consumer data.

Figure 6:
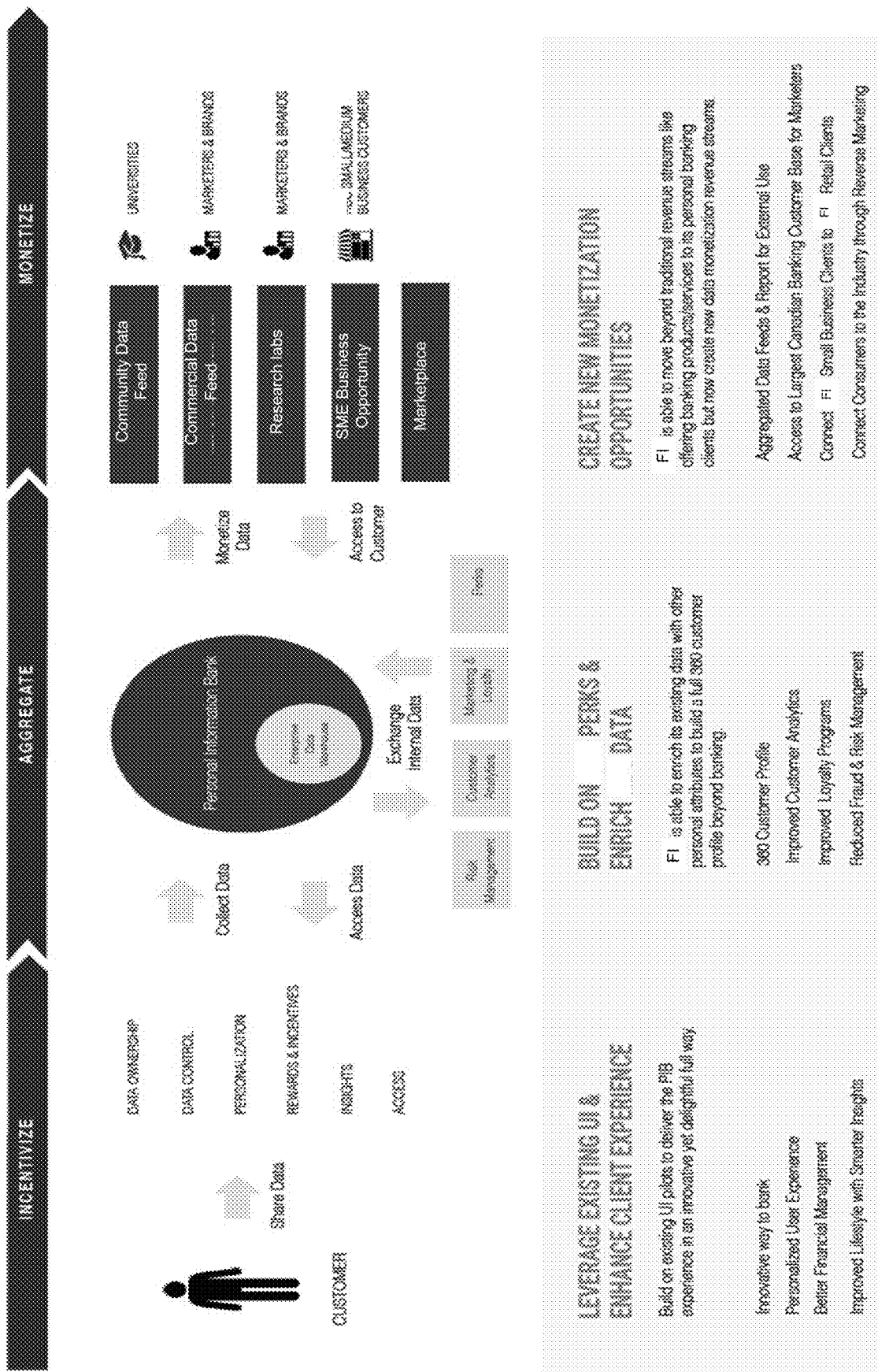
FIG. 6 is a visualization of aspects of the personal information bank according to some embodiments.

FIG. 6 is a visualization of aspects of the personal information bank according to some embodiments. For example, system 100 may include a secure data storage 108 known as Personal Information Bank, which may include an enterprise data warehouse. A consumer may choose to share his or her data and store the data at the Personal Information Bank. The consumer can monetize from the shared data by sharing the data with selected companies (e.g. client systems 140) such as universities, marketers and brands, and other businesses.

Figure 7:
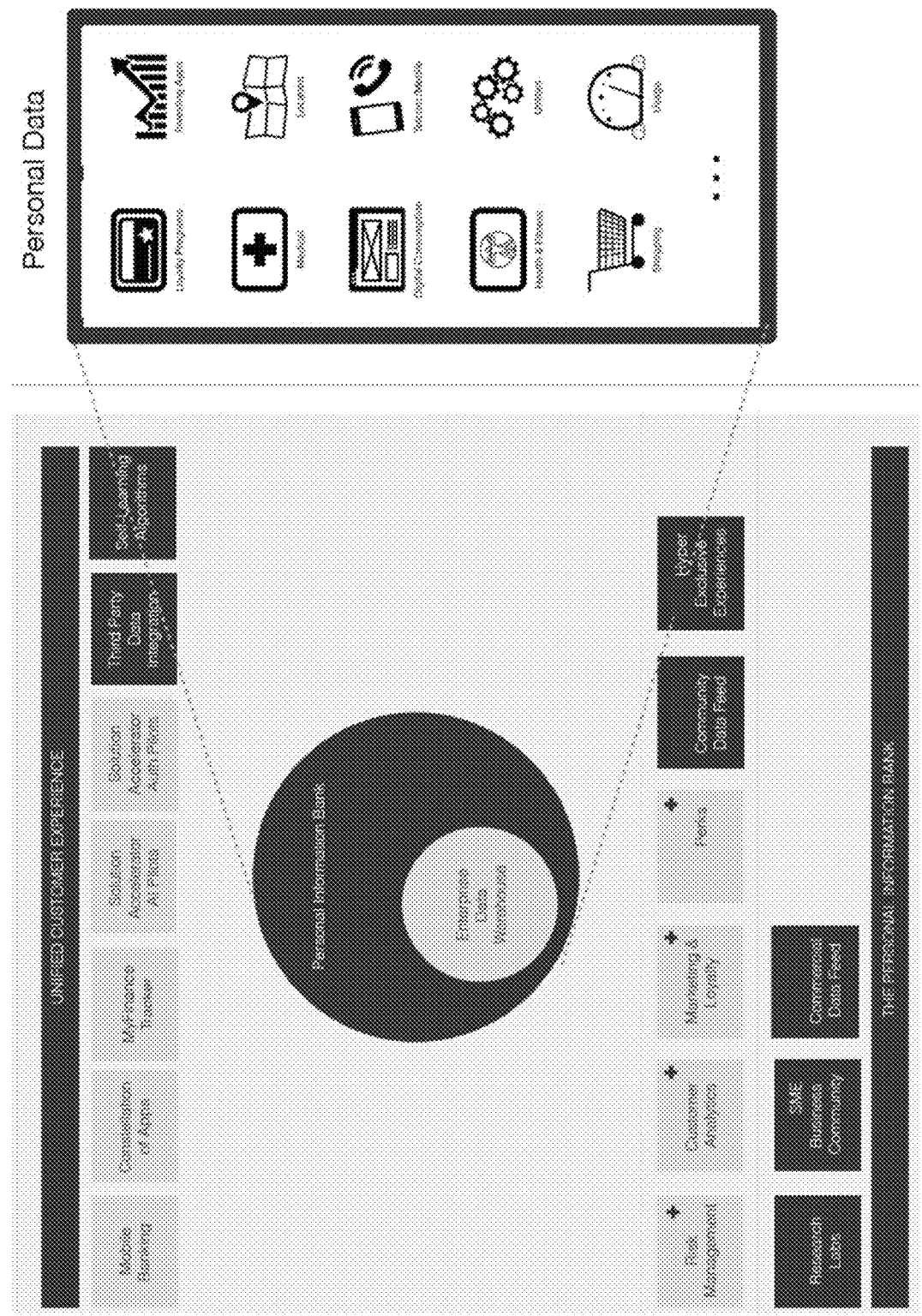
FIG. 7 is an illustration of a unified customer experience in relation to personal data, according to some embodiments.

FIG. 7 is an illustration of a unified customer experience in relation to personal data, according to some embodiments. As shown, consumer data may include personal data, which may include one or more of: loyalty program data, mobile (e.g. investing) application data, medical data, location data, digital consumption data, telecom mobile data, hearts and fitness data, utilities data, shopping data and usage data.

Figure 8:
FIG. 8 is a series of pictograms showing scenarios in relation to individuals at different stages of life and contextual situations, according to some embodiments.

FIG. 8 is a series of pictograms showing scenarios in relation to individuals at different stages of life and contextual situations, according to some embodiments. Consumers in various stages of life may use system 100 to store and distribute personal information and derive benefits therefrom.

FIG. 9 is an example timeline for an example use case, according to some embodiments. A consumer "Kevin Holland" may choose to share certain personal information such as name, age, relationship status, occupation and income. He may also share consumer data with vendor systems 130 such as restaurants, bookstores and video streaming websites. System 100 may collect or receive various consumer data such as transactional data with book stores, third party data on various social media websites, data from video streaming websites and data from certain marketing teams in order to generate targeted promotions or offers for consumer Kevin. Kevin may be presented with one or more of such offers and he may choose to accept an offer and participate in an experience. Throughout this process, fee payments may be requested and accepted by system 100 from client systems 140 for participating in system 100 and receiving Kevin's consumer data.

Figure 10:
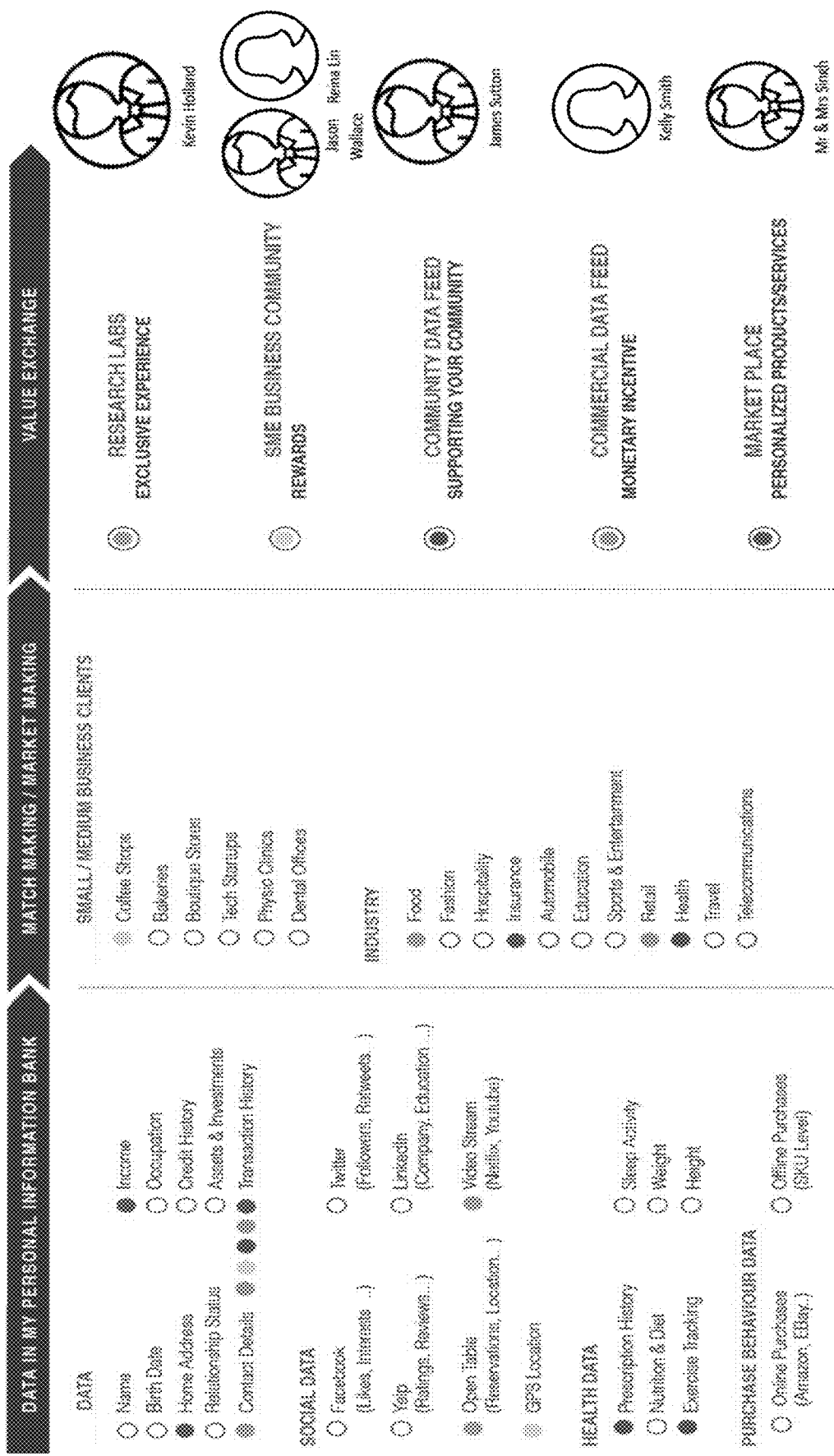
FIG. 10 shows example data sharing options for several example use cases, according to some embodiments.
Figure 11:
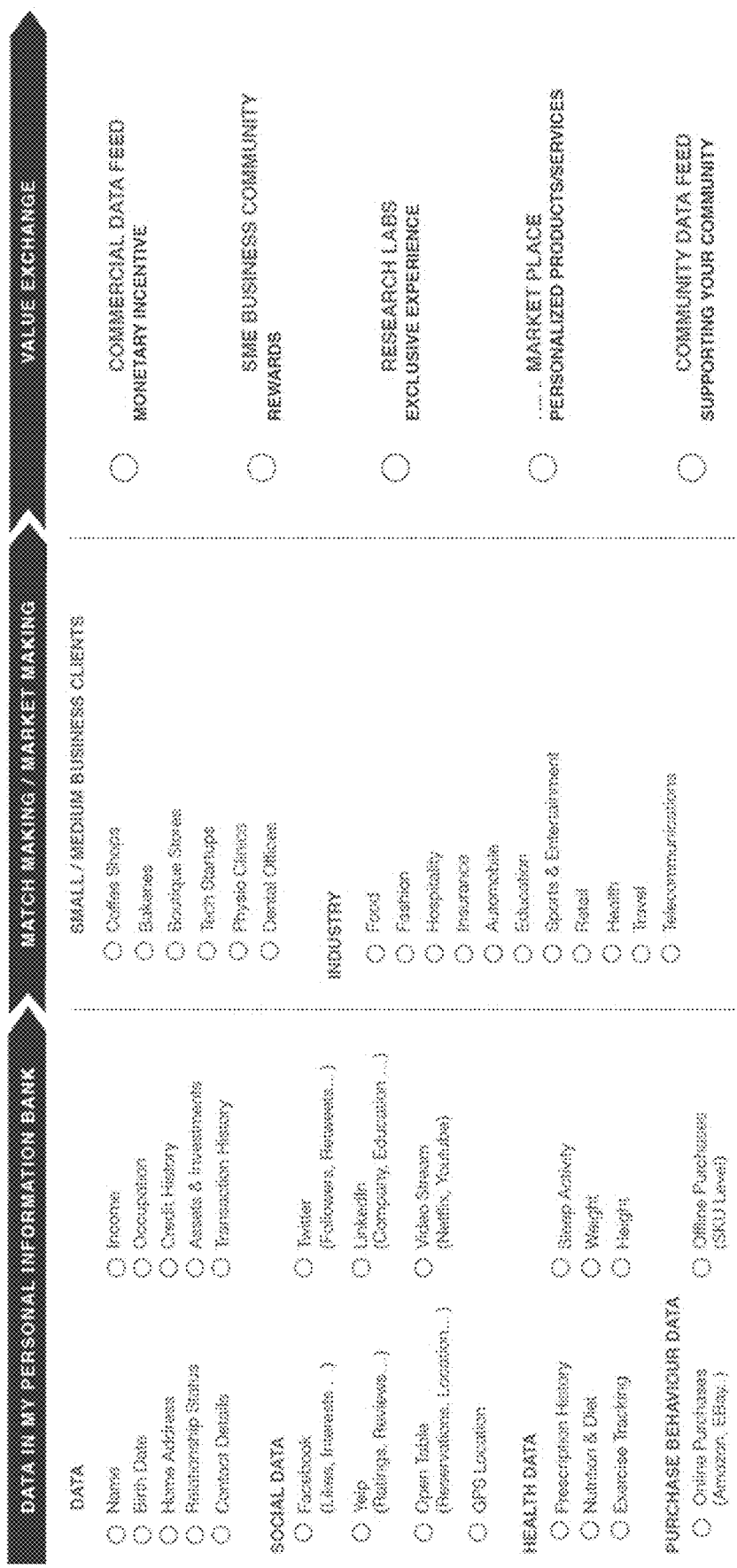
FIG. 11 also shows example data sharing options for several example use cases, according to some embodiments.

FIGS. 10 and 11 show example data sharing options for several example use cases, according to some embodiments. As shown, through a user interface provided by user interface unit 115, a consumer may choose one or more types of consumer information for sharing with one or more client systems 140. For example, a consumer may choose to share home address, income and transaction history by clicking on one or more radio buttons. The consumer may also choose to share social media data from GPS on user device 135, OpenTable and video streaming websites. The consumer may choose to share health data such as prescription history and exercise tracking. The consumer may further choose to share purchase data such as online purchases from Amazon and EBay. In addition, the consumer may choose to accept marketing offers from client systems 140 in one or more industries such as food, insurance, retail and health. In addition, the consumer may specify types of rewards and incentives for data sharing, such as research labs, community data feed, commercial data feed for monetary incentive and market place offers for personalized products or services.

FIG. 12 is an example timeline for an example use case by consumer "Jason Wallace", according to some embodiments. The consumer Jason Wallace may choose to share one or more data sets of consumer information, similar to the consumer Kevin Hollard as described above. In this example, Jason may receive targeted offers from Starbucks® as he has shared information regarding coffee purchase habit with Starbucks®. Starbucks® may pay a channel access fee to system 100 for marketing through system 100. Starbucks® may also pay a fee for making an offer to Jason. A local coffee boutique, similarly, may access Jason's coffee purchase data and makes an offer to Jason with payment of appropriate fees to system 100. The fee payments to system 100 may be in some cases split with Jason. Jason may also accept the offer from Starbucks® or the local coffee boutique and experience a great cup of coffee, while accepting a monetary payment from system 100 for accepting the offer.

Figure 13:
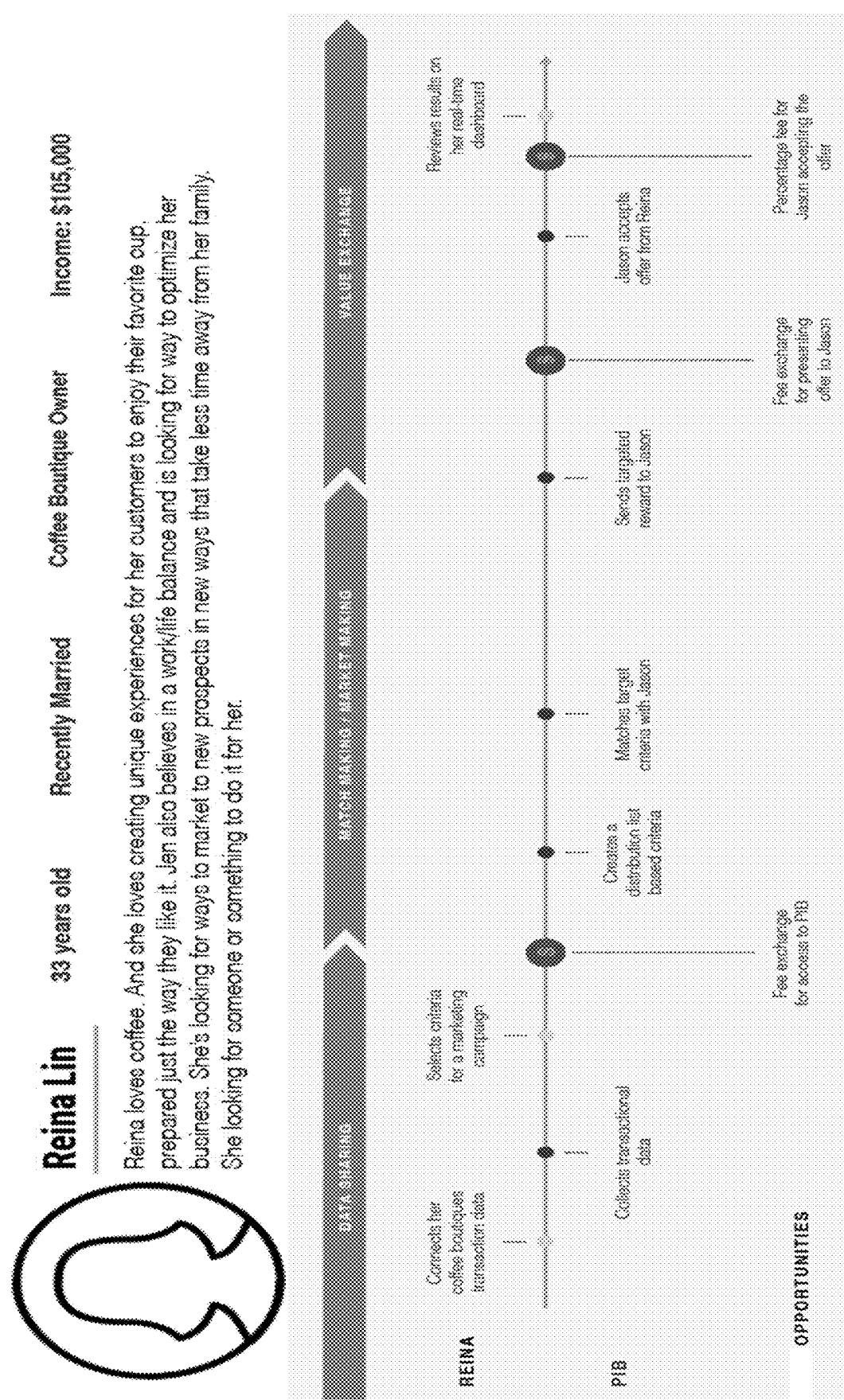
FIG. 13 is yet another example timeline for an example use case, according to some embodiments.

FIG. 13 is yet another an example timeline for an example use case, according to some embodiments. A client "Reina Lin" may operate a small business such as a coffee shop, which has a client system 140. The client system 140 may pay a fee to access system 100 in order to collect certain transactional data from consumers. Reina may select criteria for a marketing campaign and create a distribution list based criteria. System 100 may match Reina's coffee shop with a consumer (e.g. Jason) based on Jason's shared information. Reina's client system 140 may pay a certain amount of fees to system 100 for accessing the consumer data and making an offer to consumers.

FIG. 14 is an example timeline for an example use case, according to some embodiments. James Sutton, a consumer, may also make use of system 100 based on his life experience and interests. James may make a donation to a children's hospital and the donation transaction may be stored in system 100. System 100 may recognize a trend towards charitable donations when accessing financial data, and alert client system 140 of a children's hospital regarding James. James may receive targeted charity campaigns from the children's hospital, which may receive further donations from James as a result of the targeted campaigns. James may also receive reward from the hospital for being a frequent donor.

Figure 15:
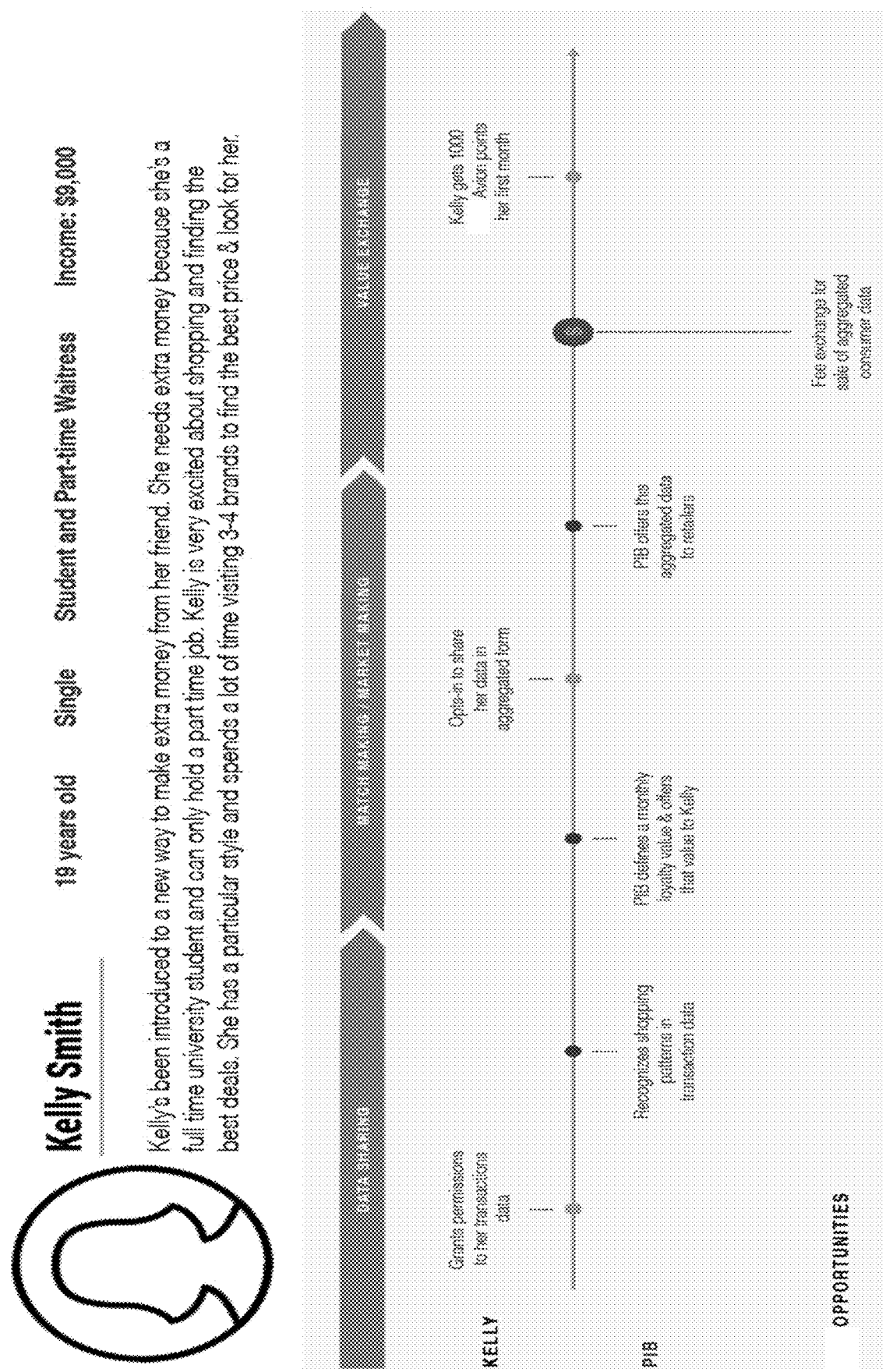
FIG. 15 is another example timeline for an example use case, according to some embodiments.

FIG. 15 is another example timeline for an example use case, according to some embodiments. A consumer "Kelly Smith" may store and grant permissions to her transaction data on system 100. System 100 may recognize shopping patterns in her shopping data, defines a monthly loyalty value, and offers the value to Kelly. Kelly may opt-into sharing her data in aggregated form (e.g. anonymized and grouped with other consumers' data), which may be offered to retailers. Retailers may pay a fee in order to access the aggregated consumer data. In return, Kelly may receive a reward, such as a loyalty program points, for agreeing to share her data in aggregated form.

FIG. 16 is yet another example timeline for an example use case, according to some embodiments. A couple "Mr. and Mrs. Singh" may be married and have a combined income of 150,000 a year. They may be look for a cheaper home insurance and request home insurance quote through system 100. The couple may choose to share household income data and transactional data with home insurance companies, and select top criteria for home insurance. System 100 may open up the Mr. Singh's data profile for home insurance companies, which may pay a fee to access Mr. Singh's information through system 100. The home insurance companies may bid each other to generate best offer for Mr. Singh, and pay a fee for presenting the best offers to Mr. Singh. System 100 may select and present the most suitable offers to Mr. Singh and if the offer is accepted by Mr. Singh, receive a further fee payment from the company that has received the acceptance from the consumer.

FIG. 17 is an illustration of an example rendering for a personal assistant on a mobile device, according to some embodiments. The mobile device may be an example of user device 135. The mobile device may have a mobile application installed for accessing system 100. The mobile application may be configured to show a user interface and present a consumer's data as stored and managed by system 100. The mobile application may have features such as transaction data integration, pattern recognition, third-party data integration and consumer data analysis.

Figure 18:
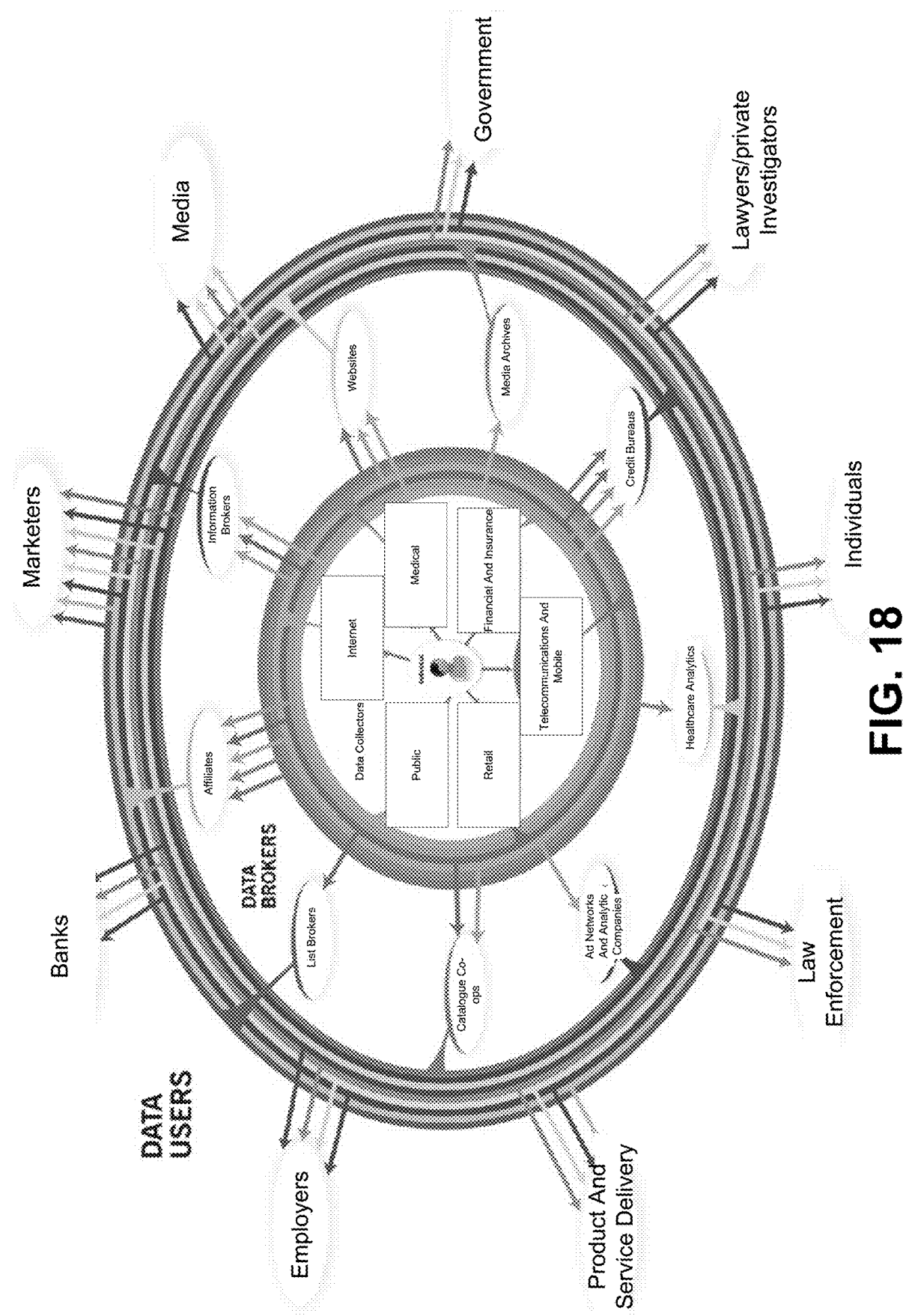
FIG. 18 is a flow diagram of example data transfers, according to some embodiments.
Figure 19:
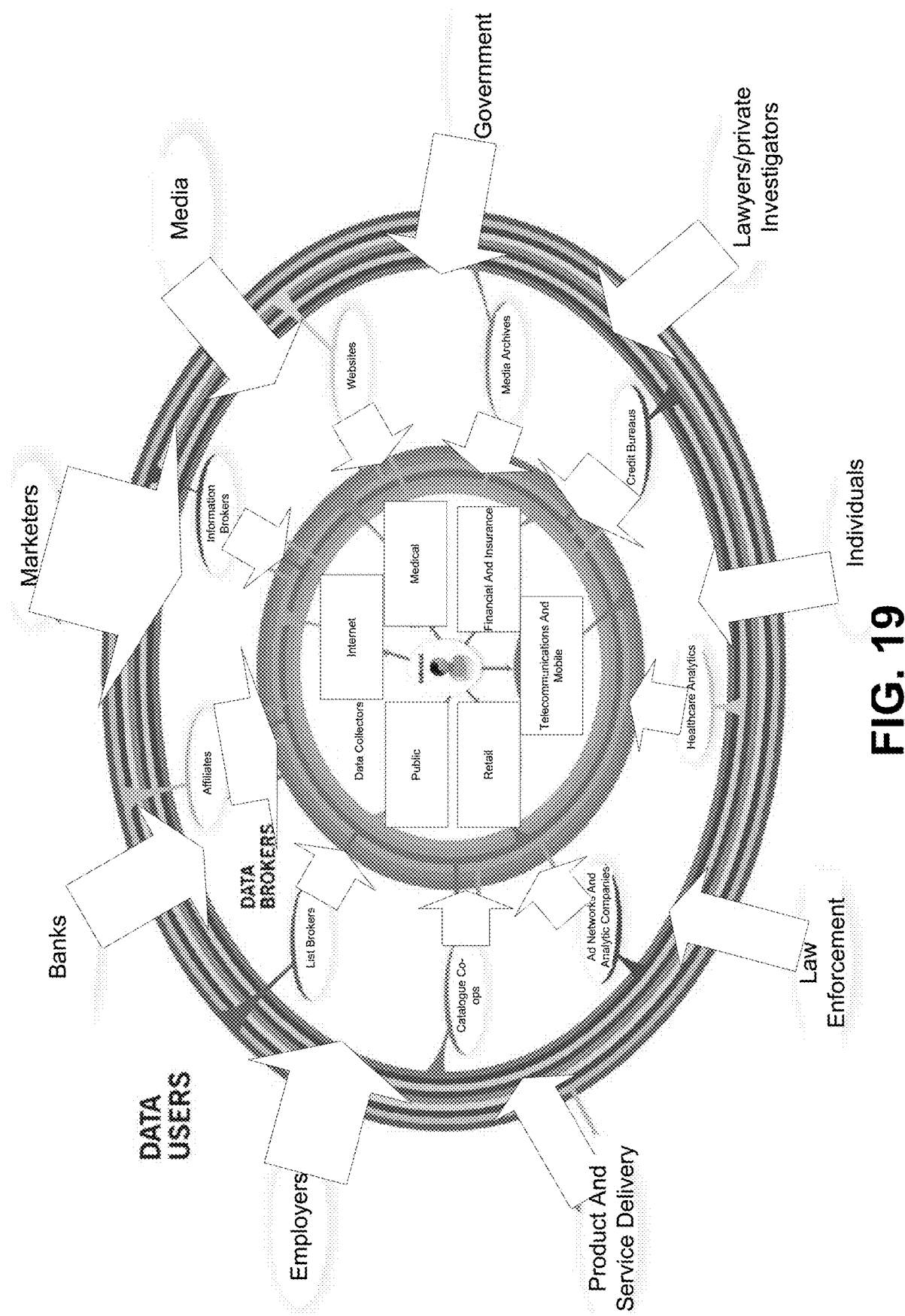
FIG. 19 is a flow diagram of example data transfers, according to some embodiments.

FIGS. 18 and 19 show a flow diagrams of example data transfers, according to some embodiments. A consumer may interact with one or more data brokers such as websites, healthcare analytics, list brokers, and so on. The data may be consumed by data users such as banks, marketers, media, government, lawyers, individuals, law enforcement, employers, product and service providers. The data users may also generate consumer data that are collected by data collectors such as internet, medical providers, public entities, retailers, telecom and mobile network providers and financial institutions.

Figure 20:
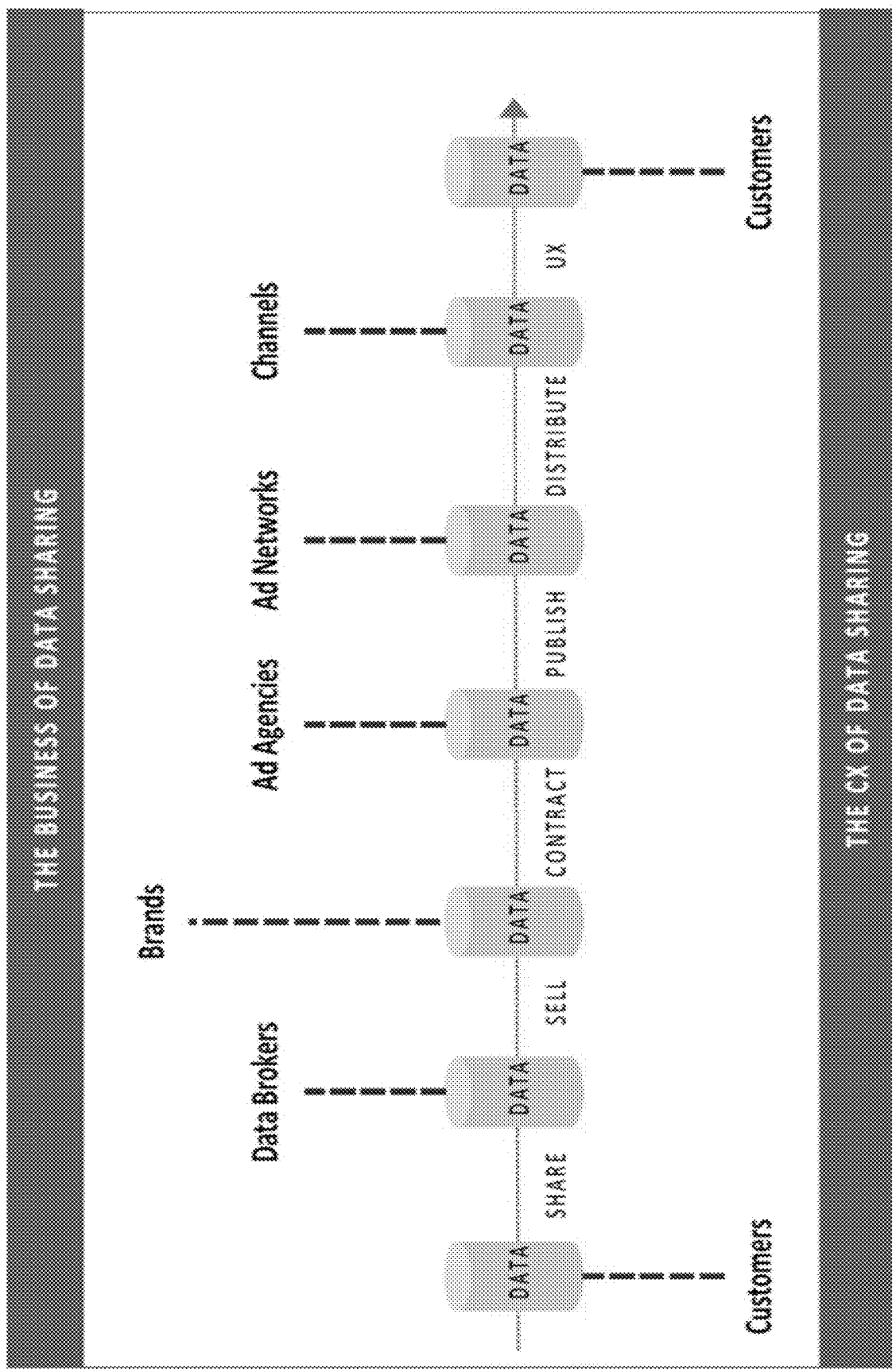
FIG. 20 is an illustration depicting an example business data flow for data sharing, according to some embodiments.

FIG. 20 is an illustration depicting an example business data flow for data sharing, according to some embodiments. As shown, data from consumers or customers may be shared, via system 100, with data brokers, who may sell the data to brands, who may contract marketing agencies to publish ads and distribute the data to various channels.

FIG. 21 is an example table illustrating entities related to various channels of obtaining data, according to some embodiments.

FIG. 22 includes a description of various aspects of data collection, according to some embodiments.

Figure 23:
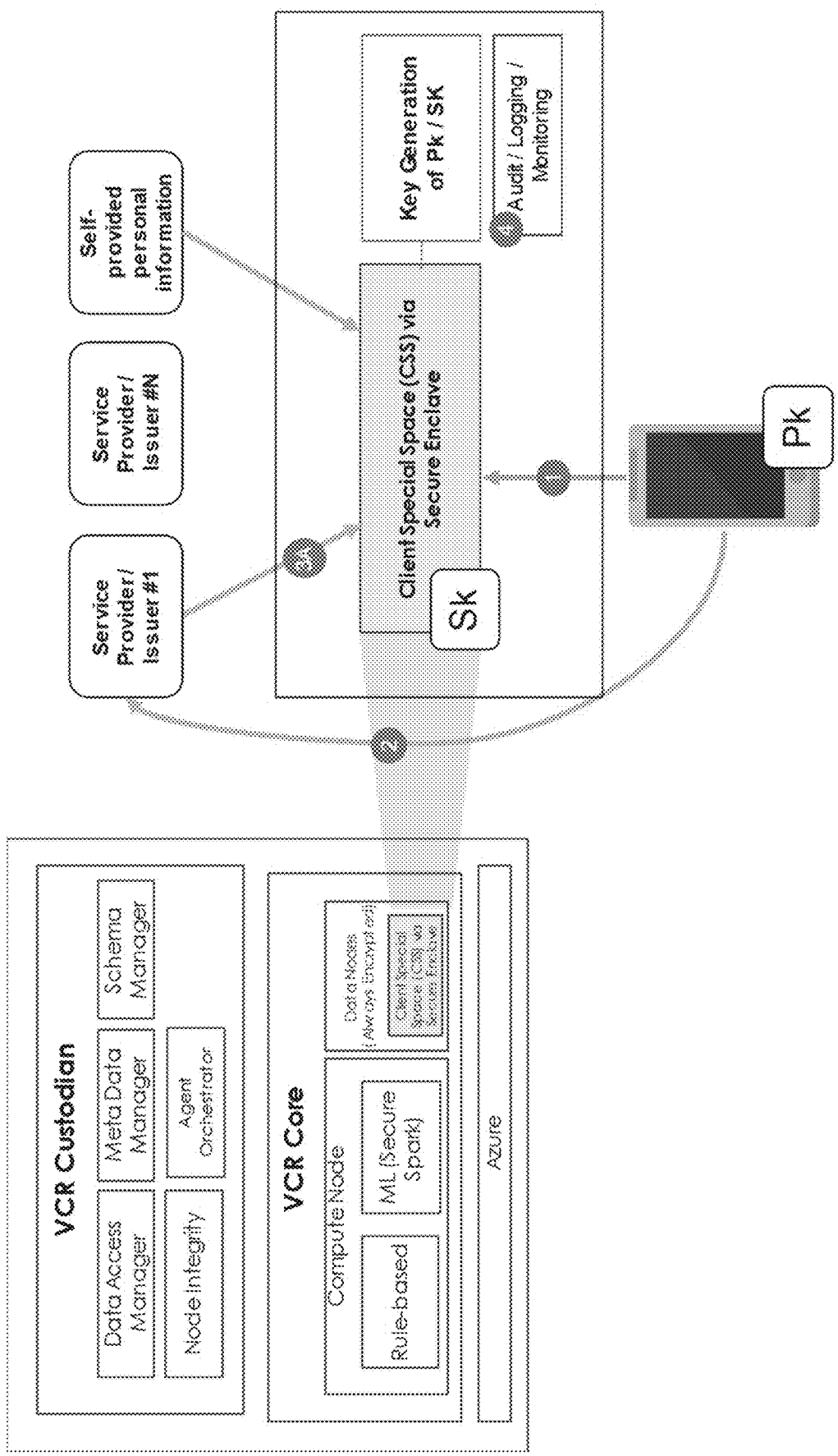
FIGS. 23, 24 and 25 are schematic diagrams showing aspects of an example computer system and method for controlling data associated with an entity.
Figure 24:
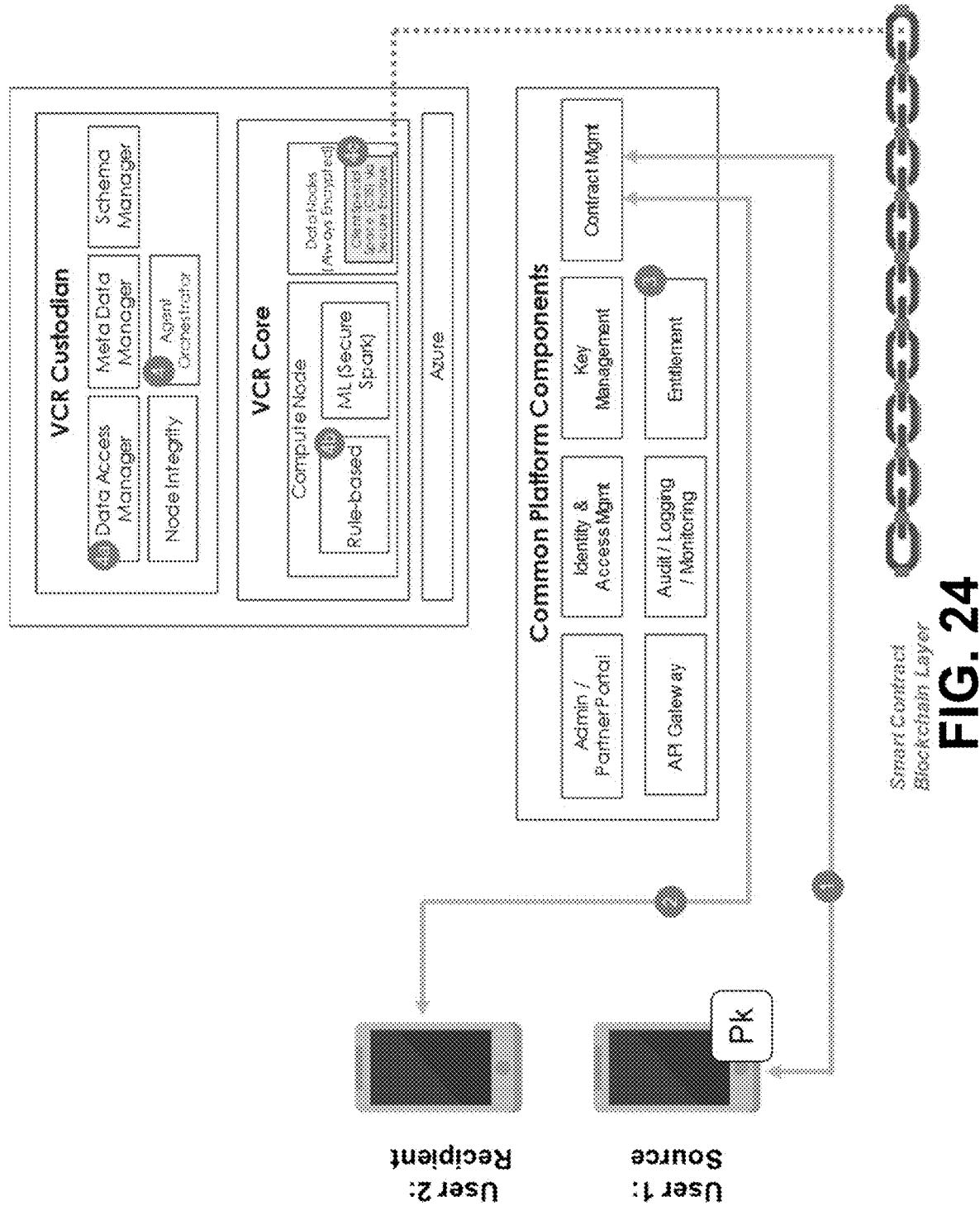
Figure 25:
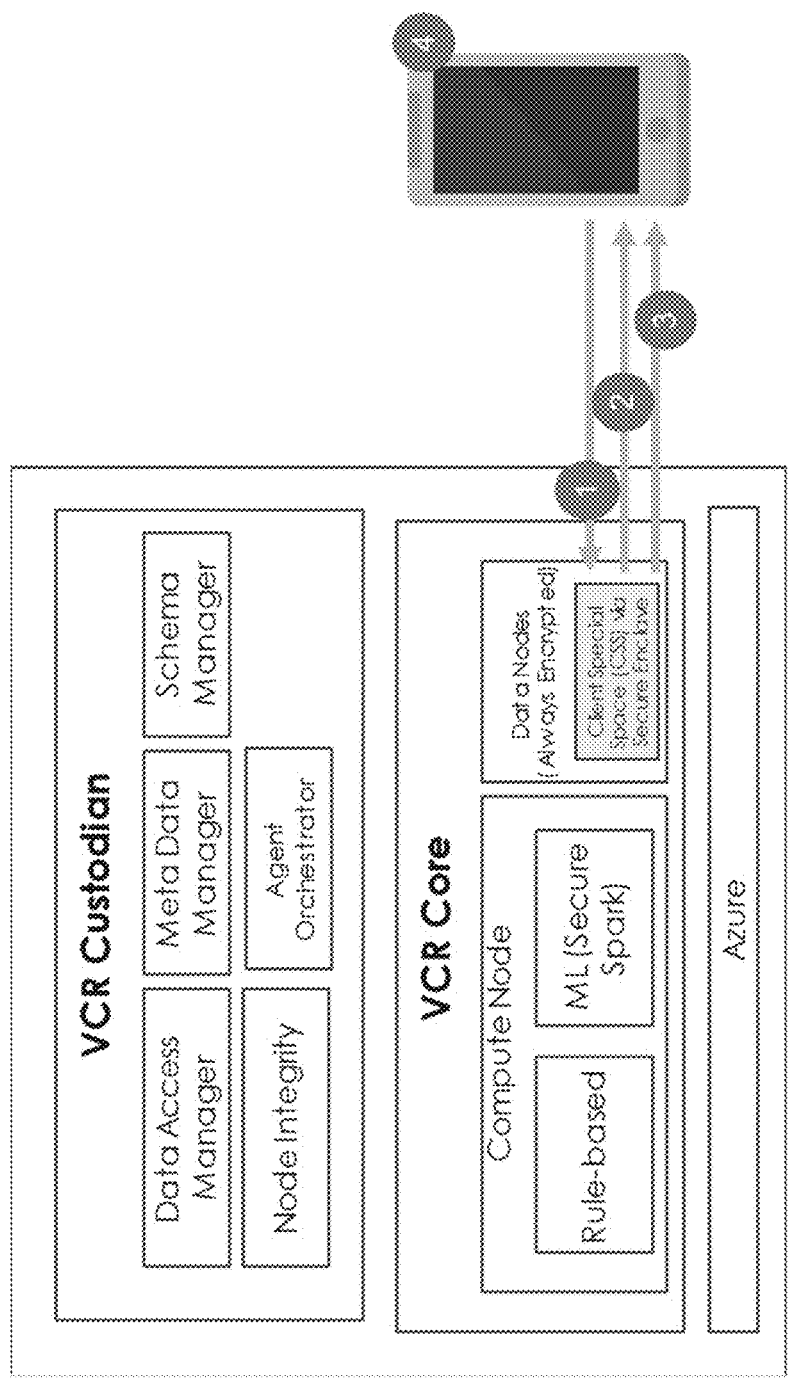

FIGS. 23, 24 and 25 show aspects of an example computer system and methods for controlling access to data. In some embodiments, the aspects of the computer system can be applied to any of the systems described herein or otherwise.

In some embodiments, the data is associated with an entity such as a consumer or individual. In some embodiments, the entity may be a company such as a financial institution or a car rental company. In some embodiments, the entity may be any other person or group of persons which may have associated data that they wish to control.

In some embodiments, the system may store received entity data in a secure area (sometimes referred to as the "Virtual Clean Room" or VCR), where the entity data is then decrypted and used to re-encrypt or generate derivative data or tokens for sharing with a verified recipient. The received entity data cannot be accessed, decrypted or read by any other user, system or process except with the proper permissions with the Clean Room In some embodiments, the owner of the computer hosting the platform may be unable to view or infer anything about input or output data.

In some embodiments, the Clean Room is implemented within one or more secure enclaves within a Trusted Execution Environment (TEE) of a processor (e.g., a CPU), where data models may be trained and executed to conduct any level of analytics. Key management capabilities are also in place to ensure proper encryption and decryption of the data stored within the Clean Room.

Embodiments described herein are directed to technical solutions adapted to overcome technical challenges associated with improved privacy and security. In particular, systems, methods, and computer readable media are described that utilize secure processing technologies, such as secure enclaves, in relation to the operation of an improved machine learning data architecture that has enhanced privacy and security measures.

As described above, these enhanced privacy and security measures lead to increased technical challenges as, for example, encryption and decryption requirements reduce total computing resources available in various situations. Computing resources may be constrained due to requirements that particular aspects need to be conducted using only secure processors and data elements may require to be stored only in encrypted formats while outside of secure processing environments.

FIG. 1 is a block diagram illustrating an example electronic transaction platform 100 for receiving and processing secure consumer data, over a network 150, according to some embodiments. The entity data may be received from other system(s) or devices 130, 140, 135, which may include bank system(s), trusted systems (e.g. government licensing/identification management systems) merchant system(s) and the like. FIGS. 23, 24 and 25 provide schematic diagrams of an example Clean Room which may be implemented on platform 100 or other systems.

A processing device 101 can execute instructions in memory 109 to configure various components or units such as the VCR custodian, VCR core, and common platform components in FIGS. 23-25. A processing device 101 can be, for example, a microprocessor or microcontroller, a digital signal processing (DSP) processor, an integrated circuit, a field programmable gate array (FPGA), a reconfigurable processor, or any combination thereof. Processing device 101 may include memory 109, data storage 108, and other storage 111. In some embodiments, processing device 101 includes a secure area known as a trusted execution environment (TEE) 103. TEE 103 may include memory 109 and data storage 108, and is an isolated environment in which various units and applications may be executed and data may be processed and stored. Applications running within TEE 103 may leverage the full power of processing device 101 while being protected from components and applications in a main operating system. Applications and data within TEE 103 are protected against unwanted access and tampering, even against the owner of processing device 101. In some cases, different applications and data storage within TEE 103 may be separately isolated and protected from each other, if needed.

In some embodiments, the protected memory region of the TEE 103 (e.g., secure data warehouse 108) is isolated through the use of encryption. In this example, the encryption keys are stored within the TEE 103 itself so that it can access data as required but the underlying data is not accessible by other components, such as an operating system operating on the server or a kernel process. In an alternate embodiment, the isolation is conducted through the use of physical or electrical circuit isolation from the other components. In yet another alternate embodiment, both physical and encryption isolation are utilized.

As components and data of platform 100 are kept within TEE 103, they are well guarded against unauthorized access and tampering due to the isolation and security afforded by TEE 103. Therefore partner systems 115 have confidence that their consumer data would not be inadvertently leaked or accessed by others. As will be described below, each partner may verify that platform 100 within TEE 103 is secure and tamper-free prior to transmitting any data to platform 100 (e.g., through attestation processes). Therefore, partner systems 115 have a high level of trust in platform 100 and would be more willing to send their consumer data to platform 100 for processing and in turn, receiving targeted recommendations and offers to current and prospective customers.

Data storage 108 can be, for example, one or more NAND flash memory modules of suitable capacity, or may be one or more persistent computer storage devices, such as a hard disk drive, a solid state drive, and the like. In some embodiments, data storage 108 comprises a secure data warehouse configured to host encrypted data.

Memory 109 may include a combination of computer memory such as, for example, static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

In some embodiments, data within the TEE can be stored in a data storage 108, memory 109, or some combination thereof.

Data storage 108 may comprise a secure data warehouse configured to store information associated with the TEE 103, such as cryptographic keys for remote attestation, encryption and decryption. Data storage 108 may also store confidential information such as consumer data including transaction data. Storage 108 and/or other storage 111 may be provided using various types of storage technologies, and may be stored in various formats, such as relational databases, non-relational databases, flat files, spreadsheets, extended markup files, etc. Data storage 108 can include, for example, a computer readable cache memory for loading the protected memory region, among others, as well as the protected memory region itself. Where the data storage 108 is configured for two-way access, the data storage 108 may store corresponding public keys corresponding to specific data sources for encrypting the data prior to access requested by computing devices associated with the specific data sources.

The data storage 108, in some embodiments, maintains an isolated machine learning data model architecture that is trained based on data sets received by the TEE 103, which may or may not be stored after processing on data storage 108. For example, if data is not stored on data storage 108 after processing and training, performance can be improved as less overall storage is required. This is useful where the data sets are particularly large or voluminous. In another embodiment, data sets are stored on data storage 108 in the protected memory region for future usage or time-spanning analysis.

The data storage 108, can also store output data structures, which can be interacted with through recommendation engine 120, the output data structures storing field values that are generated by processing by a data processing subsystem. In some embodiments, the data processing subsystem of the TEE 103 includes a stored function that is generated based on an aggregate of the data sets received from the corresponding partner computing devices.

Each I/O unit 107 enables the platform 100 to interconnect with one or more input devices, such as a keyboard, mouse, camera, touch screen and a microphone, or with one or more output devices such as a display screen and a speaker. The I/O unit 107 can be used to receive instructions to prepare for loading/unloading data into data storage 108, and may require the provisioning of a specific access key required to access or otherwise decrypt or validate data for loading into data storage 108.

The I/O unit 107 can also receive as a data structure, an instruction set, or a query string, the query data message that triggers the data processing subsystem to generate various output data structures.

Each communication interface 105 enables the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

The platform 100 may be operable to register and authenticate users (using a login, unique identifier, and password for example) prior to providing access to applications, a local network, network resources, other networks and network security devices. The platform 100 may serve one user or multiple users. In some embodiments, users' credential information are stored within TEE 103, making them secure and ensuring a high level of trust from partners.

In some embodiments, one or more aspects of the system can be implemented on a cloud computing platform such as Azure™ or any other suitable commercial or private platform.

FIG. 23 shows aspects an example Virtual Clean Room on platform 100 for controlling entity data. During a registration process, at 1, a client device associated with an entity can be authenticated and can request that the system created a client or entity special space via a secure enclave. In some embodiments, a public or private key pair is generated. The public key (Pk) is transmitted stored on a client device. And the private or secret key Sk is stored in the client special space (e.g. a portion of a protected memory region associated with the entity).

At 2, the client device may authenticate with a service provider or issuer device. The issuer device may be, for example, a device associated with the government latency, an insurance company, financial institution, or any other party which may provide information about the entity which may require proof or validation (e.g. birth certificate information, health care insurance, payment account information, etc.). In some embodiments, the issuer device can include a menu or can otherwise list tokens or other entity data which may be stored in the CSS. In some embodiments, the client device can select which entity/personal information to be stored in the CSS.

At 3, the client device provides an address (e.g. a URL, address, pointer, etc.) or otherwise provides information for the service provider to connect to the CSS. In some embodiments, the client device also provides the entity's public key to the issuer device. A digital version of the entity information is created by the issuer device and is transmitted to the CSS. In some embodiments, the entity information is generated using the client's public key and/or the issuer's private key. In some embodiments, the issuer's private key is used to sign or otherwise provide a cryptographic verification (e.g. signature) that the entity data was generated by the issuer device.

In some embodiments, entity data not relying on the issuer or other authoritative source can be received. For example, a user device can upload a picture of the entity data such as a photo of a driver's license into the CSS using their public key. In other embodiments, other verified or unverified entity data can be uploaded into the CSS by the user device or any other device associated with a user. For example, heart rate information from a heart monitoring device, etc.

At 4, the system can be configured to monitor, log, and/or audit any CSS activity including creation of the CSS, addition of data, access of data, deletion/editing of data and the like.

With reference to FIG. 24, upon receipt of an access grant signal such as an instruction from an entity device to grant, to a recipient, access into one or more components of the entity data, the system can generate a smart contract. A smart contract can be configured to define the entity data to be accessed and an identifier for the recipients of the entity data can be accessed. Some environments, Smart contract and configured to trigger a message for communicating information associated with the entity data to a recipient device upon satisfaction of one or more verification conditions.

Entitlement. In some embodiments, the system consents, the record may force fine-grained access controls on elements of contract. In some embodiments, access is signed based on keys from User 1 (i.e. the entity).

In some embodiments, an agent orchestrator process executed by the processors is configured to coordinate the work flow within the virtual clean room. Some environments, the agent orchestrator makes a function call to a data access manager process or otherwise facilitates minting of access tokens for the compute and data nodes as encoded in the access controls. In some embodiments, the data access manager process or functions perform the system's enforcement obligations.

In some embodiments, the compute nodes trigger a rule-based query to extract the personal information stored in the CSS of the Data Node (4c) per the smart contract. In some embodiments, extracted personal information data is either encrypted in a key managed by the special space or it is a token.

In some embodiments, the smart contract can provide timed access to the entity data. For example, access can expire, or access can be granted after a defined period of time or after the occurrence of an event (e.g. access details of a will after a person dies).

Again, all events can be captured in an audit log.

A Remote Attestation mechanism may be used to authenticate and establish a secure communication channel, whereby a remote client (e.g. a partner system 115) may ensure they are communicating with a particular piece of code running in enclave mode on an authentic non-compromised processor of platform 100. Remote Attestation can also be used by the enclave to send a public key to the client in a non-malleable way. This mechanism relies on highly non-trivial group signatures, but is also based on highly peer-reviewed research.

In some embodiment, the client or the partner system may include a Python script containing modules for establishing a secure encryption channel with the platform 100, and converts input data into a canonical form to be consumed by the Clean Room 300.

Remote Attestation may constitute the root of a client's trust in the analytics service. There are three ways it may be integrated with key exchange:
1. Perform Remote Attestation each time, or at least once per client. In this case the enclave will not have a long-lived public key, and would directly place a Diffie Hellman message on Remote Attestation's payload.
2. Enclave to present a Remote Attestation Transcript. Remote Attestation is by nature an interactive protocol, designed to convince only the verifier it interacts with. However, if all verifier challenges are produced deterministically using a strong hash function, the protocol is turned into a non-interactive one, through which a single execution can convince any number of verifiers. This transformation is known as the Fiat-Shamir Heuristic. A thus transformed protocol can be carried out by the untrusted enclave host itself. The enclave authenticates by presenting this protocol transcript similar to a public key certificate and signing a challenge and its new Diffie Hellman message by the public key embedded in the Remote Attestation transcript.
3. Certificates: Clients can delegate Remote Attestation verification to a 3rd party and consume certificates issued by them. This is not a very promising option.

The client or partner system may authenticate to platform 100. Authentication may help control the in-flow of data limits, though by no means eliminates, the likelihood of injecting garbage data into the system or mounting sensitivity attacks. These attacks merit a short exposition: injecting garbage can be done in order to either take the system down, or deliberately generate false analytics results from which the attacker may benefit; and sensitivity attacks are more subtle.

An attacker may observe how the end result of analytics changes relative to changes in the input they provide and through observing the output provided to them infer more information about data provided by other parties than intended by the designers. In some embodiments, in order to counter potential attacks, offer presentment need to be carefully crafted and information presented to client institutions may be limited.

In some embodiments, a library like OpenSSL may be implemented with the following considerations: Best enclave-design practices calls for simplicity and minimalism. Therefore, functionality that cab be securely delegated to an untrusted component, should be delegated as such. In the context of SSL, transformation of native representation of algebraic objects (such as public keys and ciphertexts) into standard ones and policy checks are such tasks.

As discussed earlier, the service authenticates to the client in a way that diverges from what is practiced in 2-way SSL connections. That is, the SSL specification as implemented may allow for modularly switching to a user-defined authentication protocol.

Figure 26:
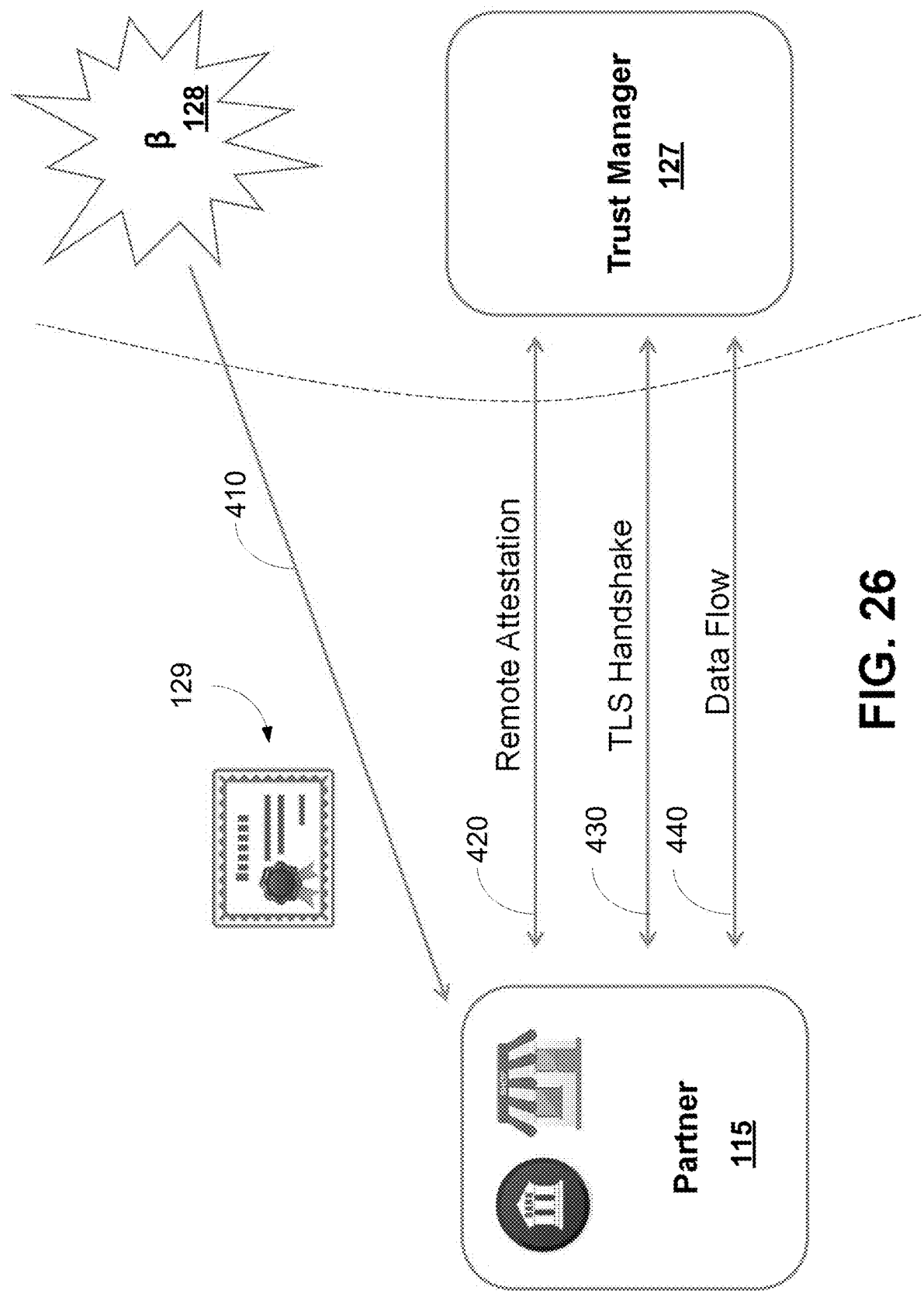
FIG. 26 is a schematic diagram illustrating a remote attestation process between a partner and a trust manager of the example platform according to some embodiments.

FIG. 26 shows a schematic diagram illustrating a remote attestation process between a partner system 115 and a trust manager utility 127 of Security and Encryption unit 125. At step 410, a Certificate Manager utility 128 can issue a Public Key Certificate 129 for each partner. The certificate 129 may be used to prove to the Trust Manager 127 that incoming data is authentic.

At step 420, upon request from a partner system 115, trust manager 127 may initiate a remote attestation process with the partner system 115 to verify the authenticity of platform 100. The request from partner system 115 may include a nonce N (a non-predictable random value) that has been generated for the purpose of remote attestation. Trust manager 127 receives the request including the nonce N, and in turn sends the nonce and a request to a Trusted Platform Module (TPM) 135 on platform 100 for key attestation.

A TPM 135 is designed to provide hardware-based security-related functions. A TPM 135 may include multiple physical security mechanisms to make it tamper resistant, and others are unable to tamper with the functions of the TPM 135.

TPM key attestation uses an Endorsement Key (EK) unique to each TPM 135 and is generated at manufacturing. The trust in the EK is based on the secure and tamper-proof storage of the EK in the TPM 135 and on the fact that the EK's certificate chains to the TPM manufacturer's issuing Certificate Authority (CA). That is, the EK's certificate can be cryptographically verified by the TPM manufacturer's issuing CA. One or more Attestation Identify Key (AIK) may be generated by the TPM 135 and signed with the EK. The AIK can be verified by a trusted Certificate Authority.

In some embodiments, the request from Trust Manager 127 to a TPM 135 includes one or more current Platform Configuration Register (PCR) values of platform 100. The request may optionally include a TPM version number or any other information required for TPM 135 to sign the PCR values. PCR values are used primarily to store system measurements and cannot be arbitrarily overwritten. PCR values may be hash values which are computationally impossible to forge. Some PCR values may be reset to a default value, which would require proper permission.

TPM 135 receives the request from Trust Manager 127 and proceeds to sign the PCR values with an Attestation Identify Key (AIK), then sends a Signed Response including the nonce, the PCR values and the AIK back to Trust Manager 127. Trust Manager 127 then sends the Signed Response to partner system 115, which may have a Partner Portal 116 installed thereon for analyzing and verifying the Signed Response.

Partner system 115 receives the Signed Response, verifies that the signed data is authentic and trustworthy by verifying that the PCR values and the AIK signature are accurate. For example, partner system 115 may verify that the AIK is valid through a trusted Certificate Authority. For another example, partner system 115 may verify the PCR values are trustworthy by comparing the values to stored values in a database which maps PCR values to a trust level. Partner system 115 may further verify that the PCR values are current by checking that the nonce in the Signed Response corresponds to the nonce sent by the partner in its initial request for attestation.

In some embodiments, instead of PCR values, another hash value may be used, such as a hash value of software code of platform 100, where the hash code represents a current state of platform 100.

Once partner system 115 is satisfied, based on the Signed Response, that the Clear Room 300 running on platform 100 is authentic and trustworthy, a SSL/TLS handshake may occur at step 430 in order to establish a secure communication channel.

At step 440, encrypted data may be transmitted from partner system 115 to platform 100 using the secure communication channel. In some embodiments, a public-private key pair may be used to encrypt the data. As described herein, Security and Encryption unit 125 may send an access key (public key) to partner system 115 using the communication channel. The partner may use the access key to encrypt all data being transmitted on the communication channel. When Clear Room 300 receives the encrypted data through the communication channel, a corresponding private key may be used to decrypt the data, so that they may be cleaned, normalized and processed accordingly. Partner portal 116 (see FIG. 5) may store the public key(s) assigned to partner system 115 in a partner keystore. Clear Room 300 may store the corresponding private key to each public key in a keystore 130. Keystore 130 may store a plurality of private keys, each corresponding to a public key that is assigned to a partner. A partner system 115 may be assigned one or more public keys for encrypting data.

In some embodiments, since arbitrary-length strings may make encrypted data identifiable, data sets may be pre-processed prior to transmission. For example, one or more data strings may be padded to a specific length, such as a maximum length allowed by the system. In other embodiments, data strings may be broken down to a predefined structure, and each atomic component may be hashed or encrypted prior to transmission.

Figure 27:
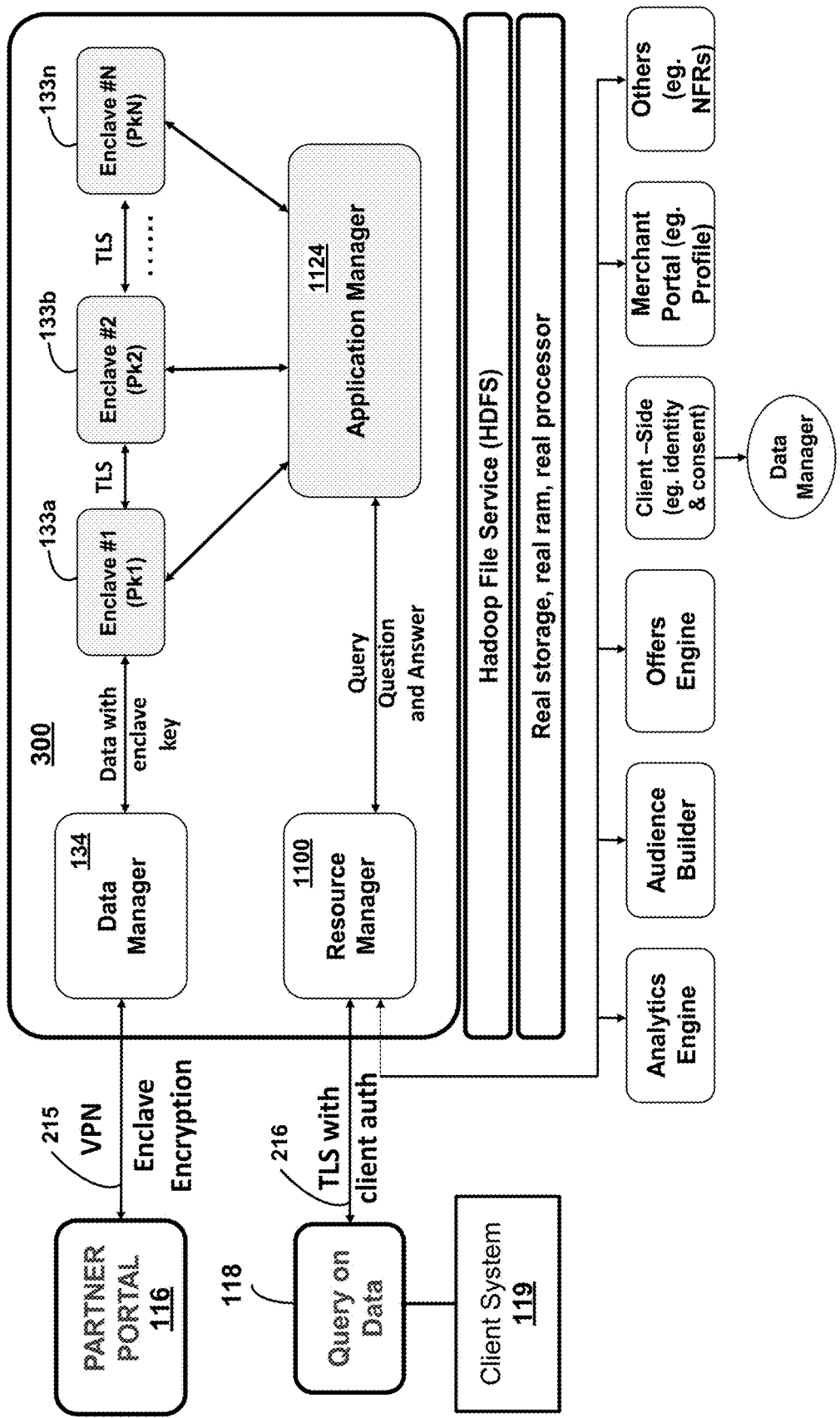
FIG. 27 illustrates another schematic diagram of an example Clean Room on the platform for processing secure transaction data according to some embodiments.

FIG. 27 shows another schematic diagram of an example Clean Room 300 for processing secure transaction data according to some embodiments. Clean Room 300 may include a Data Manager 134 configured to send public key of one or more enclaves to a partner portal 116 for encryption of data at the partner portal. The enclaves 133*a*, 133*b*, 133*n* may be referred to as destination enclaves as each enclave may be selected by Data Manager 134 to be a destination of encrypted data from partner portal 116. A file system such as Hadoop File System (HDFS) may be included in Clean Room to manage the encrypted data stored by the enclaves 133*a*, 133*b*, 133*n*.

In some embodiments, a partner portal 116 may initiate a communication channel 215 thru TLS or VPN with Data Manager 134 for sending data to Clean Room 300. The partner portal 116 may first transmit to Data Manager 134 a request indicating that data is to be transmitted to Clean Room. In some embodiments, the request may include information representative of an amount of data to be transmitted. Based on the data request, Data Manager 134 may select one or more destination enclaves 133*a*, 133*b*, 133*n* for receiving the incoming data from partner portal 116.

In some embodiments, Data Manager 134 may select the destination enclaves based on the amount of data to be ingested by each enclave, such that each selected destination enclave is specified to receive a specific amount of data from partner portal 116 through this communication session. In addition, Data Manager 134 may select a public key for each of the destination enclave and send the one or more public keys, each corresponding to a selected destination enclave, to partner portal 116, so the partner portal can encrypt raw data using the appropriate public key prior to transmission of encrypted data via communication channel 215. For example, Data Manager 134 can send information representative of an upper limit of data amount to be received by each destination enclave and corresponding public key (e.g. "MaxSize, PublicKeyID"), so partner portal 116 can encrypt the appropriate amount of incoming data for each destination enclave, in a manner that is consistent with the requirements of the destination enclaves.

Once partner portal 116 receives the information representative of data amount, destination enclave(s) and public key(s) from Data Manager 134, partner portal 116 may proceed to encrypting the raw data. For example, partner portal 116 may randomly generate a 256 bit Data Encryption Key (DEK) for each destination enclave and encrypts some raw data with the respective DEKs using AES-256 CBC or GCM. Partner portal 116 may generate DEKs based on the number of destination enclaves and corresponding number of public keys. A different DEK may be generated for each destination enclave, and thus for each public key associated with the destination enclave. Partner portal 116 may then encrypt each of the DEKs using an appropriate public key based on the corresponding destination enclave for which the DEK is generated. Next, partner portal 116 may send the encrypted data along with the encrypted key (e.g. encrypted DEK) to Data Manager 134 via communication channel 215.

In some embodiments, the communication channel 215 may be a VPN communication channel, in which case partner portal 116 and Clean Room 300 have both been verified to be authentic.

In some embodiments, the communication channel 215 may be established and maintained under TLS, similar to the TLS channel between a partner system 115 and a trust manager utility 127 of Security and Encryption unit 125, as described above in relation to FIG. 4.

A client system 119 may submit a query 118 to resource manager 1100 on Clean Room 300. The query may be a data query sent through communication session 216. In some embodiments, a client system 119 must be an authorized party to Clean Room 300 in order to send data queries; to this end, resource manager 1100 may be configured to interact with the client system to ensure that the client system is an authorized party and has proper permission for the query. Resource manager 1100 may return an answer to the client system in response to the query, once the client system has been verified to have the proper permission for the query.

In order to send the data query, the client system may initiate an authenticated TLS communication session 216 with resource manager 1100. The communication session 216 may be established and maintained in a manner similar to the TLS channel between a partner system 115 and a trust manager utility 127 of Security and Encryption unit 125, as described above in relation to FIG. 26.

Through the TLS communication protocol, resource manager 1100 can verify that the client system is an authorized party to Clean Room 300. Once the client system has been verified as an authorized party, resource manager 1100 may transmit, and display at the client system, one or more data analytics to which the client system has access. The client system may elect one or more options from the displayed data analytics options. Some of the data analytics may require additional information, which the client system may be configured to supply. The client system may then send the complete data query to resource manager 1100.

Resource manager 1100 may receive the data query from the client system, and proceed to send the query to application manager 1124 in order to launch the data analytics based on the data query from the client system. Application manager 1124 may be an application configured to generate one or more enclaves 133a, 133b, 133n in order to run analytics on the encrypted data using the enclaves. In some embodiments, one or more worker nodes may be used to perform the required data analytics.

In some embodiments, one or more data analytic operations may be open for inspection and/or signed by all authorized parties participating in Clean Room 300 to assure the authorized parties that the Clean Room is secure and intact.

In some embodiments, enclaves 133a, 133b, 133n may have authenticated and encrypted communication between data/documents stored thereon. For example, between one or more pair of enclaves 133a, 133b, 133n, TLS communication channel may be established to ensure secure communication and exchange of data between the enclaves.

In some embodiments, the system includes a trusted execution environment including the protected memory region, the protected memory region inaccessible to the one or more processors when operating outside the trusted execution environment. The processor(s) configured to operating inside the trusted execution environment can be configured for: generating information associated with the entity data within the trusted execution environment, and passing the information associated with the entity data for communication outside the trusted execution environment. For example, the information associated with the entity can be a token, and/or can be data re-encrypted with a key associated with a recipient, and/or can be data derived from the entity data. For example, if the entity data is a person's age, the derived data can be a token or other data message indicated that the person is over 21, which provides the information required by the recipient without disclosing the person's actual age or any other information.

With reference to FIG. 25, in some embodiments, the system is configured to verify the recipient device before providing access to the personal information. In some embodiments, the recipient (User 2 device forms a communication channel with Verifier, in this case it is the Client Special Space).

At 2, the Verifier makes a "Proof Request"

At 3, assume User 2 has an identity attribute to attest their identity, that proof is sent back the Client Special Space.

At 4, the special space shares the personal information after appropriate verification.

Embodiments described herein are directed to computer systems and devices directed to provide a cryptographic platform for generating and transmitting messages that are adapted to assert attributes about various objects (e.g., user profiles) without indicating any more than is actually required, and corresponding methods and computer readable media storing machine-interpretable instruction sets for performing the methods.

The computer systems and devices, in accordance with some embodiments, are adapted to a high-volume, scalable system, which dynamically responds to data credential requests of one or more users or one or more computer systems requesting identity/credential proofs.

In some embodiments, the assertions are conducted using mobile endpoints (e.g., user devices) which may have limited computational performance and resources, and accordingly, an improved cryptographic approach and system is proposed that enables the assertion functionality through the passing of cryptographically generated messages between devices. An improvement associated with the proposed cryptographic approach of some embodiments is that it is able to operate in a secure and scalable way, even on limited computational resources (e.g., those available on an unenhanced smartphone).

Prior approaches required large numbers of large messages being sent, which made the approaches impractical where resources were limited. The approach proposed herein requires less messages and streamlines the amount of cryptographic computations required to make these assertions. For example, Belenkiy describes an approach which requires a large number of computational steps, which can have deleterious impacts on performance.

Credential verification, when conducted manually, is a tedious process prone to falsification and also over-provisioning of information. In an example, Alice is a law-abiding 26 year old, and she would like an alcoholic beverage. Before selling beer to Alice, Bob wants to make sure of two things: She is legally allowed to drink, meaning 21 years of age or more, and that she is not a problem customer.

Alice thinks the conditions are fair, and they both know presenting her ID card would prove that she does satisfy them. She could provide her driver's license, which shows her name and date of birth. She would like to not disclose anything to him other than the fact that she satisfies the conditions. However, by providing her driver's license, Bob ends up knowing more than he needs to know (e.g., age and specific date of birth as opposed to the fact that she is above 21 years of age and is not the problem customer). Further, aside from visual inspect of the license, Bob has practical difficulties in verifying that the driver's license is not a fake driver's license.

Accordingly, a challenge involves providing a robust credential verification whereby Alice is able to prove to Bob that she does satisfy Bob's customer policy, while revealing nothing other than the fact to him. As an example, consider a policy of being older than 21. That is all Bob needs to know. He does not and should not know that Alice is in fact 26.

The system is configured to adduce stripped down credentials to meet Bob's customer policy without exposing additional information. In particular, cryptographic techniques are utilized that undertake specific steps and computational approaches to provide a secure, yet computationally efficient mechanism for proof generation.

Accordingly, an issuer device issues one or more signed token data objects, which are stored on a client's device for later usage. Upon encountering a situation where verification is required, the client's device is configured to dynamically generate proof data messages which are then provided to the verifier's computing device (e.g., the verifier's smart phone, a point of sale device, an access control system, a mantrap gate). The verifier is able to conduct a verification check using the proof data message to see only that the conditions required in the original verification check message without providing the actual underlying characteristics. As the proof data messages are generated using the token data objects, the verifier is able to validate that such proof data message is associated with a trusted verifier.

There are two different types of proofs that are proposed in some embodiments, these being exact match proofs (non-zeroness protocol; e.g., this person either matches someone on a whitelist or doesn't match anyone on a blacklist), and conditional proofs (e.g., based on an inequality condition being matched, such as over 18 years old?).

As described in various embodiments herein, improved cryptographic protocols are proposed that, relative to prior approaches, reduce an overall cryptographic complexity without a significant reduction in security. Accordingly, the proofs can be generated more quickly, which improves convenience, especially where a system is being established for mass adoption and client device characteristics are highly variable across the users (e.g., some users may be using devices with extremely limited capabilities).

An enhanced solution is described herein that is adapted for protecting a client's personal information and only providing what is needed by leveraging a client's special space using a secure enclave and a blockchain solution, in accordance with some embodiments.

A blockchain infrastructure and the secure enclave each store data sets representing aspects of signed attributes and, in some embodiments, a proof response logic. The blockchain infrastructure can include distributed logic technologies and combination with cascading encryption to provide an immutable ledger. In some embodiments, the proof requests and responses can be conducted using intelligent connected devices such as a mobile device, or wearable devices (e.g., a smartwatch that is connected to a mobile device across Bluetooth low energy).

In an example embodiment, there are multiple authoritative issuers who are able to provide signed attributes (e.g., for storage in secure enclaves or on a distributed ledger blockchain data structure). Secure enclaves can be utilized, or other types of hardware protected spaces are usable.

A registration mechanism and method is utilized to initialize and populate the attributes using public and secret (private) encryption keys. Issuer devices create attribute data records that are generated using a combination of a client's public key and an issuer's secret key (e.g., using digital signatures or encryption/decryption). The attributes can be made publicly available, for example, on a blockchain, whereby the attributes can be signed by an issuer's secret key but encrypted using the client's public key.

A verification mechanism and method is provided whereby a communications channel can be established with an authenticated verifier device, which initiates a proof request, which triggers a process to establish a proof response that is transmitted to the verifier.

An example use case includes a specially configured age verifier terminal, which for example, can include a graphical user interface rendering visual and coded objects such as a quick response code that can be scanned by a mobile device. Upon scanning the quick response code, the verification mechanism is invoked, and the mobile device may share data sets on a backend communications network such as the Internet. The proof response can be transferred to the verifier device based off of identifiers or information stored other on the age verifier terminal, or encoded within the quick response code the age verifier terminal returning true or false such that both a verifier such as a cashier, and the customer are able to visually confirm. The proof response rendering, for example, may be restricted to a true/false determination (e.g., additional private information is not disclosed or rendered).

Embodiments described herein are directed to computer systems and devices directed to provide a cryptographic platform for generating and transmitting messages that are adapted to assert attributes about various objects (e.g., user profiles) without indicating any more than is actually required, and corresponding methods and computer readable media storing machine-interpretable instruction sets for performing the methods.

There are computing devices that interoperate with one another in concert with the cryptographic platform, including devices associated with issuers, verifiers, and clients. The issuers are trusted entities which provide cryptographically validated credential messages that are issued to the client devices for storage thereon.

The cryptographically validated credential messages are then presentable to a verifier (e.g., a third party organization) that seeks to validate that identity or aspects of the identity of the user associated with the client device. The cryptographically validated credential messages are configured such that the user is able to validate such identity or aspects without providing additional information associated with the user that is not requested (e.g., as opposed to presenting all the information on a driver's license).

The credential assertion platform is a high-volume, scalable system which dynamically responds to data credential requests of one or more users or one or more computer systems requesting identity/credential proofs.

In some embodiments, the assertions are conducted using mobile endpoints (e.g., user devices) which may have limited computational performance and resources, and accordingly, an improved cryptographic approach and system is proposed that enables the assertion functionality through the passing of cryptographically generated messages between devices.

An improvement associated with the proposed cryptographic approach of some embodiments is that it is able to operate in a secure and scalable way, even on limited computational resources (e.g., those available on an unenhanced smartphone).

For example, a device with limited computational resources can include basic smartphones, which may be one or more generations out of date, and also have limited amounts of on-board memory (e.g., 1-4 GB of memory) and storage (e.g., 8-64 GB of solid state memory). The transfer protocols as between the client devices and the verifier devices may also have limited bandwidth (e.g., through near-field communications (NFC), Bluetooth, limiting communications to only several Mbit/s).

Prior approaches required large numbers of large messages being sent, which made the approaches impractical where resources were limited. The approach proposed herein requires less messages and streamlines the amount of cryptographic computations required to make these assertions.

As described herein, an improved cryptographic mechanism and protocol is proposed that reduces an overall number of data messages and/or cryptographic steps required to be taken to generate the proof data messages. For example, the method of Belenkiy requires 4 randomizations, 3 group multiplications and 7 group exponentiations, which includes elliptic curve exponentiations that are computationally expensive (e.g., involves more than 256 operations on 512 long integers). In a proposed non-zeroness approach of some embodiments, a field inversion is provided, which itself is an expensive operation, but reduces a consideration number of group exponentiations.

The proof data messages are designed to have a "soundness" attribute whereby a malicious verifier is unable to find out from the proof data message more information that what is being provided in the proof data message (e.g., can't find out the underlying characteristic values).

A computer implemented identity brokerage solution is described in accordance with various embodiments. The identity brokerage solution is adapted to address problems with identity and attribute verification, using computer implemented cryptographic approaches to provide a robust mechanism for conducting verifications while reducing the provisioning of extraneous information (e.g., information not required for the verification).

Credential verification, when conducted manually, is a tedious process prone to falsification and also over-provisioning of information.

Figure 28:
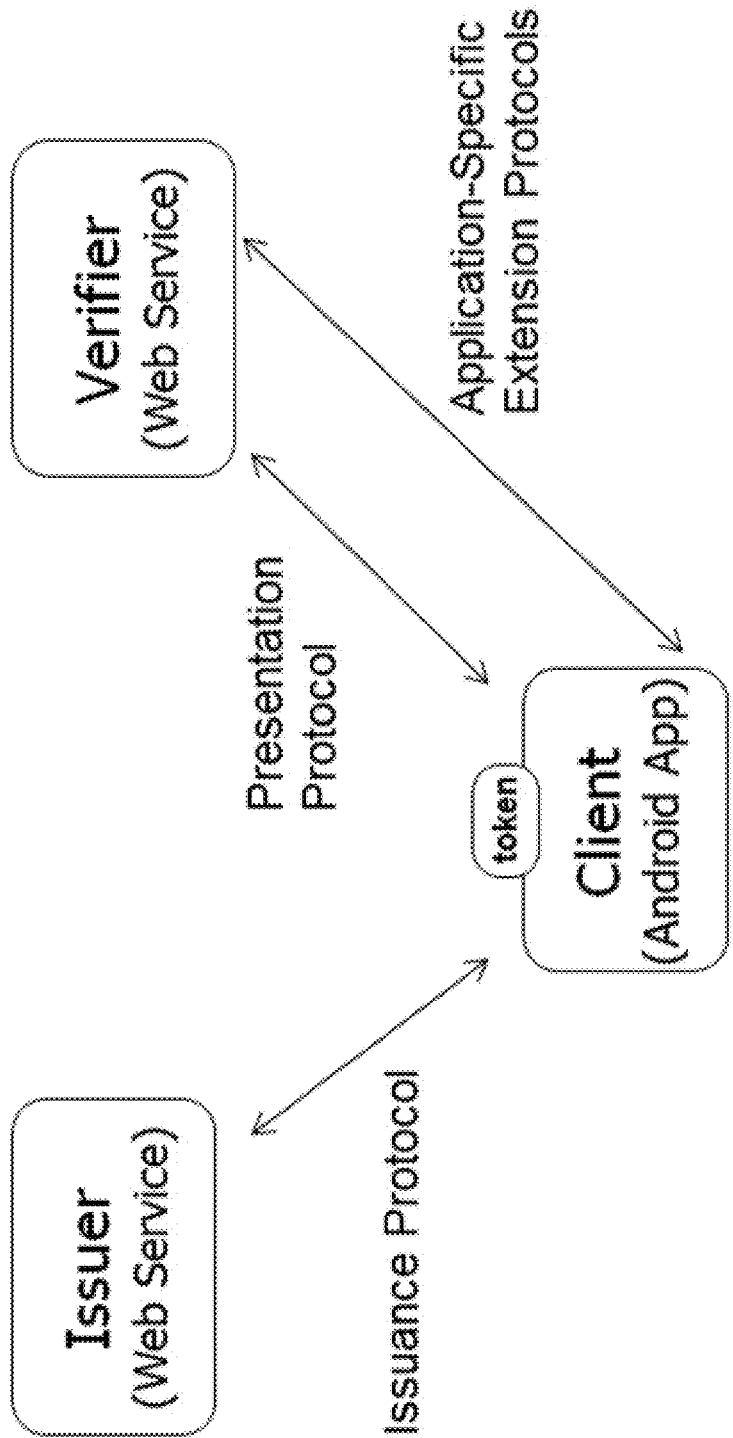
FIG. 28 is a graphical representation of parties to a verification event, according to some embodiments.

FIG. 28 is a graphical representation of parties to a verification event, according to some embodiments. The parties to a verification event include a prover (e.g., the entity seeking to prove the entity's characteristics and/or identity, for example, through programmatic mobile application client having a token stored thereon), a verifier (e.g., the entity seeking to verify the prover's characteristics and/or identity in accordance with a policy), and an issuer (e.g., the entity, such as a financial institution, which has a relationship with the prover and can attest to the prover's characteristics and/or identity, whose representations are trusted by the verifier).

In accordance with various embodiments, the prover should be able to hide as many attributes as the prover seeks to prove that follows from their attributes having zero knowledge of the underlying attributes: "I've lived in the same city over the last 5 years."

The prover's client holds credentials that are digitally signed by the issuer ("tokens"). An example token are those provided by U-Prove specifications. A U-Prove token can include a credential similar to a PKI certificate with cryptographic wrapping of attributes to aid in reducing unwanted tracking of users.

For example, a token may have various artifacts wrapped therein and may include information, such as issuer parameters, including issuer public key information (e.g., coupled an issuer's private key) that can be used for signing or encrypting elements of information stored thereon to prove the veracity of such signature or to protect sensitive information. The issuer signature can be used by the prover or verifier to verify issuer parameters being relied upon, and the token itself, in some embodiments, may have one or more data fields storing information such as token usage restrictions, validity period, token metadata.

In some embodiments, the token is jointly created using a combination of issuer information and prover information. For example, there may be information stored thereon that is established in conjunction and hidden from the issuer, such as contact information, encryption key, or verifier supplied nonces, etc.

During issuance of a token, an issuer may authenticate the existence and access/control that the prover has over the prover's device.

Tokens include attributes that can be converted from a natural form to a sequence of large numbers (field elements) suitable for public key operations. These public key operations include anonymous credentials protocols.

Attributes are organized in a tree. An attribute can either come with a value, in which case it is called a leaf attribute, or bundle a number of sub-attribute, in which case it is called a parent attribute.

For example, consider a geographic location attribute. That would be most naturally divided up into a latitude sub-attribute and a longitude sub-attribute. Thus, a credential token can be considered consisting of a single root attribute containing all others as descendants.

Regardless of whether an attribute is disclosed, committed to, or hidden, the prover may wish to communicate metadata about it to the verifier. The most important such property is an attribute's name. The number "170" in an attribute would mean nothing without the name "height" attached. Additionally, such numeric attributes require units as context. The number "170" is absurd if considered in inches but plausible when in centimeters.

It is important to disclose this metadata even when attributes are being committed to. Consider the non-trivial example of heights and units. Consider an attraction park that refuses to admit people taller than 180 cm on a roller-coaster. Without the proper context provided, a 188 cm tall person can abuse an attribute a height attribute of 74 inches and successfully prove 74<180, thereby put him and others in danger.

In some embodiments, the token can include fields that additionally give the users an ability to decide if they want to hide an attribute's metadata. For example, even if hidden, an attribute attesting to a negative syphilis test can carry social stigma.

An attribute will be serialized into one "raw attribute" (a number or string) if the user chooses its metadata to depend on its parent's. If not, it will be serialized into two, the first representing its metadata and the second representing the value.

Every attribute's metadata contain an array called "subAttributes". If the array is empty, the attribute is considered to be a leaf attribute. Each sub attribute has a corresponding entry in the array. If the sub attribute is encoded independently, the entry will be an integer, denoting how many raw attributes the sub attribute and all of its descendants (subtree) together will take. If it is encoded dependently, the subAttributes entry will be all of its metadata.

In this example, it is describing a token for an individual residing in 35.796682 N, 51.416549 E, and 188 cm tall. In radians, the coordinates are 0.624769962188 N and 0.897388070061 E.

The token from the slide will serialize into the following, each bullet point representing one raw attribute:

```
{subAttributes: [
{name: "homeAddress", type: "polarCoordinates", subAttributes: [
    {name: "longitude", type: "polarCoordinate", unit: "mRad",
     subAttributes: [ ]},
    2
]},
{name: "height", type: "length", unit: "cm", subAttributes: [ ]}
]}
897
{name: "latitude", type: "polarCoordinate", unit: "µRad", subAttributes: [
]}
624770
188
```

A proof request is issued from the verifier to the prover's client, asking the prover to give the verifier cryptographic assurance that according to some issuer trusted by the verifier, the prover's attributes satisfy a certain (arbitrary) policy (e.g. older than 21, as far as provisioning alcohol is concerned.), and these proof requests typically contain one or more challenge messages. A proof request can include a nonce, types of conditions, etc., and these conditions may be encapsulated as inequalities (e.g., intUserAge>18), or logical statements (e.g., intUserID not equal to 22412). One or more lookup reference data structures may also be passed, which can include blacklists, whitelists, values for various constants (e.g., MINIMUMDRINKINGAGE).

A proof is provided by the prover through client as a response to the verifier's request, which includes cryptographic assurance that the prover's credentials satisfy the verifier's proof request, the cryptographic assurance being held being as good as the issuer's word. The proof is a data message that encapsulates various information (e.g., proof responses directed to a sigma protocol). The data message includes sufficient information such that the verifier is able to receive the data message, and conduct steps to validate and verify that such proof responses are indeed acceptable. In processing proof responses, the proof data message can include aspects indicative of the identity of an issuer, and a potential step is the validation by the verifier that such issuer is indeed trustworthy as a source of credential authentication.

The proof responses can be processed to generate gatekeeping control signals, which, for example, in an example embodiment, may be as simple as a device that operates a lightbulb whenever someone is validated as being of age (e.g., so that a bouncer at a bar is able to know that this person should be allowed in), or as complex as control mechanisms that automatically open doors, enable access to online accounts (e.g., on a web portal), etc. Accordingly, the verifier systems can include physical and electronic mechanisms which can generate alerts, notifications, actuation/control signals, digital or electronic signals, among others.

Factors for assessing identity brokerage solutions include how light the required infrastructure is (e.g., it may be important to reduce the need for specialized hardware, centralized devices, or complex distributed systems that make deployment and entry difficult), a level of computational efficiency, a simplicity of cryptography, a level of un-linkability between various parties (e.g., the issuer should not be able to aggregate additional data about the client, even in collusion with verifiers), and a flexibility and level of minimalism of disclosed information.

Any solution requiring the issuer to be online at verification time risks exposing additional information about the client to the issuer. This is especially concerning in cases where the issuer and the verifier collude to track client activities.

Reduced complexity is desirable as a solution may be less likely to suffer implementation flaws, be more easily understood, and less likely to theoretically break due to reliance on unusual hardness assumptions. If computational operations that have optimized/low-level implementations, the solution may be able to operate using less computing resources and/or time.

The identity protocols, ideally, should require little time, take little power, have few rounds of message transmission, and pass messages having small sizes and/or overhead. This is especially important where the parties implement portions of the identity brokerage solution on mobile devices to handle one or more verification events. The mobile devices have limited computational, storage, and interface capabilities.

The parties hold corresponding public/secret (e.g., private) key pairs. The public keys can be utilized to determine the veracity of information signed using the private keys, and to encrypt information that can be decrypted using the corresponding private key.

The private keys can be utilized to sign information and to decrypt information that has been encrypted using the corresponding public key, and in some cases, produce Zero-Knowledge Proofs of Knowledge. Each secret key is maintained by the corresponding computing device associated with the corresponding entity.

The parties each have corresponding computing systems, which are used to electronically communicate amongst one another (e.g., through a network) and to perform various cryptographic activities, including signing, verifying signatures, encrypting information, decrypting information and various anonymous credential issuance, proof and verification protocol implementations. Each verification event is associated with validating whether all logical conditions of the proof request are satisfied. A positive determination may lead to access/service/goods being provisioned to the prover. A negative determination may lead to access/service/goods not being provisioned to the prover.

A specific technological implementation of providing identity assertions with minimal disclosure is described in various embodiments. Three separate approaches are described, along with variations thereof. These approaches include (1) an O-Auth token based design, (2) a secure enclave based design, and (3) an anonymous credentials based design.

In some embodiments, a proposed approach is provided in an anonymous credentials based design whereby a client receives token data structure(s) that are stored on data storage, and asynchronously, the client gets a verifier request from a verifier. The verifier may, for example, have a list of trusted issuers that the issuer verifier trusts. Certain organizations may be trusted for certain information, such as a bank for employment or financial status, a university for educational attainment characteristics, among others. The client generates a proof (e.g., encapsulated as a proof data message) based on the token and the verifier request, and the proof can be established as either a non-zeroness proof or a conditional proof. Token objects can be received from or computed jointly in a multiparty protocol with an issuer computing device.

For a non-zeroness proof, the proof approach generation can include a first modular inverse, two randomization steps, two group exponentiations, and a group multiplication. In particular, the steps in an example non-limiting embodiment can be established as:

(1) Receive a verification request data message from the verifier computing device, the verification request data message including at least a nonce $c_0$.

(2) Compute $t=x^{-1}$ mod p, where x is the attribute value from the token, and p is the order (e.g., size, number of elements) of the discrete log group (e.g., elliptic curve, Diffie-Hellman group) according to the cryptographic standards the parties choose to use (e.g., elliptic curve, Diffie-Hellman group); t is the modular inverse of x mod p.

(3) Sample a first random number $r_1$ and a second random number, $r_2$, such that $r_1, r_2 \in \mathbb{Z}_p$.

(4) Compute $R = C_x^{r_1} h^{r_2}$, where R is effectively a commitment to random values $r_1$ and $r_2$, $C_x$ is a commitment to attribute x, h is a group generator taken from cryptographic specifications (e.g., elliptic curve, Diffie-Hellman group). A commitment is a representation of a value that is both hiding and binding, hiding in the sense that the recipient of the commitment cannot find out anything about what the value of the commitment is, and binding in the sense that the sender later cannot pretend that it was a commitment to another value than it originally was.

(5) Compute $c = H(C_x, R, c_0)$, where c is the proof challenge, following the Fiat-Shamir Heuristic.

(6) Compute $z_1 = ct + r_1$ and $z_2 = cty + r_2$, where $z_1$ and $z_2$ are proof responses in a sigma protocol.

(7) Encapsulate and transmit one or more proof data messages including R, $z_1$ and $z_2$ as data objects to the verifier computing device, such that the verifier computing device is able to compute $c = H(C_x, R, c_0)$ and confirm that $g^c R = C_x^{z_1} h^{z_2}$, the verifier computing device controlling provisioning of access to a secured resource responsive to the confirmation that $g^c R = C_x^{z_1} h^{z_2}$.

The verifier independently validates the received proof and the verifier makes a determination of access grant or not grant.

In some embodiments, the verifier is a verifier computing system that automatically grants access to one or more secured resources, such as a physical access entry (e.g., mantrap, revolving doors, locked gateway, locked cabinet), and in other embodiments, the system grants access to one or more virtual resources (e.g., administrator access on a computer system, logging into accounts, access to secured sections of webpages), among others.

In another example, a comparison protocol may be established (e.g., to prove some condition whereby a<=b). This can be utilized to establish proof messages whereby it is necessary to indicate that a person is of a particular age, that a person has a particular minimum creditworthiness, a person has a minimum educational attainment, among others.

Consider G to be a discrete log group of prime order p and g and h be generators with unknown discrete logs.

Let numbers q and l be such that $$q - 1 = 2^N \le \frac{p}{2}$$

and two whole numbers a and b such that $1 \le a \le b < q$

Consider commitments $A = g^a h^{m_a}$ and $B = g^b h^{m_b}$ to a and b, respectively.

To prove that $a \le b$, the following steps can be taken:

(1) Prover computes $C = BA^{-1} = g^{b-a} h^{m_b - m_a} = g^c h^{m_c}$.

(2) Prover produces bit commitments $A_i = g^{a_i} h^{m_{ai}}$, $B_i = g^{b_i} h^{m_{bi}}$, $C_i = g^{c_i} h m^{m_{ci}}$ for $i \in \{1, \ldots, N-1\}$ where $a_i$, $b_i$ and $c_i$ are the i'th bits of a-1, b-1 and c, respectively. $m_{ai}$, $m_{bi}$ and $m_{ci}$ are sampled randomly.

(3) Prover computes $A_0 = g^{a_0} h^{m_{a0}} = A \Pi_{i=1}^{N-1} A_i^{-2^i}$ and likewise $B_0 = g^{b_0} h^{m_{b0}} = B \Pi_{i=1}^{N-1} B_i^{-2^i}$ and $C_0 = g^{c_0} h^{m_{c0}} = C \Pi_{i=1}^{N-1} C_i^{-2^i}$.

(4) For each $i \in \{0, 1, \ldots, N-1\}$, the prover does the following:

(4.1) Randomly sample $r_{ai}$, $d'_{ai}$ and $z'_{ai}$.

(4.2) Compute $R_{ai,a_i} = h^{r_{ai}}$ and $R_{ai,(1-a_i)} = h^{z'_{ai}} (A_i g^{-a_i})^{-d'_{ai}}$.

(4.3) Compute $d_{ai} = H(A_i, R_{ai,0}, R_{ai,1})$.

(4.4) Compute $z_{ai} = (d_{ai} - d'_{ai}) m_{ai} r_{ai}$.

(4.5) Assign $z_{ai,a_i} = z_{ai}, z_{aj,(1-a_i)} = z'_{ai}$, $d''_{ai,a_{ji}} = d_{ai} - d'_{ai}$ and $d_{ai,(1-a_i)} = d'_{ai}$.

(4.6) Repeat steps 4.1 through 4.5 for B and C.

(5) Prover sends all $A_i$, $R_{ai,0}$, $R_{ai,1}$, $d''_{ai,0}$, $z_{ai,0}$, $z_{aj,1}$, $B_i$, $R_{bi,0}$, $R_{bi,1}$, $d''_{bi,0}$, $z_{bi,0}$, $z_{bi,1}$, $C_i$, $R_{ci,0}$, $R_{ci,1}$, $d''_{ci,0}$, $z_{ci,0}$, $z_{ci,1}$;

(6) Verifier checks that $A = \Pi_{i=0}^{N-1} A_i^{2^i}$, $B = \Pi_{i=0}^{N-1} B_i^{2^i}$, $BA^{-1} = \Pi_{i=0}^{N-1} C_i^{2^i}$.

(7) For each $i \in \{0, 1, \ldots, N-1\}$ the verifier checks that:

(7.1) $A^{d''_{ai,0}} R_{ai,0} = h^{z_{ai,0}}$ (7.2) $(Ag^{-1})^{H(A_i, R_{ai,0}, R_{ai,1}) - d''_{ai,0}} R_{ai,1} = h^{z_{ai,1}}$ (7.3) Check the same conditions for B and C Note: It may be that either a or b are known to the verifier. In such a case there is no need to decompose the known number and commitment C will have the same mask exponent as that of the unknown parameter.

In some embodiments, that the client computing device (e.g., the prover) does not send $A_0$, $B_0$ and $C_0$ to reduce the size of its messages. In that case, in step 6, instead of verifying a relation between the bit commitments the verifier derives $A_0$, $B_0$ and $C_0$ independently. This aspect may be particularly useful in low data throughput situations or where storage space is very limited.

The comparison method of some embodiments reduces the problem of comparison to three bit decompositions. As such, the computational burden on the prover consists of about 12N−3 group exponentiations.

In contrast, the method of Belenkiy involves two bit decompositions and N−1 equality maps each consisting of four 2-variable equations and a total of six distinct variables.

As such, it is estimated that each equality map requires at least 8 group exponentiations.

Using the efficient Bit Decomposition implementations of some proposed embodiments, the two decompositions will require a total of 8N−2 group exponentiations. Accordingly, it is estimated that Belenkiy's method requires 16N−10 group exponentiations. This demonstrates that for the proposed method for the comparison protocol is more efficient, and this superiority becomes increasing important as the numbers to be compared scale up.

In particular, the scale up may occur if the credential verification system is utilized across a large number of users.

In some embodiments, the system includes a credential parsing engine provided to receive one or more credentials which in combination, validate one or more characteristics of an identity profile of a prover entity.

A proof generation engine is provided that receives, from a verifier computing system, the one or more proof request data structures and the one or more credentials; and for each logical condition provided in the one or more proof request data structures, parse the one or more characteristics of the identity profile to determine whether the logical condition has been satisfied.

One or more proof output data structures storing signatures or zero knowledge proofs of satisfaction of a subset or all of the one or more logical conditions is returned by the system (e.g., in the form of data fields). A secure encryption engine and a secure processing enclave may be included, in accordance with various embodiments.

A proof generation engine, in some embodiments, resides at or is coupled to a data center of a financial institution, and wherein parsing the one or more characteristics of the identity profile includes invoking an electronic comparison against a stored user profile of the financial institution corresponding to the prover entity. The example implementations are not restricted to such a topology, and other topologies are contemplated, including a cloud/distributed resources based proof generation engine.

In other embodiments, the proof generation engine is coupled to the secure processing enclave, which may also be coupled to a verifier computing device.

In another embodiment, the proof generation engine lies within the prover's user device, thus user data will never be provided to the verifier and the issuer will not be informed of the transaction taking place.

In another aspect, the electronic comparison against the stored user profile of the financial institution corresponding to the prover entity includes querying one or more attributes of the stored user profile and comparing the queried one or more attributes against the one or more logical conditions to determine whether individual logical conditions of the one or more logical conditions have been satisfied. The characteristics and attributes of the user profile can be used established and stored thereon the portable client computing device as one or more token data objects that can be received from or computed jointly in a multiparty protocol with an issuer computing device.

The one or more token data objects are generated (e.g., as signed objects or encrypted objects) using at least an issuer computing device private issuance key. The one or more token data objects each including one or more signed data elements representing at least one of the one or more characteristics of the client associated with the portable client computing device.

In another aspect, the verifier computing system is configured to encapsulate the one or more credentials along with the one or more proof request data structures in a single data container transmitted to the proof generation engine.

Figure 29:
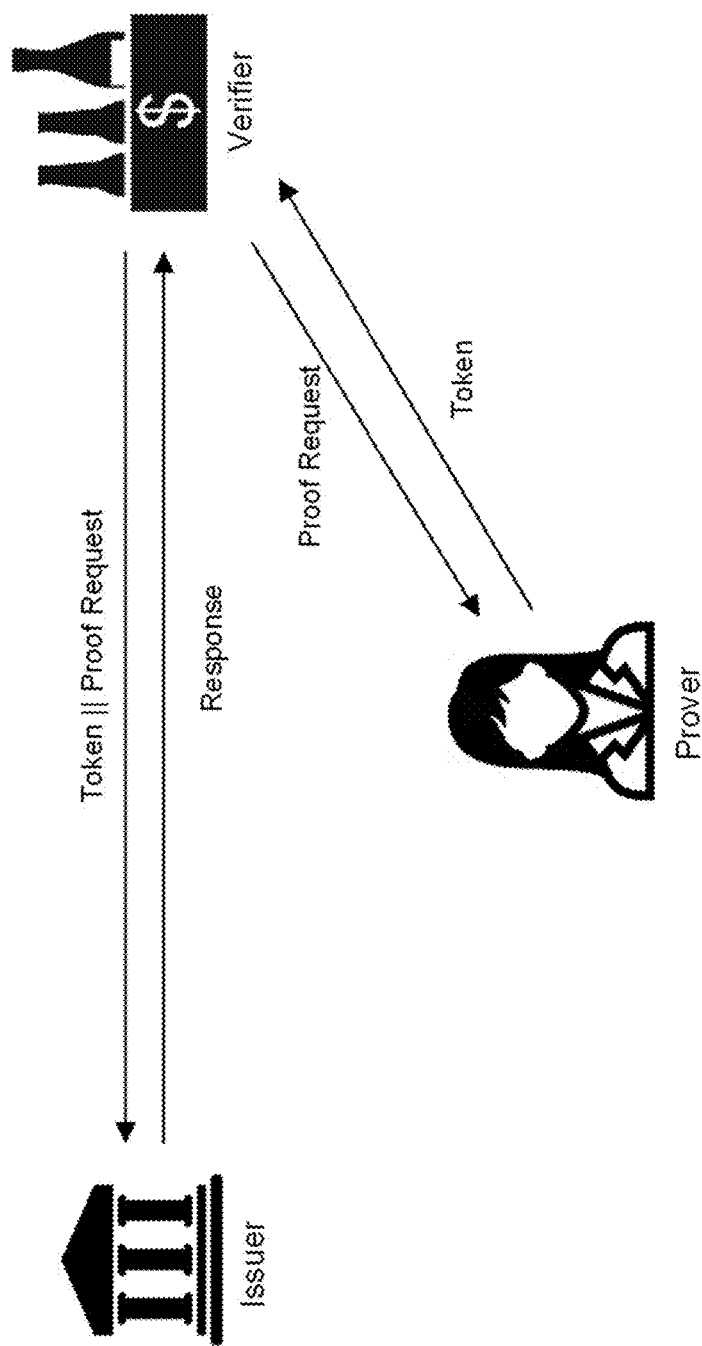
FIG. 29 is an example O-Auth based method, according to some embodiments.

FIG. 29 is an example O-Auth token based method, according to some embodiments. The O-Auth based method portrayed does not address the issue of unlinkability, and in this example, the prover computing device electronically communicates to the verifier O-Auth tokens containing the verifier's proof request, which the verifier computing system can use to formulate a query message to be transmitted to the issuer computing system, and receive a yes/no answer in response. A benefit to this approach is that there is relatively light infrastructure required, it is very efficient, and the cryptography is simple and flexible.

However, the issuer computing system needs to be available (e.g., online) to be able to process the request. In response to a proof request, the prover confers an OAuth token (not to be confused with credentials) that the verifier can use to query the issuer and be assured that the prover does indeed satisfy their policy.

The verifier is provided tokens containing the verifier's proof request which can be used to query a computing system associated with an issuer, receiving an answer, such as a yes or no response (e.g., or a Boolean variable, such as TRUE/FALSE, 0, 1).

Secure Enclave

A challenging technical problem occurs in implementing a system where the verifier is able to ensure the prover has the correct credentials, while preserving their privacy. In some embodiments, a secure enclave based approach is described. In order to implement a secure enclave, Intel Software Guard Extensions™ (SGX) can be utilized, among others.

There are different mechanisms for public key cryptography. An approach, for example, supported by the Intel SGX SDK natively supports ECDH for key encapsulation and ECDSA for digital signatures over the PRIME256V1 (also known as SECP256R1) curve. Other approaches are possible, such as Schnorr's, which would serve just as well for a digital signature scheme. 256-bit base fields may potentially provide sufficient security.

For symmetric cryptography, Intel SGX SDK™ natively supports 128-bit AESGCM. This primitive can be used for authenticated encryption. It remains to be seen if larger AES key sizes are necessary. In that case, Galois-Counter Mode cannot be used.

Hashing can be performed using SHA-2, as this is natively supported by the Intel SGX™ SDK. As it supports 256-bit blocks, it would also be useful in case of a migration to larger AES blocks; both as a means of key derivation as well of a MAC building block.

The secure enclave approach improves computational efficiency and minimizes a trusted computing base, rendering it more amenable to formal analysis. The verifier may include a verify oracle, which is a trusted software/hardware component hosted by an untrusted third party. It is allowed to view a prover's attributes in the clear and attest that they satisfy a certain predicate queried by the verifier.

An example registration protocol is provided as follows. First, a prover generates their public key. The issuer hands the prover a random string r, the prover generates $sk'_p$ and generates $pk_p=f(sk_p)$ for $sk_p=(sk'_p, r)$ and common knowledge collision resistant function f. In order for the registration to be accepted, the prover should prove to the issuer in zero knowledge that it knows a corresponding $sk'_p$. The (semi-honest) issuer's contribution to key generation is to keep a malicious prover from stealing credentials belonging to a previously revealed private key.

In regard to credential subletting, it may be beneficial that the issuer should demand the prover to incorporate some important secret about their account (not even known by the issuer) into the private key, such that the secret can be inferred from the private key. This will discourage provers from sharing credentials with one another. Alice may be willing to let Bob use some credential issued to her by her bank, but not be comfortable giving him complete control over her bank account.

Another possible technique to approach this is to issue credentials to specific devices, using private keys that the device can create for an application and sign using them on the application's behalf, without ever sharing the key with the application.

An example issuer protocol is described:

The issuer generates a signature on the prover's attributes using an arbitrary signature scheme that is secure against existential forgery. For the construction to be secure, the signature should also involve a description of the token's data structure.

More formally, the prover and the issuer agree on a string $a_p$ representing the prover's attributes. The issuer knows the prover as the owner of $pk_p$, satisfying $a_p$. The issuer sends the prover back a signature $a=sig(sk_i; pk_p \| a_p)$ to the prover.

It is not strictly speaking necessary for the prover to have a public key at all. However, if the issuer enforces limits on how often it would register a new public key for a client, provers will be discouraged from subletting their credentials to one another. This stands in opposition to keyless credentials, where disclosing the secrets to a credential doesn't cost the original owner anything.

An example protocol for showing verification by the oracle is provided.

Let the prover and the verifier both trust a verification oracle known by the key pair $(sk_o, pk_o)$.

The verifier chooses a random challenge c and sends it to the prover. A proof request predicate P is agreed upon. The prover composes the string $d=(pk_i\|sk_p\|a_p\|\sigma_p\|c\|P)$ and sends $enc(pk_o;d)$ to the oracle.

The oracle decrypts d and checks that the following propositions are satisfied:

sigver $(pk_i; \sigma_i; f(sk_p)\|a_p)$ $P(pk_i, a_p)$

In case of successful verification, the oracle outputs $\sigma_o=sig(sk_o;c\|P)$ or it outputs $\perp$ otherwise.

The verifier only needs to check that $sigver(pk_o;\sigma_o;c\|P)$ holds.

Note that as regards propositions P that do not depend on anything outside $a_p$ (e.g. time) there is no freshness requirement; therefore the challenge c can simply be regarded to be the empty string in such cases.

For examining the approach security, the following collusion scenarios are considered:

Malicious issuer and prover to break soundness: This attack can be trivially mounted and in some embodiments, there is not attempt to prevent it. The issuer can always issue bogus adaptively chosen untruthful credentials for an accomplice prover. In practice, such a problem is best thwarted by strong and transparent authentication and KYC practices by issuers, as well as careful choice of trusted issuers by verifier consortiums based on thorough vetting.

Malicious issuer and verifier to break zero-knowledge: Zero-knowledge in this context means that an adversary controlling all issuers and verifiers cannot pinpoint which of the trusted issuers implied by the query and which of the credentials obtained from the issuer the credential in use is. For this, the analysis makes use of the CCA2 property of the encryption scheme used in Acquire Proof queries.

More formally, consider the following game, where the adversary is allowed to make polynomially many of the following queries, interleaved with polynomial computations:

Create Honest Oracle: Generate $(sk_o, pk_o)$ and add $pk_o$ to the set $O_{honest}$ known to the adversary.

Confer Credential: Send $(\sigma_i=sig(sk_i;pk_p\|a_p),pk_i)$ for arbitrary $a_p$ and arbitrary key pairs $(sk_i, pk_i)$ and $(sk_p, pk_p)$.

Request Challenge: Send arbitrary $pk_o \in O_{honest}$, P and c to the challenger. The chellenger picks a random element d from the set $D=\{(pk_i\|sk_p\|a_p\|\sigma_i\|c\|P)|P(pk_i;\sigma_i)\}$ and sends $enc(pk_o;d)$ back to the adversary.

The adversary wins if D is non-empty and he can guess the value of d with non-negligible advantage over a random choice.

A simulation argument naturally follows from this intuition and is therefore avoided.

Malicious prover to break soundness: The adversary is allowed polynomially many queries from the following list; arbitrarily interleaved with one another and polynomial-time computations.

Create Honest Issuer: Create a new key pair $(sk_i, pk_i)$ and add $pk_i$ to the set $I_{honest}$ available to the adversary.

Create Honest Oracle: Create a new key pair $(sk_o, pk_o)$ and add $pk_o$ to the set $O_{honest}$ available to the adversary.

Initiate Registration: Receive a random string r from an honest issuer.

Finish Registration: Send $(r,pk_p,\pi)$ to an honest issuer that has sent r in a past Initiate Registration query. If $\pi$ non-interactively proves knowledge of $sk'_p$ such that $pk_p=f(sk'_p, r)$, the issuer will later accept Acquire Credentials queries from the adversary.

Finish Honest Registration: Create an honest prover to respond to an already initiated registration process. $sk'_p$ will be hidden from the adversary, but $pk_p$ will be known and added to the set $P_{honest}$.

Acquire Credentials: Acquire $\sigma_i=sig(sk_i;pk_p,a_p)$ for arbitrary $a_p$ and the additional requirement that $pk_p$ has been already registered with the owner of $sk_i$. Add $(pk_i, a_p)$ to the set A.

Acquire Proof: Submit $enc(pk_o;d)$ an arbitrary but well-formed $d=(pk_i\|sk_p\|a_p\|\sigma_i\|c\|P)$ to an honest oracle with key $pk_o$ and acquire the output $\sigma_o$.

Acquire Honest Proof Request: Send arbitrary $(P,c,pk_o)$ to an honest prover and receive $enc(pk_o;d)$ if the prover has a credential attesting to P and $\perp$ otherwise. Add c to the set $C_{outsourced}$.

Forge: The adversary outputs some $\sigma_o$, and the game ends. She wins if:

$sigver(pk_o;\sigma_0;c\|P)$ for some c and P.

$c \notin C_{outsourced}$ $pk_o \in O_{honest}$ $\exists (pk_i, a_p) \in A: pk_i \in I_{honest}, P(pk_i, a_p)$ $\forall pki \notin I_{honest}, a_p: \neg P(pk_i, a_p)$ There are no queries regarding corrupted or corruptible Issuers and Oracles since such parties can be simulated by the adversary herself.

Figure 30:
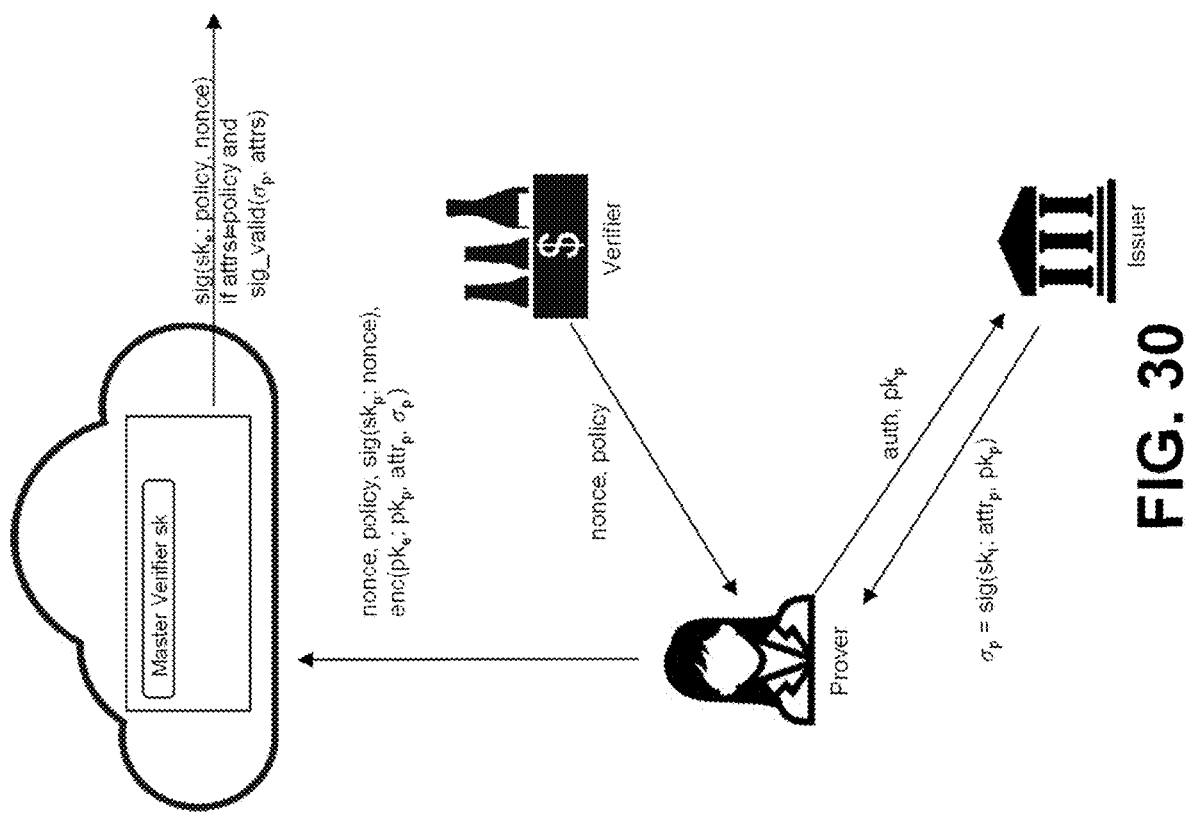
FIG. 30 is an example method diagram where a secure enclave master verifier is utilized, according to some embodiments.

In FIG. 30, the issuer computing system signs attributes with a cryptographic technique, the verifier computing system sends issuer computing system a challenge and proof request.

In response, the prover computing device sends encrypted credential, challenge and proof request to a master verifier computing device. The master verifier signs challenge and proof request computing device.

This approach, while requiring additional infrastructure relative to the approach of FIG. 29, satisfies many of the conditions for an ideal verification. The issuer computing system does not obtain further information (e.g., the identity of the verifier) from the verification event.

Figure 31:
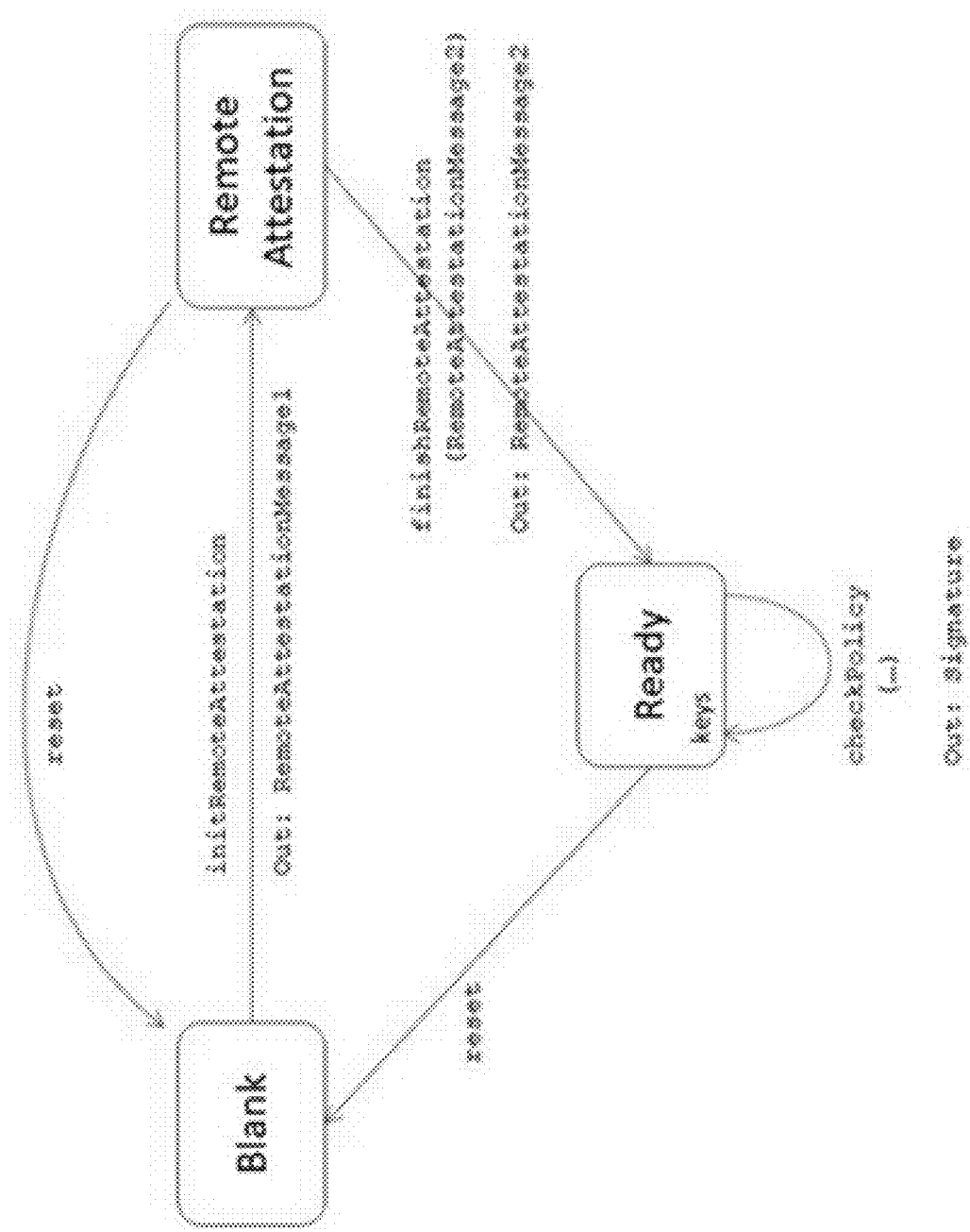
FIG. 31 is a state diagram of a verify oracle, according to some embodiments.

FIG. 31 is a state diagram of a verify oracle, according to some embodiments. The verify oracle can be implemented using software, hardware, or a combination thereof. For example, the states may be transitioned through the use of a processor configured to transition between one or more states, and to perform steps described below in conjunction with machine-interpretable instruction sets.

A Verify Oracle supports three states:

Blank: At this state, only the initRemoteAttestation call would be accepted. Then, the first remote attestation message will be generated the enclave goes to the Remote Attestation state.

Remote Attestation: At this state, the enclave accepts either a reset call or a finishRemoteAttestation call. Upon a reset call, the enclave clears all of its state data, as if it were killed and reloaded. Upon a finishRemoteAttestation call, the enclave consumes a Remote Attestation challenge message. The enclave produces a Remote Attestation message 3, generates the necessary key pairs and outputs the Remote Attestation message and the public keys. If any of this fails, it performs a reset operation.

Ready: This is the state wherein the enclave can actually evaluate policies over attributes. It can receive a checkProofRequest call, or a reset call.

Trust by Provers and Verifiers is assumed in all the previously described models as a common reference. Also, for obvious performance concerns, it is vital to be able to perform Remote Attestation on an enclave non-interactively. As such, the enclave's host can perform a publicly verifiable remote attestation with its enclave and publish the transcript to it. In order to do so, she may employ the Fiat-Shamir heuristic using the collision-resistant function H(.) modeled as a Random Oracle. If the Remote Attestation Verifier would normally use a probabilistic polynomial-time algorithm $m_2 \rightarrow A(m_1; r)$ to generate the second message, in this scenario the second message would be derived through $m_2 \rightarrow A(m_1; H(m_1))$.

A proof request can be defined in accordance with variations of the following examples.

The language describing policies should be simple to interpret so as not to expose the system to security risks.

In order to prevent the execution from leaking information about the attributes, the language should preclude programs with data-dependent access patterns, runtime and execution paths. Here, a C-like language called StraightTalk is described as an example, and it is only capable of describing straight-line programs:

In this example, the secure enclave is adapted for processing encrypted credentials, challenges, and proof requests. The secure enclave can be a processor or a secured memory location that is configured for maintaining a verifier secret key utilized to generate a first signed message.

The verifier computing device receives, from a prover computing device, a second signed message including at least an enclosed issuer signed message representing one or more encrypted containers storing at least one or more characteristics of an identity profile of a prover entity along with a message authentication code based at least on the proof request data structure.

The verifier computing device then transmits the second signed message, the proof request data structure, and the one or more encrypted containers to the secure enclave.

The verifier computing device then receives a response data message from the secure enclave indicative of whether all of the one or more logical conditions were satisfied by the at least one or more characteristics of the identity profile of the prover entity. In some embodiments, the secure enclave is configured to provide publicly verifiable remote attestation with a verifiable threat model and a verifiable proof of security.

```
⟨policy⟩                  ::=⟨token-definition⟩⟨statement⟩*⟨expression⟩
⟨token-definition⟩        ::= ε
                          |⟨token⟩'{'⟨variable-definition⟩* '}'
⟨variable-definition⟩     ::=⟨type⟩⟨identifier-list⟩';'
⟨identifier-list⟩         ::=⟨identifier⟩
                          |⟨identifier-list⟩','⟨identifier⟩
⟨type⟩                    ::=⟨basic-type⟩
                          |⟨basic-type⟩'['⟨integer⟩']'
⟨basic-type⟩              ::= 'unsigned' 'int' '['⟨integer⟩']'
                          | 'int' '['⟨integer⟩']'
                          | 'float'
⟨statement⟩               ::=⟨variable-definition⟩
                          |⟨expression⟩';'
⟨argument-list⟩           ::= ε
                          |⟨nonempty-argument-list⟩
⟨nonempty-argument-list⟩ ::= (⟨expression⟩',')*⟨expression⟩
⟨expression⟩              ::=⟨expression⟩'?'⟨expression⟩':'⟨expression⟩
                          |⟨expression⟩⟨binary-operator⟩⟨expression⟩
                          |⟨unary-operator⟩⟨expression⟩
                          |⟨function-like-operator⟩'('⟨argument-list⟩')'
                          | '('⟨expression⟩')'
                          |⟨string⟩
                          |⟨base64⟩
                          |⟨identifier⟩'['⟨integer⟩']'
                          |⟨identifier⟩'['⟨integer⟩']''['⟨integer⟩']'
                          |⟨identifier⟩
                          |⟨number⟩
⟨unary-operator⟩          ::= '-'
                          | '!'
⟨binary-operator⟩         ::= '='
                          | '.='
                          | '+'
                          | ...
```

Figure 32:
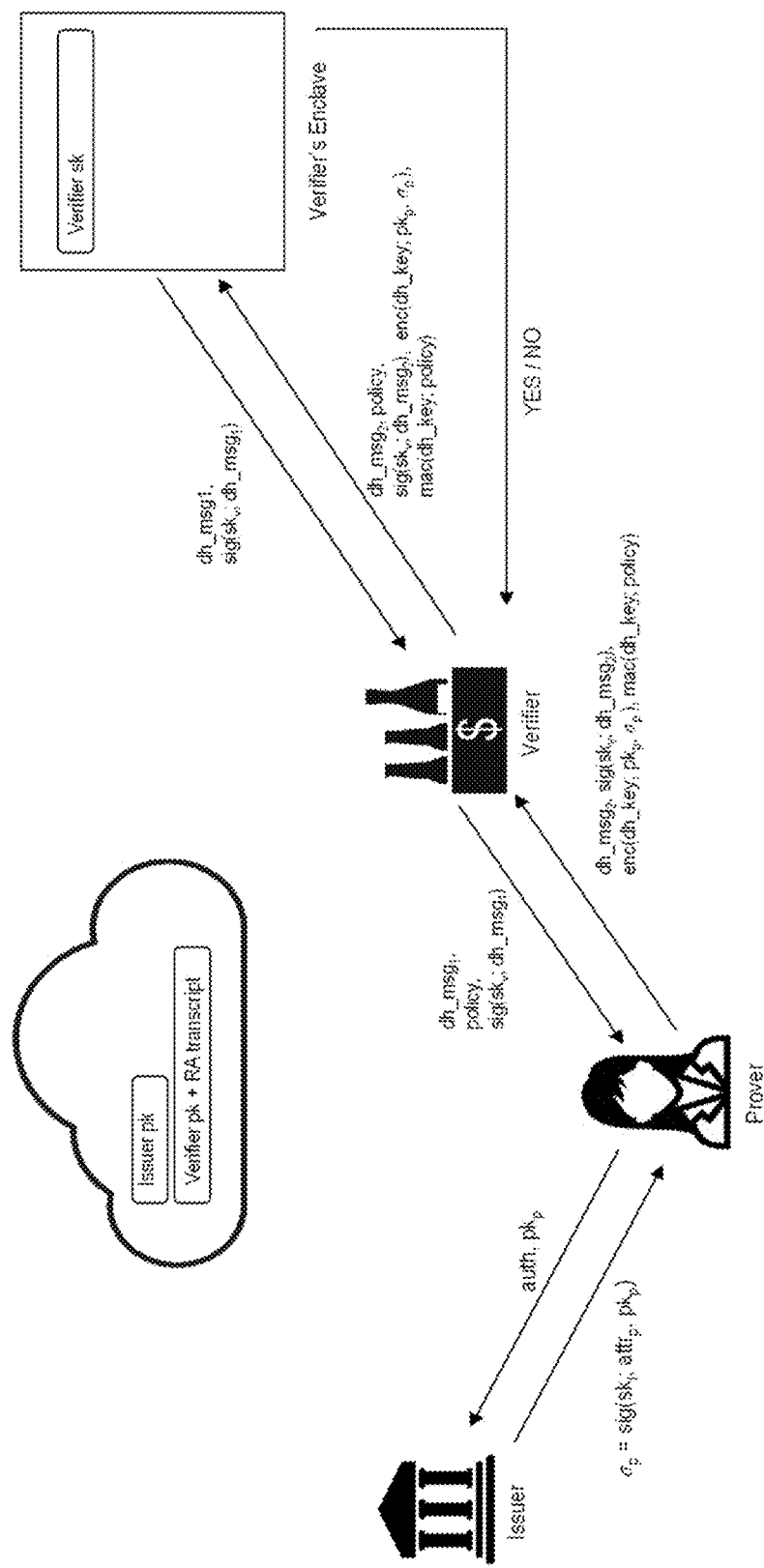
FIG. 32 is a system diagram providing additional detail in the context of a verifier hosted enclave, according to some embodiments.

FIG. 32 is a system diagram providing additional detail in the context of a verifier hosted enclave, according to some embodiments. As shown in FIG. 32, the verifier enclave stores a secret key which is utilized in a flow of signed messages. The key encapsulation process, in various embodiments, includes 2-way or 1-way authenticated public key encryption.

Figure 33:
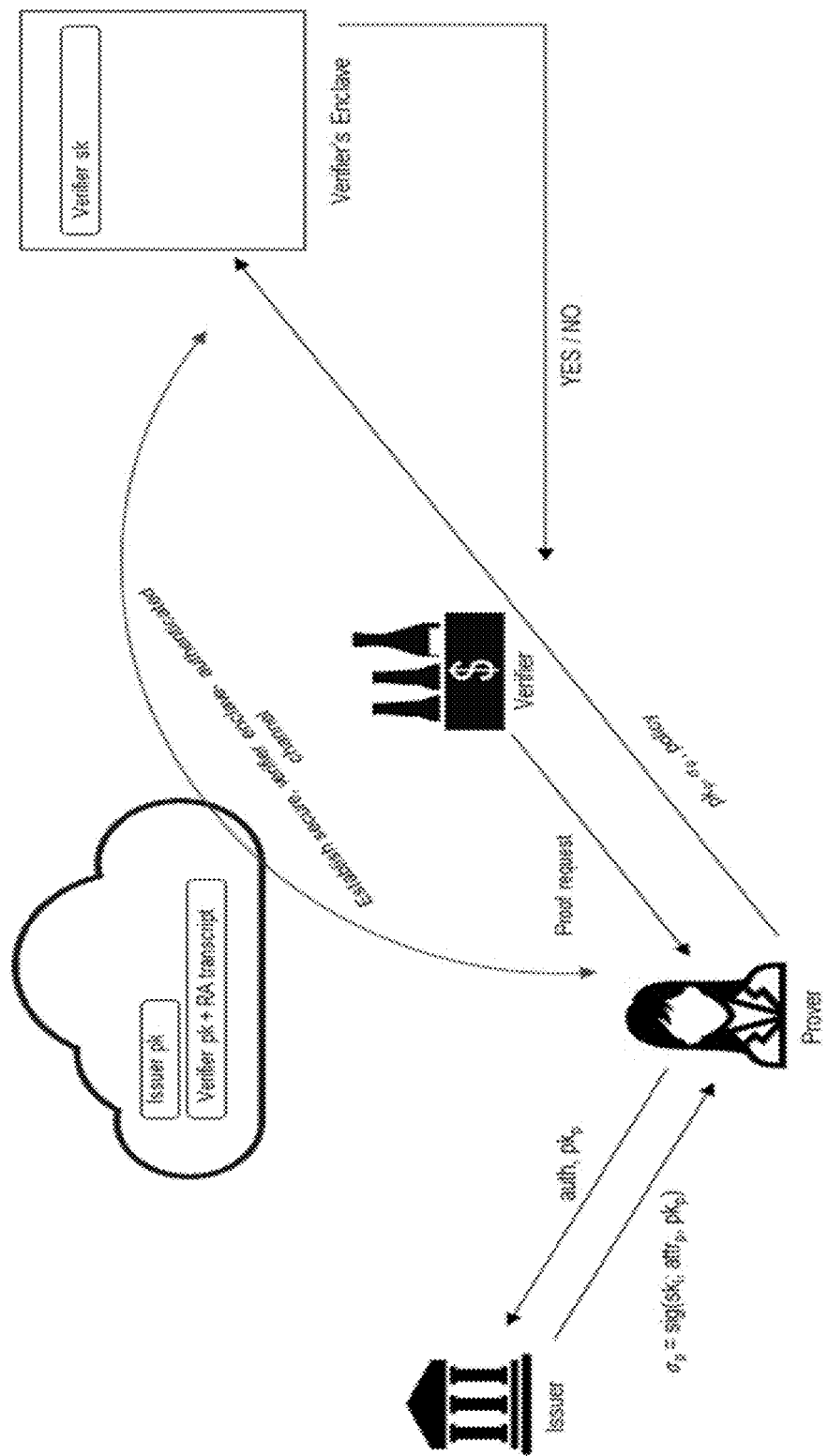
FIG. 33 is a system diagram providing a simplified variation of the system shown in FIG. 32, according to some embodiments.

FIG. 33 is a simplified diagram providing additional detail in the context of a verifier hosted enclave, according to some embodiments. In FIG. 33, the verifier receives the proof request, the proof request, and the proofs directly from the prover or prover device, and transmits a proof verification message to the verifier.

A remote attestation protocol involves a zero knowledge proof with a prover and a verifier, the enclave being the prover. A direct run of this protocol by both Identity Brokerage parties (prover and verifier) may compromise efficiency. Therefore, a mechanism is implemented using the Fiat-Shamir heuristic, and the enclave's maintainer is configured to run an instance of remote attestation in a publicly verifiable manner.

Instead of using actual random inputs, the remote attestation verifier (the enclave's maintainer) replaces every randomness with the output of a pseudorandom function applied to the entire protocol transcript up until that moment, and an arbitrary initial nonce. Thus, by presenting the transcript of this protocol instance, the enclave's maintainer can efficiently convince the identity brokerage parties that the enclave is a trustworthy one.

In some embodiments, the verifier enclave or a third party hosted system tracks records transcripts of an exchange, which are exposed to the public. For example, it may be the responsibility of a verifier computing system to run a remote attestation protocol with its enclave once whereby the enclave communicates its public key, which is then stored in on a transcript exposure module, which may be hosted by any one of the computing systems associated with any one of the parties or by a third party hosted system. In order to establish the honesty of the transcript, all the randomness used on the verifier's cryptography are to be created using a pseudorandom function (hash, block cipher, etc.) involving all or some of the information available to the verifier's computing device at a time of a credential validation transaction.

The secure enclave processor maintains a verification transcript in relation to its own credentials, as the enclave is wholly trusted by both the prover and the verifier, it should be strongly vetted itself.

Chip manufacturers provide mechanisms to verify an enclave involving multi-round interactive protocols. Remote attestation is a protocol based on bilinear group signatures, whereby an enclave proves to a third party that it is running on a legitimate Intel SGX platform, and that is running a particular program.

Figure 34:
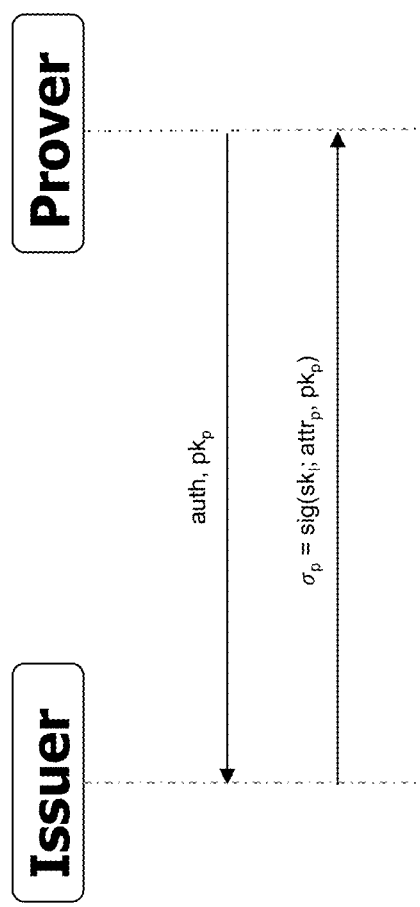
FIG. 34 is a method diagram providing an example issuer sequence where the prover computing system has a corresponding key pair, according to some embodiments. As described in later figures, the prover key is optional, but in some cases, the prover key pair helps prevent sharing or can be utilized to reduce an amount of data required to be held secret. The use of a key pair for the prover may be instrumental in preventing credential subletting, an abuse of the system whereby the prover shares some of their credentials with another for attribute impersonation.

FIG. 34 is a method diagram providing an example issuer sequence where the prover computing system has a corresponding key pair, according to some embodiments.

Figure 35:
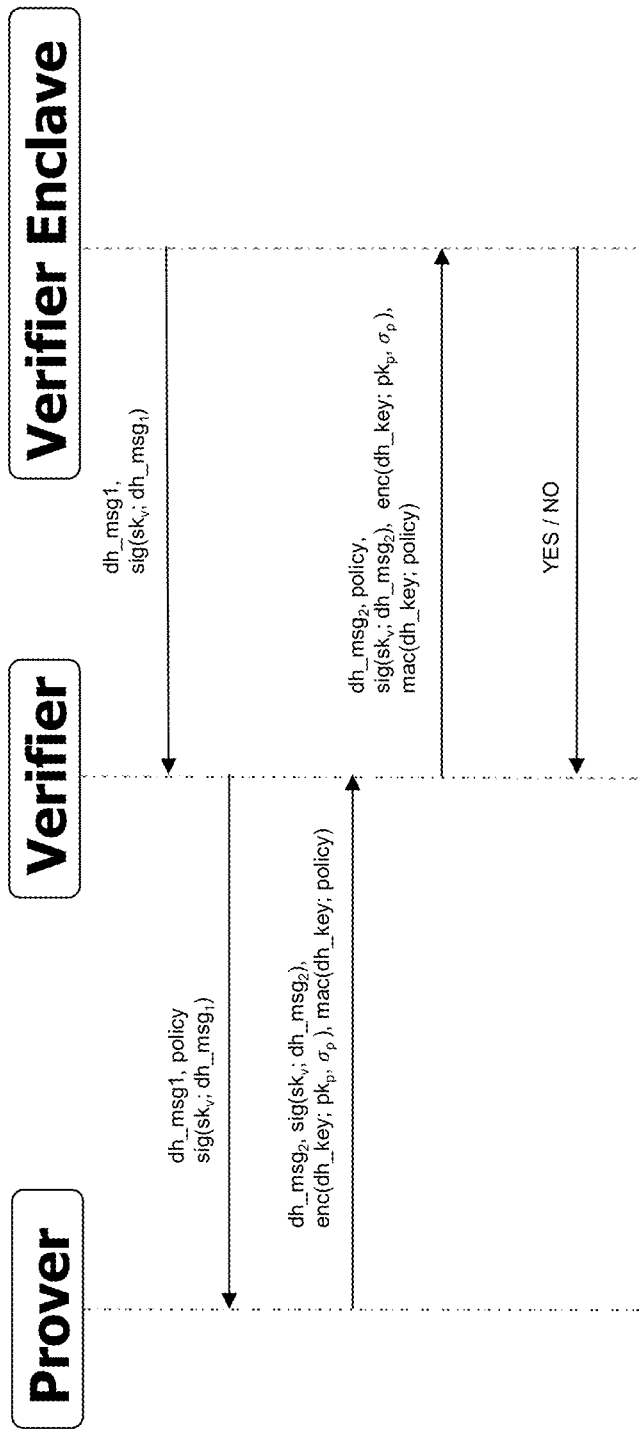
FIG. 35 is a method diagram providing an example verification sequence, where the prover computing system has a corresponding key pair, according to some embodiments.

FIG. 35 is a method diagram providing an example verification sequence, where the prover computing system has a corresponding key pair, according to some embodiments.

Figure 36:
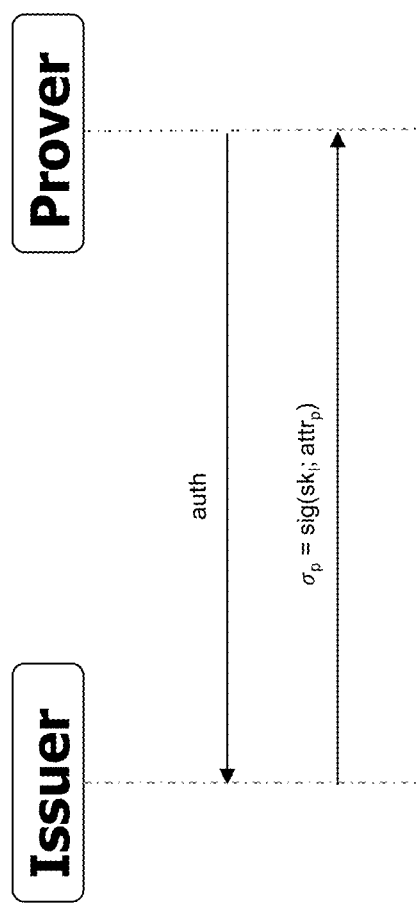
FIG. 36 is a method diagram providing an example issuer sequence where the prover computing system does not have a corresponding key pair, according to some embodiments.

FIG. 36 is a method diagram providing an example issuer sequence where the prover computing system does not have a corresponding key pair, according to some embodiments.

Figure 37:
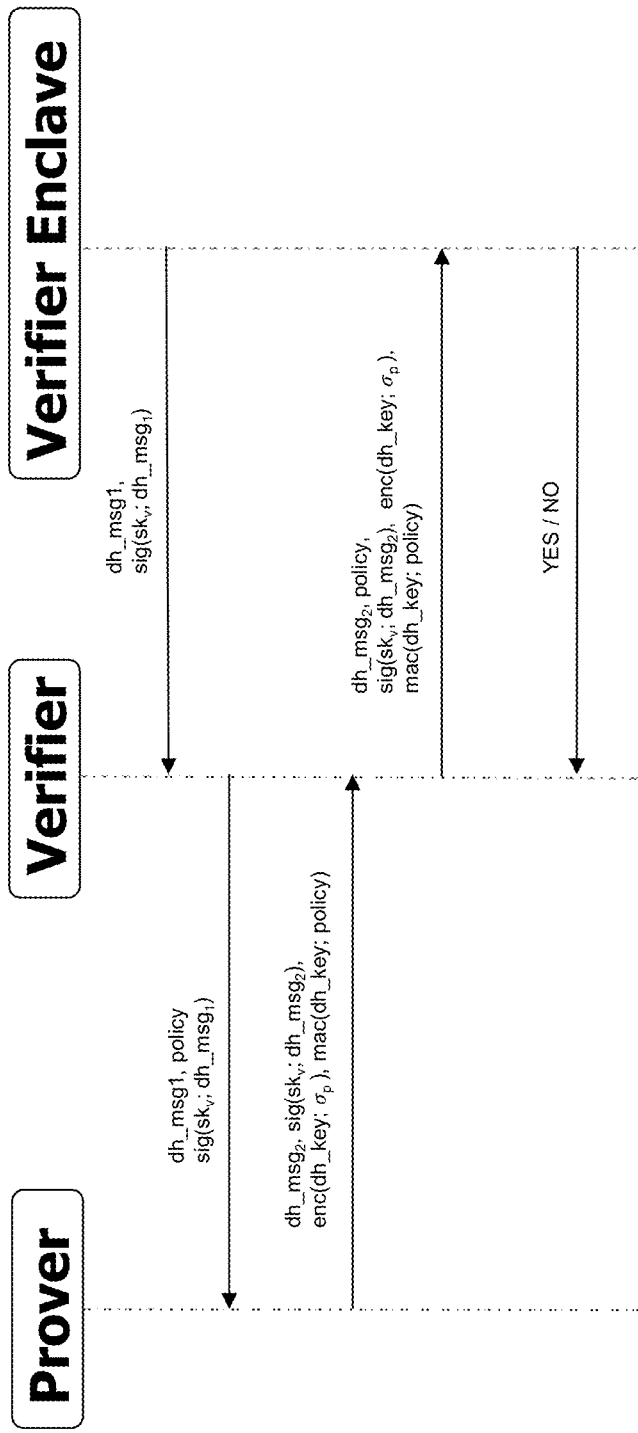
FIG. 37 is a method diagram providing an example verification sequence, where the prover computing system does not have a corresponding key pair, according to some embodiments.

FIG. 37 is a method diagram providing an example verification sequence, where the prover computing system does not have a corresponding key pair, according to some embodiments.

Figure 38:
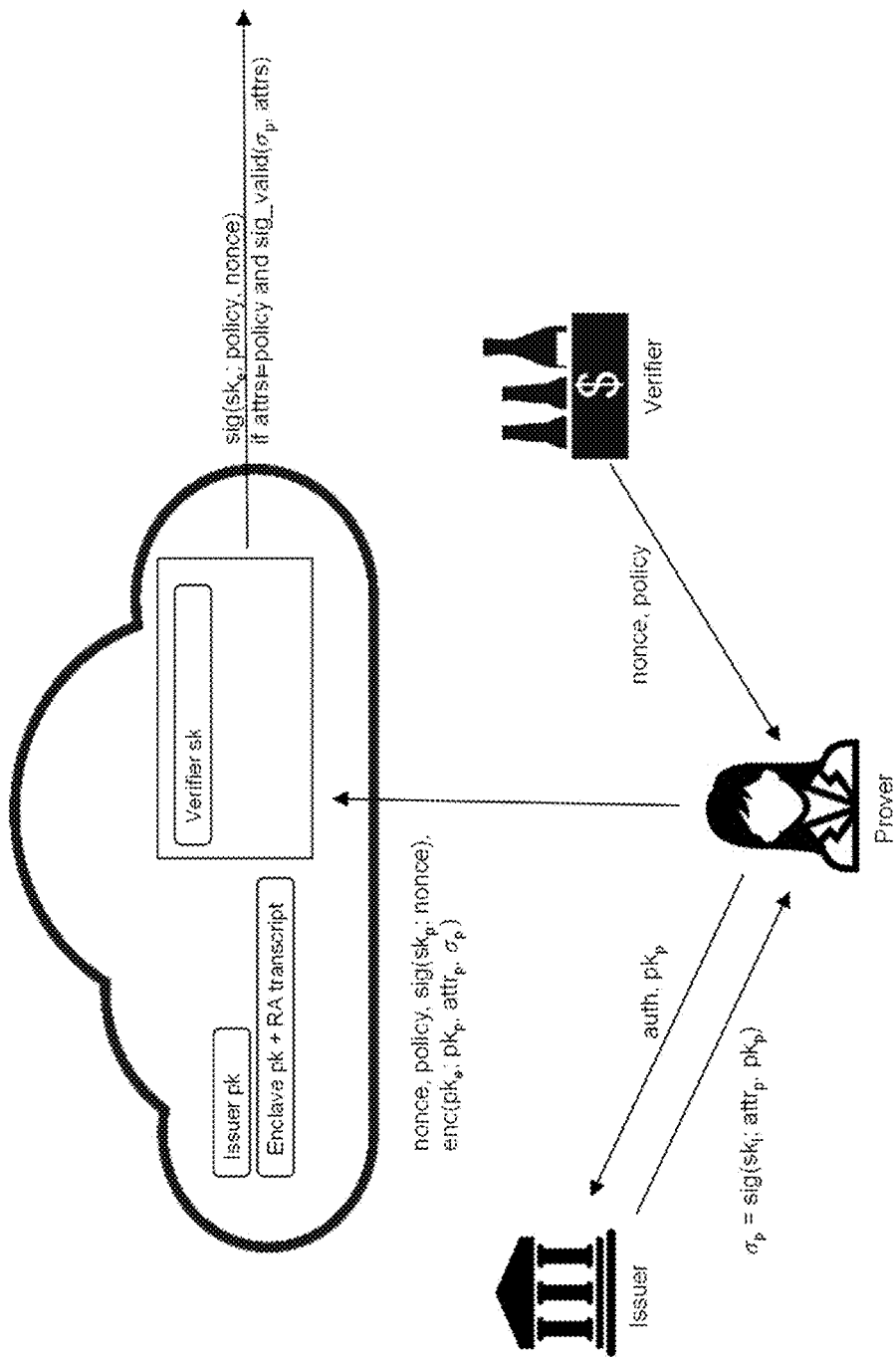
FIG. 38 is a system diagram providing an example verification system having a third party hosted enclave including a transcript, according to some embodiments.

FIG. 38 is a system diagram providing an example verification system having a third party hosted3 enclave, according to some embodiments.

FIG. 39 is an example C-based proof request description language, according to some embodiments. An example proof request is shown in FIG. 39, and other policies are possible. In some embodiments, the policies can be compiled from a simple C-like language only capable of writing straight-line non-branching programs.

In some embodiments, aspects of the present application may provide electronic functionality for customers (a person) to store their personal info securely in an electronic vault, to share information with another person or entity in a secure and private manner, to grant access to another person or entity such as for estate planning a customer can give specific access to a will or other documents to lawyers or other family members.

In some embodiments, similar to a safety deposit box, the system may give the user the ability to store and access sensitive personal information such as Government: Drivers License, Health Care, Nexus, Passport
Health: Heath records
Personal: WII, Insurance Information, Pension
Home: Home info, House Title
Car: Car info, Car Ownership, Digital Car Keys
And the like.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:
1. A computer implemented system for controlling access to data associated with an entity, the system comprising:
a data storage device having a protected memory region;
one or more processors, at least one of which is operable in the protected memory region and configured for:

storing a secret key associated with the entity in a portion of the protected memory region associated with the entity;

upon receiving entity data associated with the entity, storing the entity data in the portion of the protected memory region associated with the entity; and upon receiving an access grant signal, generating a smart contract, the smart contract defining the entity data to be accessed and a recipient of the entity data to be accessed, the smart contract configured to trigger a message for communicating information associated with the entity data to a recipient device upon satisfaction of at least one verification condition.

2. The system of claim 1, wherein the system comprises a trusted execution environment including the protected memory region, the protected memory region inaccessible to the one or more processors when operating outside the trusted execution environment; wherein at least one processor configured to operating inside the trusted execution environment is configured for:

generating the information associated with the entity data within the trusted execution environment, and passing the information associated with the entity data for communication outside the trusted execution environment.

3. The system of claim 1, wherein the information associated with the entity data is a token or is encrypted data based on the entity data.

4. The system of claim 1, wherein the entity data includes one or more token data objects received from or computed jointly in a multiparty protocol with an issuer computing device, the one or more token data objects generated using at least a issuer computing device private issuance key, the one or more token data objects each including one or more signed data elements representing at least one of the one or more characteristics of the entity.

5. The system of claim 1, wherein the entity data is generated by an issuer computing device using the public key associated with the entity and a key associated with the issuer.

6. The system of claim 1, wherein the at least one processor operable in the protected memory region and configured for: generating a log of activity associated with the entity data.

7. The system of claim 1, wherein the one or more processors are configured to set, and enforce access controls of the smart contract based on at least one key associated with the entity.

8. The system of claim 7, wherein the one or more processors are configured to generate one or more access tokens for accessing the portion of the protected memory region associated with the entity.

9. The system of claim 1, wherein the at least one verification condition is met when the one or more processors generate a verification request data message, and receive a proof data message from the recipient device.

10. The system of claim 9, wherein the verification request data message includes at least a nonce $c_0$; and the client computing device processor is configured to:

compute $t = x^{-1} \mod p$, where $x$ is an attribute value from the one or more token data objects, and $p$ is an order of the discrete log group; $t$ is a modular inverse of $x \mod p$;

uniformly sample a first random number $r_1$ and a second random number, $r_2$, such that $r_1, r_2 \in \mathbb{Z}_p$;

compute $R = c_x^{r_1} h^{r_2}$, where $R$ is a commitment to random values $r_1$ and $r_2$, $C_x$ is a commitment to attribute $x$, $h$ is a group generator;

compute $c = H(C_x, R, c_0)$, where $c$ is a proof challenge, based at least on the Fiat-Shamir Heuristic;

compute $z_1 = ct + r_1$ and $z_2 = -cty + r_2$, where $z_1$ and $z_2$ are proof responses based on a Sigma protocol; and encapsulate and transmit the one or more proof data messages including $R$, $z_1$ and $z_2$ as data objects to the verifier computing device, such that the verifier computing device is able to compute $c = H(C_x, R, c_0)$ and confirm that $g^c R = C_x^{z_1} h^{z_2}$, the verifier computing device controlling provisioning of access to a secured resource responsive to the confirmation that $g^c R = C_x^{z_1} h^{z_2}$.

11. A method for controlling access to data associated with an entity, the system comprising:

storing a secret key associated with the entity in a portion of a protected memory region associated with the entity;

upon receiving entity data associated with the entity, storing the entity data in the portion of the protected memory region associated with the entity; and upon receiving an access grant signal, generating a smart contract, the smart contract defining the entity data to be accessed and a recipient of the entity data to be accessed, the smart contract configured to trigger a message for communicating information associated with the entity data to a recipient device upon satisfaction of at least one verification condition.

12. The method of claim 11, comprising: generating the information associated with the entity data within a trusted execution environment, and passing the information associated with the entity data for communication outside the trusted execution environment.

13. The method of claim 11, wherein the information associated with the entity data is a token or is encrypted data based on the entity data.

14. The method of claim 11, wherein the entity data includes one or more token data objects received from or computed jointly in a multiparty protocol with an issuer computing device, the one or more token data objects generated using at least a issuer computing device private issuance key, the one or more token data objects each including one or more signed data elements representing at least one of the one or more characteristics of the entity.

15. The method of claim 11, wherein the entity data is generated by an issuer computing device using the public key associated with the entity and a key associated with the issuer.

16. The method of claim 11, comprising generating a log of activity associated with the entity data in the protected memory region.

17. The method of claim 11, comprising enforcing access controls of the smart contract based on at least one key associated with the entity.

18. The method of claim 17, comprising generate one or more access tokens for accessing the portion of the protected memory region associated with the entity.

19. The method of claim 11, wherein the at least one verification condition is met when the one or more processors generate a verification request data message, and receive a proof data message from the recipient device.

20. A non-transitory computer readable medium or media having stored thereon machine interpretable instructions, which when executed, cause at least one processor to store a secret key associated with the entity in a portion of a protected memory region associated with the entity;

upon receiving entity data associated with the entity, store the entity data in the portion of the protected memory region associated with the entity; and upon receiving an access grant signal, generate a smart contract, the smart contract defining the entity data to be accessed and a recipient of the entity data to be accessed, the smart contract configured to trigger a message for communicating information associated with the entity data to a recipient device upon satisfaction of at least one verification condition.

\* \* \* \* \*